US012027359B2

(12) United States Patent
Carney et al.

(10) Patent No.: US 12,027,359 B2
(45) Date of Patent: Jul. 2, 2024

(54) BENCH-TOP Time of Flight MASS SPECTROMETER

(71) Applicant: Micromass UK Limited, Wilmslow (GB)

(72) Inventors: Peter Carney, Dukinfield (GB); Soji Chummar, Ashton Under Lyne (GB); Jason Lee Wildgoose, Stockport (GB); Ruth Wamsley, Rhuddlan/Rhyl (GB)

(73) Assignee: Micromass UK Limited, Wilmslow (GB)

( * ) Notice: Subject to any disclaimer, the term of this patent is extended or adjusted under 35 U.S.C. 154(b) by 156 days.

(21) Appl. No.: 17/056,999

(22) PCT Filed: May 31, 2019

(86) PCT No.: PCT/GB2019/051498

§ 371 (c)(1),
(2) Date: Nov. 19, 2020

(87) PCT Pub. No.: WO2019/229457

PCT Pub. Date: Dec. 5, 2019

(65) Prior Publication Data

US 2021/0202222 A1 Jul. 1, 2021

(30) Foreign Application Priority Data

May 31, 2018 (GB) ..................................... 1808893

(51) Int. Cl.

| | |
|---|---|
| ***H01J 49/06*** | (2006.01) |
| ***H01J 49/00*** | (2006.01) |
| ***H01J 49/04*** | (2006.01) |
| ***H01J 49/40*** | (2006.01) |

(52) U.S. Cl.
CPC ........ *H01J 49/068* (2013.01); *H01J 49/0031* (2013.01); *H01J 49/04* (2013.01); *H01J 49/065* (2013.01); *H01J 49/401* (2013.01); *H01J 49/405* (2013.01)

(58) Field of Classification Search
CPC ..................................................... H01J 49/068
See application file for complete search history.

(56) References Cited

U.S. PATENT DOCUMENTS 2,901,622 A 8/1959 Baldwin
3,323,008 A * 5/1967 Anderson ................. G04F 5/14 968/829
4,314,156 A 2/1982 Kuppermann et al.
(Continued)

FOREIGN PATENT DOCUMENTS

CN 1447031 A 10/2003
CN 1832101 A 9/2006
(Continued)

OTHER PUBLICATIONS

CN-103400742-A, machine translation, FIT (Year: 2023).*
(Continued)

*Primary Examiner* — Michael J Logie
(74) *Attorney, Agent, or Firm* — Goodwin Procter LLP

(57) ABSTRACT

A Time of Flight analyser comprising a flight tube (160) and a reflectron (170), wherein the reflectron comprises a stack of electrodes (172) that are compressed against the flight tube such that they remain parallel to each other under compression.

14 Claims, 43 Drawing Sheets

(56) References Cited

U.S. PATENT DOCUMENTS 4,458,149 A 7/1984 Muga
5,025,391 A 6/1991 Filby et al.
5,593,123 A 1/1997 Crawford
5,756,994 A 5/1998 Bajic
5,776,216 A 7/1998 Yang
5,825,025 A 10/1998 Kerley
5,933,335 A 8/1999 Hitchcock et al.
6,013,913 A 1/2000 Hanson
6,049,077 A 4/2000 Franzen
6,106,223 A 8/2000 Leyshon
6,248,998 B1 6/2001 Okumoto et al.
6,305,975 B1 10/2001 Steiner
6,316,768 B1 11/2001 Rockwood et al.
6,502,999 B1 1/2003 Cohen et al.
6,527,458 B2 3/2003 Kim
6,566,653 B1 5/2003 Gerber et al.
6,570,152 B1 * 5/2003 Hoyes .................. H01J 49/406 250/281
6,643,075 B2 11/2003 Wang et al.
6,663,294 B2 12/2003 Crane, Jr. et al.
6,712,528 B2 3/2004 Galeotti et al.
6,772,649 B2 8/2004 Zimmermann et al.
6,792,171 B2 9/2004 Hargis et al.
6,824,314 B2 11/2004 Bendelli et al.
6,835,928 B2 12/2004 Bateman
6,847,036 B1 1/2005 Darling et al.
6,862,378 B2 3/2005 Karnacewicz et al.
6,869,231 B2 3/2005 Chiu et al.
6,877,912 B2 4/2005 Cho et al.
6,888,129 B2 5/2005 Bowdler et al.
6,888,860 B2 5/2005 Shaw
6,903,332 B2 6/2005 Weiss et al.
6,956,205 B2 10/2005 Park
6,977,369 B2 12/2005 Yamaguchi et al.
7,019,285 B2 3/2006 Dresch et al.
7,129,163 B2 10/2006 Sherrer et al.
7,149,389 B2 12/2006 Yoon et al.
7,211,794 B2 5/2007 Malek et al.
7,247,847 B2 7/2007 Webb et al.
7,309,861 B2 12/2007 Brown et al.
7,322,754 B2 1/2008 Wolf et al.
7,359,642 B2 4/2008 Richardson et al.
7,372,021 B2 5/2008 Cotter et al.
7,375,318 B2 5/2008 Kikuma et al.
7,550,722 B2 6/2009 Scheidemann et al.
7,597,488 B2 10/2009 Fisher
7,622,711 B2 11/2009 Wildgoose et al.
7,645,986 B2 1/2010 Kikuma et al.
7,786,435 B2 8/2010 Whitehouse et al.
7,812,309 B2 10/2010 Guevremont et al.
7,820,980 B2 10/2010 Balogh
7,825,374 B2 11/2010 Cotter et al.
7,829,841 B2 11/2010 Bateman et al.
7,888,630 B2 2/2011 Wong
7,893,401 B2 2/2011 Ding
7,919,747 B2 4/2011 Green et al.
7,960,694 B2 6/2011 Hoyes
8,138,119 B2 3/2012 Fischer et al.
8,153,960 B2 4/2012 Giles et al.
8,183,524 B2 5/2012 Kenny et al.
8,227,749 B2 7/2012 Alonso
8,253,096 B2 8/2012 Numata
8,357,892 B2 1/2013 Suyama et al.
8,426,802 B2 4/2013 Giles et al.
8,507,849 B2 8/2013 Brown
8,513,597 B2 8/2013 Panayi
8,536,523 B2 9/2013 Li et al.
8,552,367 B2 10/2013 Danel et al.
8,637,810 B2 1/2014 Mukaibatake et al.
8,653,452 B2 2/2014 Albeanu et al.
8,704,172 B2 4/2014 Baykut
8,716,660 B2 5/2014 Green et al.
8,742,339 B2 6/2014 Hoyes
8,822,915 B2 9/2014 Mukaibatake et al.
8,927,928 B2 1/2015 Decker et al.
8,975,578 B2 3/2015 Green et al.
9,012,840 B2 4/2015 Bateman et al.
9,048,075 B1 6/2015 Kodera
9,058,968 B2 6/2015 Danel et al.
9,105,456 B2 8/2015 Jiang et al.
9,184,039 B2 11/2015 Pringle et al.
9,196,469 B2 11/2015 Makarov
9,281,171 B2 3/2016 Bateman et al.
9,287,100 B2 3/2016 Szalay et al.
9,318,309 B2 4/2016 Brown et al.
9,355,832 B2 * 5/2016 Chiappetta ............ H01J 49/067
9,466,472 B2 10/2016 Bateman et al.
9,536,721 B2 1/2017 Berdnikov et al.
9,536,727 B2 1/2017 Satoh
9,552,975 B2 1/2017 Brown et al.
9,564,307 B2 2/2017 Makarov
9,601,323 B2 3/2017 Nishiguchi et al.
9,607,820 B2 3/2017 Bateman et al.
9,754,773 B1 9/2017 Gonzalez et al.
9,768,008 B2 9/2017 Verenchikov
9,812,308 B2 11/2017 Berdnikov et al.
9,859,106 B2 1/2018 Chiappetta et al.
9,865,444 B2 1/2018 Okumura
9,870,904 B2 1/2018 Covey et al.
9,870,906 B1 1/2018 Quarmby et al.
9,880,129 B2 1/2018 Bateman
9,939,407 B2 4/2018 Giles et al.
9,978,572 B2 5/2018 Giles et al.
9,984,861 B2 5/2018 Giles et al.
9,984,863 B2 5/2018 Verenchikov
10,014,167 B2 7/2018 Zhang et al.
10,020,181 B2 7/2018 Okumura
2001/0017351 A1 8/2001 Terakura
2001/0030284 A1 10/2001 Dresch et al.
2002/0100870 A1 8/2002 Whitehouse et al.
2002/0131724 A1 9/2002 Bailey et al.
2003/0003595 A1 1/2003 Amirav
2003/0020011 A1 1/2003 Anderson et al.
2003/0027354 A1 2/2003 Geli
2003/0050679 A1 3/2003 Park
2003/0193019 A1 10/2003 Nagano et al.
2004/0089803 A1 5/2004 Foley
2005/0213353 A1 9/2005 Lys
2006/0076483 A1 4/2006 Scheidemann et al.
2006/0219891 A1 10/2006 Balogh
2006/0237663 A1 10/2006 Balogh
2007/0125954 A1 * 6/2007 Frosien .................. H01J 37/10 250/396 ML
2007/0164209 A1 7/2007 Balogh
2007/0200060 A1 8/2007 Russ et al.
2007/0284520 A1 12/2007 Yamamoto
2008/0087841 A1 4/2008 Verbeck et al.
2008/0149825 A1 6/2008 Kozlovski et al.
2008/0272289 A1 11/2008 Vestal
2009/0101814 A1 4/2009 Amirav
2009/0179148 A1 7/2009 Yasuda et al.
2010/0108879 A1 5/2010 Bateman et al.
2010/0176292 A1 7/2010 Yamauchi et al.
2010/0243887 A1 9/2010 Suyama et al.
2011/0127416 A1 6/2011 Campuzano et al.
2011/0174969 A1 7/2011 Seyfarth
2011/0220786 A1 9/2011 Satoh
2012/0068064 A1 3/2012 Numata
2012/0085901 A1 4/2012 Gilbert et al.
2012/0205534 A1 8/2012 Hunter et al.
2013/0015342 A1 1/2013 Steiner et al.
2013/0183355 A1 7/2013 Jain et al.
2014/0097338 A1 4/2014 Eiler
2014/0183355 A1 7/2014 Bartfay-Szabo et al.
2014/0346345 A1 11/2014 Makarov
2014/0367563 A1 12/2014 Zhong et al.
2015/0014524 A1 * 1/2015 Chiappetta ............. H01J 49/02 250/428
2015/0076338 A1 3/2015 Young et al.
2015/0107824 A1 4/2015 Signorelli et al.
2015/0123354 A1 5/2015 Laser et al.
2015/0228467 A1 8/2015 Grinfeld et al.
2015/0263642 A1 9/2015 Lin et al.

(56) References Cited

U.S. PATENT DOCUMENTS

2015/0270115 A1* 9/2015 Furuhashi ............ H01J 49/405 250/287
2015/0323500 A1 11/2015 Davis et al.
2016/0148796 A1 5/2016 Makarov
2016/0155620 A1 6/2016 Makarov
2016/0172179 A1 6/2016 Deerberg et al.
2016/0203967 A1 7/2016 Atkinson et al.
2016/0247668 A1 8/2016 Szalay et al.
2016/0284526 A1 9/2016 Kenny et al.
2016/0293395 A1 10/2016 O'Brien et al.
2016/0322960 A1 11/2016 Taylor et al.
2016/0336158 A1 11/2016 Kovarik
2017/0011897 A1 1/2017 Yamaguchi
2017/0074283 A1 3/2017 Manabe
2017/0082585 A1 3/2017 DeWitte et al.
2017/0092477 A1 3/2017 Giles et al.
2017/0115383 A1 4/2017 Fukuo et al.
2017/0168031 A1 6/2017 Verenchikov
2017/0169633 A1 6/2017 Leung et al.
2017/0190566 A1 7/2017 Cramm et al.
2017/0236699 A1 8/2017 Ueda et al.
2017/0287692 A1 10/2017 Bateman et al.
2017/0309465 A1 10/2017 Jarrell
2017/0372881 A1 12/2017 Hoyes
2018/0053640 A1 2/2018 Kurulugama et al.
2018/0102241 A1 4/2018 Gordon et al.
2020/0312647 A1* 10/2020 Imazu .................. G01N 27/622

FOREIGN PATENT DOCUMENTS

CN 101855700 A 10/2010
CN 102064078 A 5/2011
CN 102403184 A 4/2012
CN 102446692 A 5/2012
CN 102800555 A 11/2012
CN 102971827 A 3/2013
CN 103400742 A * 11/2013
CN 103684817 A 3/2014
CN 104517798 A 4/2015
CN 105030148 A 11/2015
CN 105474351 A 4/2016
CN 105679637 A 6/2016
CN 205705229 U 11/2016
CN 106663586 A 5/2017
CN 106992109 A 7/2017
CN 107112195 A 8/2017
CN 107408489 A 11/2017
CN 107635477 A 1/2018
CN 206955673 U 2/2018
DE 2817665 A1 10/1979
DE 102018105603 A1 5/2018
EP 0233784 A2 8/1987
EP 0317060 A2 5/1989
EP 0792091 A1 8/1997
EP 0919726 A1 6/1999
EP 1137044 A2 9/2001
EP 1393059 A1 3/2004
EP 1530229 A1 5/2005
EP 1597749 A2 11/2005
EP 1820203 A2 8/2007
EP 1830386 A2 9/2007
EP 1843043 A2 10/2007
EP 1933365 A1 6/2008
EP 1933366 A1 6/2008
EP 1964153 A2 9/2008
EP 1166328 B1 11/2008
EP 1397822 B1 3/2010
EP 1884980 B1 6/2011
EP 1817789 B1 11/2011
EP 2431997 A2 3/2012
EP 2450941 A1 5/2012
EP 1825496 B1 6/2012
EP 2533042 A1 12/2012
EP 2567397 A2 3/2013
EP 2587521 A1 5/2013
EP 2092549 B1 8/2013
EP 2644899 A1 10/2013
EP 2660850 A1 11/2013
EP 2734018 A1 5/2014
EP 2633299 B1 9/2014
EP 2774172 A2 9/2014
EP 2797105 A1 10/2014
EP 2798657 A2 11/2014
EP 2806553 A2 11/2014
EP 1810314 B1 4/2015
EP 2866247 A1 4/2015
EP 1738398 B1 6/2015
EP 2038913 B1 7/2015
EP 2913914 A1 9/2015
EP 3005403 A2 4/2016
EP 3073509 A1 9/2016
EP 3084422 A1 10/2016
EP 3211781 A1 8/2017
EP 2033208 B1 11/2017
EP 3244439 A1 11/2017
EP 1789989 B1 12/2017
EP 2485243 B1 3/2018
EP 3404695 A1 11/2018
EP 1880406 B1 7/2019
GB 1593998 A 7/1981
GB 2219432 A 12/1989
GB 2327804 A 2/1999
GB 2329066 A 3/1999
GB 2435712 A 9/2007
GB 2440970 A 2/2008
GB 2443952 A 5/2008
GB 2455171 A 6/2009
GB 2473839 A 3/2011
GB 2486584 A 6/2012
GB 2489975 A 10/2012
GB 2493072 A 1/2013
GB 2506710 A 4/2014
GB 2515284 A 12/2014
GB 2519853 A 5/2015
GB 2520787 A 6/2015
GB 2525960 A 11/2015
GB 2530367 A 3/2016
GB 2533168 A 6/2016
GB 2541808 A 3/2017
GB 2552965 A 2/2018
JP S60180322 A 9/1985
JP S63146963 U * 9/1988
JP H01121747 A 5/1989
JP H03233850 A 10/1991
JP H10233187 A 9/1998
JP H1125903 A 1/1999
JP H11230087 A 8/1999
JP 2001050944 A 2/2001
JP 2004226313 A 8/2004
JP 2005285543 A * 10/2005
JP 2005285543 A 10/2005
JP 2012043672 A 3/2012
JP 2014022075 A 2/2014
JP 2015121406 A 7/2015
WO 9921212 A1 4/1999
WO 0185312 A1 11/2001
WO 02101382 A1 12/2002
WO 2004077488 A2 9/2004
WO 2006061625 A1 6/2006
WO 2006129083 A2 12/2006
WO 2007071991 A2 6/2007
WO 2007131146 A2 11/2007
WO 2008071923 A2 6/2008
WO 2009037483 A2 3/2009
WO 2010064321 A1 6/2010
WO 2011106640 A2 9/2011
WO 2011138669 A2 11/2011
WO 2012058632 A1 5/2012
WO 2012125318 A2 9/2012
WO 2012125381 A1 9/2012
WO 2013039772 A1 3/2013
WO 2013064842 A2 5/2013
WO 2013066881 A2 5/2013

(56) References Cited

FOREIGN PATENT DOCUMENTS

| | | | |
|---|---|---|---|
| WO | 2013098642 | A2 | 7/2013 |
| WO | 2014074822 | A1 | 5/2014 |
| WO | 2014191747 | A1 | 12/2014 |
| WO | 2014191750 | A1 | 12/2014 |
| WO | 2014194023 | A2 | 12/2014 |
| WO | 2014194172 | A2 | 12/2014 |
| WO | 2015009478 | A1 | 1/2015 |
| WO | 2015040379 | A1 | 3/2015 |
| WO | 2015040386 | A1 | 3/2015 |
| WO | 2015092501 | A1 | 6/2015 |
| WO | 2015189550 | A1 | 12/2015 |
| WO | 2016027085 | A1 | 2/2016 |
| WO | 2017060991 | A1 | 4/2017 |
| WO | 2017122276 | A1 | 7/2017 |
| WO | 2018138814 | A1 | 8/2018 |
| WO | 2019224948 | A1 | 11/2019 |

OTHER PUBLICATIONS

Combined Search and Examination Report under Sections 17 and 18(3) for Application No. GB1808932.6, dated Nov. 21, 2018, 4 pages.

Combined Search and Examination Report under Sections 17 and 18(3) for Application No. GB1808890.6, dated Nov. 28, 2018, 7 pages.

Combined Search and Examination Report under Sections 17 and 18(3) for Application No. GB1808912.8, dated Nov. 30, 2018, 10 pages.

Combined Search and Examination Report under Sections 17 and 18(3) for Application No. GB1808942.5, dated Dec. 3, 2018, 7 pages.

Chernushevich, I. V., et al., "An introduction to quadrupole-time-of-flight mass spectrometry", Journal of Mass Spectrometry, 36(8):849-65 (2001) Abstract only.

Chernushevich, I.V., et al., "Charge state separation for protein applications using a quadrupole time-of-flight mass spectrometer", Rapid Communications in Mass Spectrometry 17(13): 1416-1424 (2003). Abstract only.

Makarov, A. et al., "Performance evaluation of a hybrid linear ion trap/orbitrap mass spectrometer," Analytical Chemistry, 78(7):2113-20 (2006). Abstract only.

Combined Search and Examination Report under Sections 117 and 18(3) for Application No. GB1808948.2 dated Nov. 21, 2018, 7 pages.

Combined Search and Examination Report under Sections 17 and 18(3) for Application No. GB1808893.0 dated Nov. 27, 2018, 8 pages.

Combined Search and Examination Report under Sections 17 and 18(3) for Application No. GB1808936.7 dated Nov. 20, 2018, 10 pages.

Combined Search and Examination Report under Sections 17 and 18(3) for Application No. GB1808892.2, dated Dec. 3, 2018, 6 pages.

Combined Search and Examination Report under Sections 17 and 18(3) for Applicaton No. GB1808894.8 dated Dec. 3, 2018, 7 pages.

Combined Search and Examination Report under Sections 17 and 18(3) for Application No. GB1808949.0 dated Oct. 31, 2018, 8 pages.

Combined Search and Examination Report under Sections 17 and 18(3) for Application No. GB1907722.1 dated Jun. 28, 2019, 8 pages.

Combined Search and Examination Report under Sections 17 and 18(3) for Application No. GB1808889.8 dated Nov. 30, 2018, 7 pages.

International Search Report and Written Opinion for International application No. PCT/GB2019/051504, dated Jul. 23, 2019, 11 pages.

Combined Search and Examination Report under Sections 17 and 18(3) for Application No. GB1818003.4, dated May 2, 2019, 6 pages.

Invitation to pay additional fees and, where applicable, protest fee for PCT/GB2019/051508, dated Aug. 28, 2019.

Author unknown, "Operating Manual and Programming Reference, Models RGA100, RGA200, and RGA300 Residual Gas Analyzer," Stanford Research Systems Revision 1.8 (May 2009).

Jungmann, J. H., et al., "An in-vacuum, pixelated detection system for mass spectrometric analysis and imaging of macromolecules," International Journal of Mass Spectrometry, 341-342:34-44 (2013).

Invitation to pay additional fees and, where applicable, protest fee for International application No. PCT/GB2019/051507, dated Aug. 20, 2019, 16 pages.

Yang, C., and Hanley, L., "ChiMS: Open-source instrument control software platform on LabVIEW for imaging/depth profiling mass spectrometers," Review of Scientific Instruments, 86:065106-1 through 065016-7 (2015).

Invitation to pay additional fees and, where applicable, protest fee for International application No. PCT/GB2019/051506, dated Jul. 22, 2019, 13 pages.

Invitation to pay addition al fees and, where applicable, protest fee for PCT/GB2019/051503, dated Jul. 25, 2019, 17 pages.

International Search Report and Written Opinion for International application No. PCT/GB2019/051500, dated Aug. 5, 2019, 9 pages.

Kozlov, B., et al., "Time-of-flight mass spectrometer for investigations of laser ablation," ASMS Conference paper, Dallas, TX (May 1999). [Retrieved from the Internet URL: https//www.researchgate.net/publication/330202298_Time-of-flight_mass_spectrometer_for_investigations_of_laser_ablation]. Abstract.

Shion, H., et al., "Towards Overcoming the Challenges of Implementing Accurate Mass MS for Routine Biotherapeutic Analysis" 2018 ASMS Prototype oa-TOF Abstract HYS Final.

Shion, S., et al., "Towards Overcoming the Challenges of Implementing Accurate Mass MS for Routine Biotherapeutic Analysis" 2018 ASMS Prototype oa-TOF WP699 HYS Final Poster.

Shion, H., et al., "A Fit-for-purpose Accurate Mass MS for Routine Biotherapeutic Analysis", 2018 CASSS Mass Spec HYS Final Poster.

Shion, H., et al., "A Fit-for-purpose Accurate Mass MS for Routine Biotherapeutic Analysis", 2018 CASSS Mass Spec BioTof HYS Final, Abstract.

Shion, H., et al., "Progress Towards Implementing Simple Time-of-flight Accurate Mass MS for Routine Biotherapeutic Analysis", XXII (IMSC) International Mass Spectrometry Conference Florence, Italy (2018) Abstract.

Shion, H., et al., "Progress Towards Implementing Simple Time-of-flight Accurate Mass MS for Routine Biotherapeutic Analysis", XXII International Mass Spectrometry Conference Florence, Italy (2018) poster.

Shion, H., et al., "Meeting the Challenges of Implementing Accurate-Mass Mass Spectrometry for Biotherapeutic Development in Regulated/non-Regulated Environments", 2019 ASMS BioAccord Oral Session PowerPoint.

Shion, H., et al., "Meeting the Challenges of Implementing Accurate-Mass Mass Spectrometry for Biotherapeutic Development in Regulated/non-Regulated Environments", 2019 ASMS BioAccord Abstract.

Shion, H., et al., "Meeting the Challenges of Implementing Accurate-Mass Mass Spectrometry for Biotherapeutic Development in Regulated/non-Regulated Environments" 2019 ATEurope BioAccord, Abstract.

Shion, H., et al., "Meeting the Challenges of Implementing Accurate-Mass Mass Spectrometry for Biotherapeutic Development in Regulated/non-Regulated Environments" 2019 ATEurope BioAccord, Poster.

Shion, H., et al., "Meeting the Challenges of Implementing Accurate-Mass Mass Spectrometry for biotherapeutic Development in Regulated/non-Regulated Environments", 2019 BioPharma Analytical Summit BioAccord, abstract.

Shion, H., et al., "Meeting the Challenges of Implementing Accurate-Mass Mass Spectrometry for Biotherapeutic Development in Regulated/non-Regulated Environments", 2019 Bio Pharma Summit BioAccord, Poster.

Shion, H., "Enabling Routine and Reproducible Biotherapeutic Analysis when Data Integrity Matters", 2019 15th Annual PEGs Boston Waters BioAccord, PowerPoint 29 pages.

(56) References Cited

OTHER PUBLICATIONS

Shion, H., "Enabling Routine and Reproducible Biotherapeutic Analysis when Data Integrity Matters", 2019 15th Annual PEGs Boston Waters BioAccord, Abstract.
Shion, H., et al., "Meeting the Challenges of Implementing Accurate-Mass Mass Spectrometry for Biotherapeutic Development in Regulated/non-Regulated Environments", 2019 Pitt Con Bio Accord, Poster.
Shion, H., et al., "Meeting the Challenges of Implementing Accurate-Mass Mass Spectrometry for Biotherapeutic Development in Regulated/non-Regulated Environments", 2019 Pitt Con Bio Accord, Abstract.
Combined Search and Exam Report from IPO for GB Application No. 1907739.5, dated Nov. 27, 2019, 8 pages.
International Search Report and Written Opinion for International application No. PCT/GB2019/051510, dated Aug. 29, 2019, 13 pages.
Combined Search and Exam Report from IPO for GB Application No. 1907735.3, dated Nov. 25, 2019, 7 pages.
Combined S and E Report under Sections 17 and 18(3) for Application No. GB1907734.6, dated Oct. 31, 2019, 7 pages.
International Search Report and Written Opinion for International Application No. PCT/GB2019/051498, dated Nov. 6, 2019, 21 pages.
Combined Search and Examination Report under Sections 17 and 18(3) for Application No. GB1907719.7, dated Nov. 15, 2019, 11 pages.
Author unknown, "Waters Xevo G2-S QTof Operators Overview and Maintenance Guide", Feb. 11, 2013 (Feb. 11, 2013), XP55606374, Retrieved from the Internet: URL:https://www.waters.com/webassets/cms/support/docs/kevo_g2-s_qtof_715003596rb.pdf [retrieved on Jul. 17, 2019].
International Search Report and Written Opinion for International application No. PCT/GB2019/051501, dated Sep. 25, 2019, 17 pages.
Examination Report under Section 18(3) for Application No. GB1907722.1, dated Oct. 26, 2021, 4 pages.
Combined Search and Examination Report under Sections 17 and 18(3), for Application No. GB1907724.7, dated Sep. 25, 2019, 7 pages.
Invitation to Pay Additional Fees and, Where Applicable, Protest Fee for International application No. PCT/GB2019/051494, dated Sep. 19, 2019.
Combined Search and Examination Report under Sections 17 and 18(3), dated Sep. 27, 2019, for Application No. GB1907736.1, 6 pages.
Invitation to Pay Additional Fees and, Where Applicable, Protest Fees, for International application No. PCT/GB2019/051499, dated Sep. 4, 2019.
Invitation to Pay Additional Fees and, Where Applicable, Protest Fee, for International Application No. PCT/GB2019/051496, dated Aug. 29, 2019.
Anonymous, "Time-of-flight mass spectrometry", Wikipedia, Apr. 28, 2018 (Apr. 28, 2018), XP055614063, Retrieved from the Internet:URL:https://en.wikipedia.org/w/index.php title=Time-of-flight_mass_spectrometry oldid=838663844 [retrieved on Aug. 20, 2019].
Invitation to Pay Additional Fees and, Where Applicable, Protest Fees for International application No. PCT/GB2019/051497, dated Sep. 2, 2019.
Combined Search and Examination Report under Sections 17 and 18(3) for Application No. GB1907745.2, dated Aug. 13, 2019, 7 pages.
Invitation to Pay Additional Fees and, Where Applicable, Protest Fee, for International application No. PCT/GB2019/051501, dated Jul. 29, 2019, 14 pages.
International Search Report and Written Opinion for International application No. PCT/GB2019/051497, dated Nov. 5, 2019, 19 pages.
International Search Report and Written Opinion for International application No. PCT/GB2019/051503, dated Sep. 25, 2019, 17 pages.
International Search Report and Written Opinion for International application No. PCT/GB2019/051496, dated Oct. 23, 2019, 29 pages.
International Search Report and Written Opinion for International application No. PCT/GB2019/051506, dated Sep. 25, 2019, 14 pages.
International Search Report and Written Opinion for International application No. PCT/GB2019/051494, dated Nov. 18, 2019, 20 pages.
International Search Report and Written Opinion for International application No. PCT/GB2019/051507, dated Oct. 15, 2019, 17 pages.
International Search Report and Written Opinion for International application No. PCT/GB2019/051508, dated Oct. 23, 2019, 16 pages.
International Search Report and Written Opinion for International application No. PCT/GB2019/051499, dated Nov. 5, 2019, 19 pages.
Examination Report under Section 18(3) for Application No. GB1907719.7, dated Jul. 28, 2021, 9 pages.
Parkes, S. SpaceWire User Guide, STAR-Dundee [online] 2012 [retrieved on Aug. 13, 2021]. Retrieved from Internet URL: https://www.star-dundee.com/wp-content/star_uploads/general/SpaceWire-Users-Guide.pdf, 117 pages.
Sciex, "3200 Series of Instruments System User Guide" [online], published Apr. 2018, available from: https://sciex.com/content/dam/SCIEX/pdf/customer-docs/user-guide/3200-system-user-guide-en.pdf, 241 pages.
Combined Search and Examination Report under Sections 17 and 18(3), for Application No. GB2100898.2, dated Jun. 21, 2021, 7 pages.
Combined Search and Examination Report under Sections 17 and 18(3), for Application No. GB2001530.1, dated Aug. 5, 2020, 7 pages.
Thermo Fisher Scientific, Inc, Feb. 2015, Orbitrap Fusion Hardware Manual [online]. Retrieved from Internet URL: http://www.unitylabservices.eu/content/dam/tfs/ATG/CMD/cmddocuments/oper/oper/ms/lc-ms/sys/Man-80000-97016-Orbitrap-Fusion-Hardware-Man8000097016-A-EN.pdf, 122 pages.
Shion, H., et al., "Meeting the Challenges of Implementing Accurate-Mass Mass Spectrometry for Biotherapeutic Development in Regulated/non-Regulated Environments", 2019 BioPharma Analytical Summit BioAccord Abstract. ASMS MS-in-QC, PowerPoint 24 pages.
International Preliminary Report on Patentability for International application No. PCT/GB2019/051510, dated Dec. 1, 2020, 7 pages.
Examination Report under Section 18(3) for Application No. GB1907739.5, dated Nov. 3, 2020, 5 pages.
Examination Report under Section 18(3) for Application No. GB2020743.7, dated Jan. 28, 2022, 6 pages.
Niehuis, E., et al., "Design and performance of a reflectron based time-of-flight secondary ion mass spectrometer with electrodynamic primary ion mass separation", Journal of Vacuum Science and Technology A, 5(4):1243-1246, Jul. 31, 1987.
Asamura, K., et al. "Low-energy particle experiments-ion mass analyzer (LEPi) onboard the ERG (Arase) satellite", Earth, Planets and Space, 70(70):2-15, (2018).
Parkes, S., " The Operation and Uses of the SpaceWire Time-Code", International SpaceWire Seminar (ISWS 2003), Nov. 4-5, 2003, ESTEC Noordwijk, The Netherlands.

* cited by examiner

Fig. 16F

| Control Name | Relative voltage | | | Absolute volatge range (V) | Polarity* |
|---|---|---|---|---|---|
| | Range from (V) | Range (V) | w.r.t. | | |
| Capillary | 0 | 1500 | Ground | 1500 | Same |
| Source offset | 0 | 30 | Step 1 gradient | 400 | Same |
| Step 1 gradient | 0 | 30 | Step 1 offset | 370 | Same |
| Step 1 offset | 0 | 40 | Step 2 offset (cone) | 340 | Same |
| Step 2 gradient | 0 | 40 | Step 2 offset (cone) | 340 | Same |
| Step 2 offset (cone) | 0 | 200 | Aperture 1 | 300 | Same |
| Aperture 1 | 0 | 10 | Ion guide gradient | 100 | Same |
| Ion guide gradient | 0 | 5 | Ion guide offset A | 90 | Same |
| Ion guide offset A | 0 | 5 | Ion guide offset B (entrance) | 85 | Same |
| Ion guide offset B (entrance) | 0 | 80 | Ground | 80 | Same |
| Aperture 2 | 0 | 10 | Ion guide offset (entrance) | 80 | Opposite |
| Aperture 2 trap | 0 | 10 | Ion guide offset (entrance) | 90 | Same |
| Acceleration 1 | 0 | 100 | Ion guide offset (entrance) | 80 | Opposite |
| Acceleration 2 | 0 | 100 | Ion guide offset (entrance) | 80 | Opposite |
| Aperture 3 | 0 | 0 | Ground | 0 | n/a |
| Transport 1 | 0 | 100 | Ion guide offset (entrance) | 80 | Opposite |
| Transport 2 | 0 | 100 | Ion guide offset (entrance) | 85 | Opposite |
| Steering | -5 | 5 | Transport 2 | 85 | Opposite |
| Tube lens | 0 | 0 | Ground | 0 | n/a |
| Entrance plate | 0 | 0 | Ground | 0 | n/a |
| Pusher | 0 | 1100 | Ground | 1000 | Same |
| Pusher offset | -5 | 5 | Ground | 10 | Same |
| Third grid | 0 | 0 | Ground | 0 | n/a |
| Second grid | 0 | 0 | Ground | 0 | n/a |
| Flight tube | 0 | 4500 | Ground | 4500 | Opposite |
| Reflectron grid | 0 | 0 | Ground | 0 | n/a |
| Reflectron | 0 | 1725 | Ground | 1725 | Same |
| Detector | 0 | 4000 | Flight tube | 8500 | Positive |

BENCH-TOP Time of Flight MASS SPECTROMETER

CROSS-REFERENCE TO RELATED APPLICATIONS

This application is a U.S. national phase filing claiming the benefit of and priority to International Patent Application No. PCT/GB2019/051498, filed on May 31, 2019, which claims priority from and the benefit of United Kingdom patent application No. 1808893.0 filed on May 31, 2018. The entire contents of these applications are incorporated herein by reference.

FIELD OF THE INVENTION

The present invention relates generally to mass spectrometry and in particular to a small footprint or bench-top Time of Flight ("TOF") mass spectrometer which has particular application in the biopharmaceutical industry.

BACKGROUND

Conventional mass spectrometers which may be used, for example, in the biopharmaceutical industry tend to be relatively complex and have a relatively large footprint.

Scientists in the biopharmaceutical industry need to collect high resolution accurate mass data for their samples in order to provide more comprehensive information than can be obtained using LCUV analysis. Conventionally, this is typically achieved either by running relatively complex mass spectrometry equipment or by outsourcing the analysis to a specialist service.

It is desired to provide a reduced footprint Time of Flight ("TOF") mass spectrometer which may have particular application in the biopharmaceutical industry.

SUMMARY

According to various embodiments there is provided a Time of Flight analyser (e.g. a Time of Flight mass analyser) comprising a reflectron and a flight tube, wherein the reflectron comprises a stack of electrodes that are compressed against the flight tube.

Compressing the stack of electrodes against the flight tube leads to improvements in the electrical and thermal stability of the Time of Flight analyser, by forcing the electrodes into their in use configuration.

The stack of electrodes may comprise a plurality of ring electrodes.

The stack of electrodes may be compressed such that they remain parallel to each other under compression.

The Time of Flight analyser may further comprise one or more resilient members configured to bias the stack of electrodes towards the flight tube, so as to compress them against the flight tube.

The Time of Flight analyser may further comprise one or more rods extending through the stack of electrodes, wherein each of the one or more resilient members are biased between a respective one of the rods and the stack of electrodes to compress them against the flight tube. Each of the one or more resilient members may be biased between a foot of a respective one of the rods and a portion of the reflectron, for example a bottom surface or plate thereof.

The Time of Flight analyser may further comprise one or more members configured to resist movement of a respective one of the rods against the biasing force of the resilient member(s) and/or prevent relative movement between a respective one of the rods and the flight tube, such that the biasing force of the resilient member(s) causes the resilient member to bias the stack of electrodes against the flight tube.

If the rod is restrained against moving relative to the flight tube (e.g. using the one or more members described above), and the resilient member is biased between the rod and the reflectron, then the resilient member will force the reflectron towards the flight tube and bias the stack of electrodes against the flight tube.

In refinements, each of the one or more members may be or comprise a pin that extends through an aperture in a respective one of the rods and contacts a portion of the flight tube, such that the biasing force from the resilient member(s) forces each pin against the respective portion of the flight tube to resist movement of the rod(s) against the biasing force of the resilient member(s) as aforesaid.

Each of the one or more rods may extend through a respective portion of the flight tube, such that the rod and aperture thereof protrude from the portion of the flight tube and each pin can be inserted through a respective aperture when the rod and aperture protrude from the portion of the flight tube so as to then contact the portion of the flight tube to resist movement of the rod(s) against the biasing force of the resilient member(s) as aforesaid.

Each of the electrodes in the stack of electrodes may comprise one or more apertures through which one of the rods extend.

Each rod may be straight and the apertures in the electrodes may be aligned so as to receive the straight rod, such that insertion of the straight rod through the apertures in the electrodes aligns the electrodes in an in use orientation.

The Time of Flight analyser may further comprise a plurality of spacers (e.g. electrically insulating spacers) in between each of the electrodes in the stack of electrodes, wherein each spacer may extend around a respective one of the one or more rods and may be compressed between the electrodes by the biasing force exerted by the resilient member.

The spacers may define the separation distance of the electrodes in the stack of electrodes. The separation distance may correspond to the spacing between the electrodes in a direction parallel to a central, longitudinal axis of the reflection. The spacers may all be of the same size.

According to various embodiments there is provided a Time of Flight analyser comprising a flight tube and a reflectron, wherein the reflectron is compressed against the flight tube.

According to various embodiments there is provided a Time of Flight analyser comprising a reflectron, wherein the reflectron comprises a stack of electrodes that are compressed together.

According to various embodiments there is provided a method of constructing a flight tube and reflectron for a Time of Flight analyser, the method comprising the steps of:

(i) assembling a stack of electrodes to form a reflectron; and (ii) compressing the stack of electrodes against a flight tube.

Step (i) may comprise assembling the stack of electrodes such that they are parallel to each other, and/or step (ii) may comprise keeping the electrodes parallel as they are compressed.

Step (ii) may comprise biasing the stack of electrodes towards the flight tube using a resilient member.

The method may further comprise inserting one or more rods through the stack of electrodes, wherein the biasing may comprise biasing the one or more resilient members between a foot portion of a respective one of the rods and a lower surface of the stack of electrodes.

The method may further comprise inserting a pin into an aperture within each of the one or more rods, wherein each inserted pin may be configured to prevent relative movement between a respective one of the rods and the flight tube, such that the biasing force of the resilient member(s) causes the resilient member to bias the stack of electrodes against the flight tube as aforesaid.

The method may further comprise placing a plurality of electrically insulating spacers in between each of the electrodes in the stack of electrodes, wherein each spacer may be compressed between the electrodes by the biasing force exerted by the spring.

According to various embodiments there is provided a pusher assembly for a Time of Flight analyser, comprising:

a pusher electrode configured to accelerate ions; and a double grid electrode configured to provide a field-free region.

The double grid electrode may be positioned adjacent to the pusher electrode.

The double grid electrode may comprise a first grid electrode and a second grid electrode.

The double grid electrode may be configured to provide a field free region between the first grid electrode and the second grid electrode.

The first grid electrode may be spaced from the second grid electrode by a distance of between approximately 2 to 4 mm, for example between approximately 2 mm to 3 mm.

The pusher assembly may further comprise a structure configured to support the double grid electrode.

The support structure may comprise first and second annular members, each configured to support a respective one of the first grid electrode and the second grid electrode. Alternatively, the support structure may comprise a single annular member configured to support both the first grid electrode and the second grid electrode.

The first grid electrode and the second grid electrode may be adhered to the support structure.

The double grid electrode may be spaced from the pusher electrode by a distance of between approximately 5 mm to 6 mm.

The pusher assembly may further comprise a plurality of ring electrodes downstream of the double grid electrode.

The pusher assembly may further comprise an exit grid electrode located downstream of the plurality of ring electrodes.

The exit grid electrode may be spaced from the double grid electrode by a distance of between approximately 16 mm to 20 mm.

According to various embodiments there is provided a method of forming an electrode structure comprising two grid electrodes, the method comprising:

applying adhesive to an upper surface and a lower surface of an annular member;

winding a plurality of metal strands across and/or around the annular member so as to form two grid electrodes, one attached to the upper surface and the other attached to the lower surface;

allowing the adhesive to set and secure the metal strands in place.

The method may further comprise cutting the metal strands to form two isolated grid electrodes.

The adhesive may be conductive.

According to various embodiments there is provided an apparatus for introducing ions into a mass spectrometer, comprising:

an ion inlet device configured to introduce an analyte sample or lock mass substance into a mass spectrometer;

a control system configured to switch between introducing the analyte sample and the lock mass substance during an analytical run.

The control system may be configured to switch to introducing the lock mass substance approximately every 20-22 minutes.

The ion inlet device may be configured to introduce only one of the analyte sample and lock mass substance into a mass spectrometer at any one point in time.

The ion inlet device may comprise a single sprayer configured to introduce the analyte sample and lock mass substance into a mass spectrometer.

According to various embodiments there is provided a mass spectrometer comprising:

an apparatus as described above; and an ion attenuation device configured to attenuate ions;

wherein the control system is configured to control the attenuation device to achieve a desired number of ions per push upon analysis of the lock mass substance by the mass spectrometer.

The control system may be configured to control the attenuation device to achieve 0.45 to 0.55 ions per push, upon analysis of the lock mass substance by the mass spectrometer.

According to various embodiments there is provided a method of introducing ions into a mass spectrometer, comprising:

introducing an analyte sample into the mass spectrometer;

introducing a lock mass substance into the mass spectrometer; and switching between introducing the analyte sample and the lock mass substance into the mass spectrometer during an analytical run.

The switching may be carried out approximately every 20-22 minutes.

The method may further comprise introducing only one of the analyte sample and lock mass substance into the mass spectrometer at any one point in time.

The introducing steps may be carried out using a single sprayer configured to introduce both the analyte sample and lock mass substance into the mass spectrometer.

The method may further comprise attenuating ions that have been introduced during the step of introducing a lock mass substance into the mass spectrometer, wherein the attenuation achieves a desired number of ions per push upon analysis of the lock mass ions by the mass spectrometer. The desired number of ions per push may be 0.45 to 0.55 ions per push.

According to various embodiments a relatively small footprint or compact Time of Flight ("TOF") mass spectrometer ("MS") or analytical instrument is provided which has a relatively high resolution. The mass spectrometer may have particular application in the biopharmaceutical industry and in the field of general analytical Electrospray Ionisation ("ESI") and subsequent mass analysis. The mass spectrometer according to various embodiments is a high performance instrument wherein manufacturing costs have been reduced without compromising performance.

The instrument according to various embodiments is particularly user friendly compared with the majority of other conventional instruments. The instrument may have single button which can be activated by a user in order to turn the instrument ON and at the same time initiate an instrument self-setup routine. The instrument may, in particular, have a health diagnostics system which is both helpful for users whilst providing improved diagnosis and fault resolution.

According to various embodiments the instrument may have a health diagnostics or health check which is arranged to bring the overall instrument, and in particular the mass spectrometer and mass analyser, into a state of readiness after a period of inactivity or power saving. The same health diagnostic system may also be utilised to bring the instrument into a state of readiness after maintenance or after the instrument switches from a maintenance mode of operation into an operational state. Furthermore, the health diagnostics system may also be used to monitor the instrument, mass spectrometer or mass analyser on a periodic basis in order to ensure that the instrument in operating within defined operational parameters and hence the integrity of mass spectral or other data obtained is not compromised.

The health check system may determine various actions which either should automatically be performed or which are presented to a user to decide whether or not to proceed with. For example, the health check system may determine that no corrective action or other measure is required i.e. that the instrument is operating as expected within defined operational limits. The health check system may also determine that an automatic operation should be performed in order, for example, to correct or adjust the instrument in response to a detected error warning, error status or anomaly. The health check system may also inform the user that the user should either take a certain course of action or to give approval for the control system to take a certain course of action. Various embodiments are also contemplated wherein the health check system make seek negative approval i.e. the health check system may inform a user that a certain course of action will be taken, optionally after a defined time delay, unless the user instructs otherwise or cancels the proposed action suggested by the control system.

Embodiments are also contemplated wherein the level of detail provided to a user may vary dependent upon the level of experience of the user. For example, the health check system may provide either very detailed instructions or simplified instructions to a relatively unskilled user.

The health check system may provide a different level of detail to a highly skilled user such as a service engineer. In particular, additional data and/or instructions may be provided to a service engineer which may not be provided to a regular user. It is also contemplated that instructions given to a regular user may include icons and/or moving graphical images. For example, a user may be guided by the health check system in order to correct a fault and once it is determined that a user has completed a step then the control system may change the icon and/or moving graphical images which are displayed to the user in order to continue to guide the user through the process.

The instrument according to various embodiments has been designed to be as small as possible whilst also being generally compatible with existing UPLC systems. The instrument is easy to operate and has been designed to have a high level of reliability. Furthermore, the instrument has been designed so as to simplify diagnostic and servicing thereby minimising instrument downtime and operational costs.

According to various embodiments the instrument has particular utility in the health services market and may be integrated with Desorption Electrospray Ionisation ("DESI") and Rapid Evaporative Ionisation Mass Spectrometry ("REIMS") ion sources in order to deliver commercially available In Vitro Diagnostic Medical Device ("IVD")/Medical Device ("MD") solutions for targeted applications.

The mass spectrometer may, for example, be used for microbe identification purposes, histopathology, tissue imaging and surgical (theatre) applications.

The mass spectrometer has a significantly enhanced user experience compared with conventional mass spectrometers and has a high degree of robustness. The instrument is particularly easy to use (especially for non-expert users) and has a high level of accessibility.

The mass spectrometer has been designed to integrate easily with liquid chromatography ("LC") separation systems so that a LC-TOF MS instrument may be provided. The instrument is particularly suited for routine characterisation and monitoring applications in the biopharmaceutical industry. The instrument enables non-expert users to collect high resolution accurate mass data and to derive meaningful information from the data quickly and easily. This results in improved understanding of products and processes with the potential to shorten time to market and reduce costs.

The instrument may be used in biopharmaceutical last stage development and quality control ("QC") applications. The instrument also has particular application in small molecule pharmaceutical, food and environmental ("F&E") and chemical materials analyses. The instrument has enhanced mass detection capabilities i.e. high mass resolution, accurate mass and an extended mass range. The instrument also has the ability to fragment parent ions into daughter or fragment ions so that MS/MS type experiments may be performed.

BRIEF DESCRIPTION OF THE DRAWINGS

Various embodiments together with other arrangements given for illustrative purposes only will now be described, by way of example only, and with reference to the accompanying drawings in which:

FIG. 16F illustrates the relative voltages and absolute voltage ranges at which the various ion optical components such as the Electrospray capillary probe, differential pumping apertures, transfer lens electrodes, pusher electrodes, reflectron electrodes and the detector are maintained according to various embodiments.

DETAILED DESCRIPTION

Various aspects of a newly developed mass spectrometer are disclosed. The mass spectrometer comprises a modified and improved ion inlet assembly, a modified first ion guide, a modified quadrupole rod set ion guide, improved transfer optics, a novel cantilevered time of flight arrangement, a modified reflectron arrangement together with advanced electronics and an improved user interface.

The mass spectrometer has been designed to have a high level of performance, to be highly reliable, to offer a significantly improved user experience compared with the majority of conventional mass spectrometers, to have a very high level of EMC compliance and to have advanced safety features.

The instrument comprises a highly accurate mass analyser and overall the instrument is small and compact with a high degree of robustness. The instrument has been designed to reduce manufacturing cost without compromising performance at the same time making the instrument more reliable and easier to service. The instrument is particularly easy to use, easy to maintain and easy to service. The instrument constitutes a next-generation bench-top Time of Flight mass spectrometer.

Figure 1:
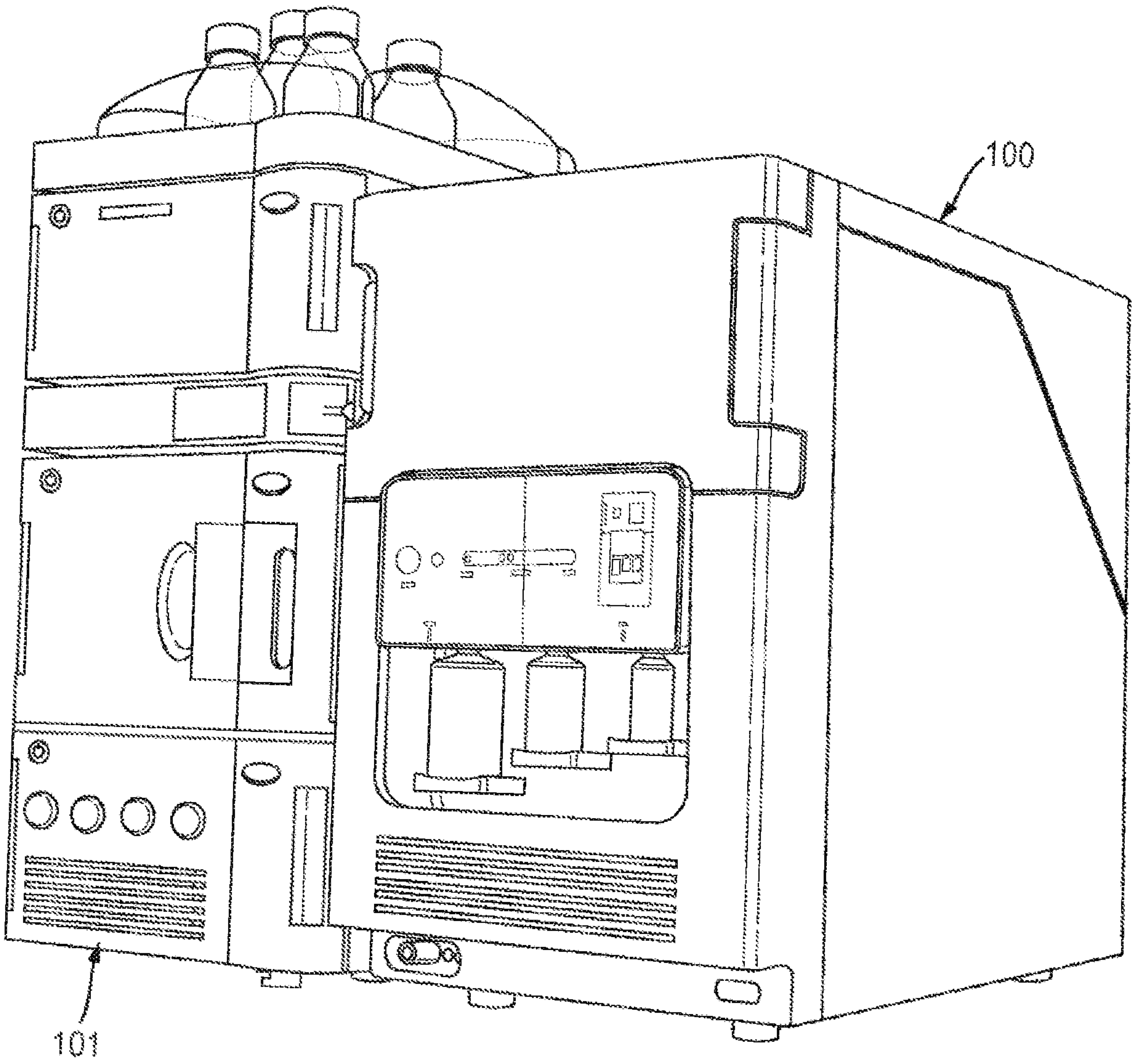
FIG. 1 shows a perspective view of a bench-top Time of Flight mass spectrometer according to various embodiments coupled to a conventional bench-top liquid chromatography ("LC") separation system.

FIG. 1 shows a bench-top mass spectrometer 100 according to various embodiments which is shown coupled to a conventional bench-top liquid chromatography separation device 101. The mass spectrometer 100 has been designed with ease of use in mind. In particular, a simplified user interface and front display is provided and instrument serviceability has been significantly improved and optimised relative to conventional instruments. The mass spectrometer 100 has an improved mechanical design with a reduced part count and benefits from a simplified manufacturing process thereby leading to a reduced cost design, improved reliability and simplified service procedures. The mass spectrometer has been designed to be highly electromagnetic compatible ("EMC") and exhibits very low electromagnetic interference ("EMI").

Figure 2A:
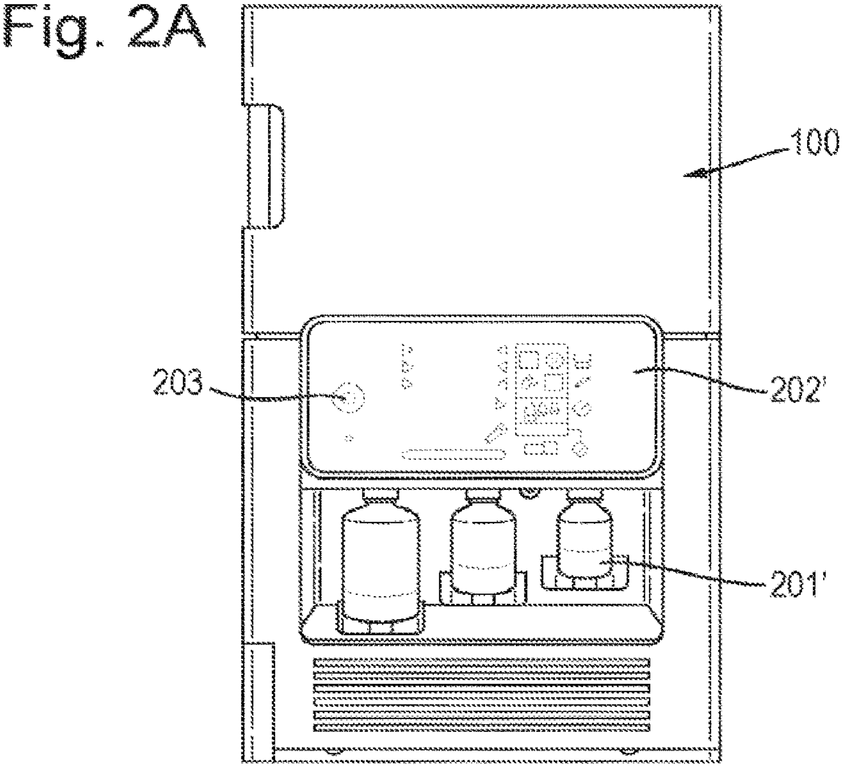
FIG. 2A shows a front view of a bench-top mass spectrometer according to various embodiments showing three solvent bottles loaded into the instrument and a front display panel.
Figure 2B:
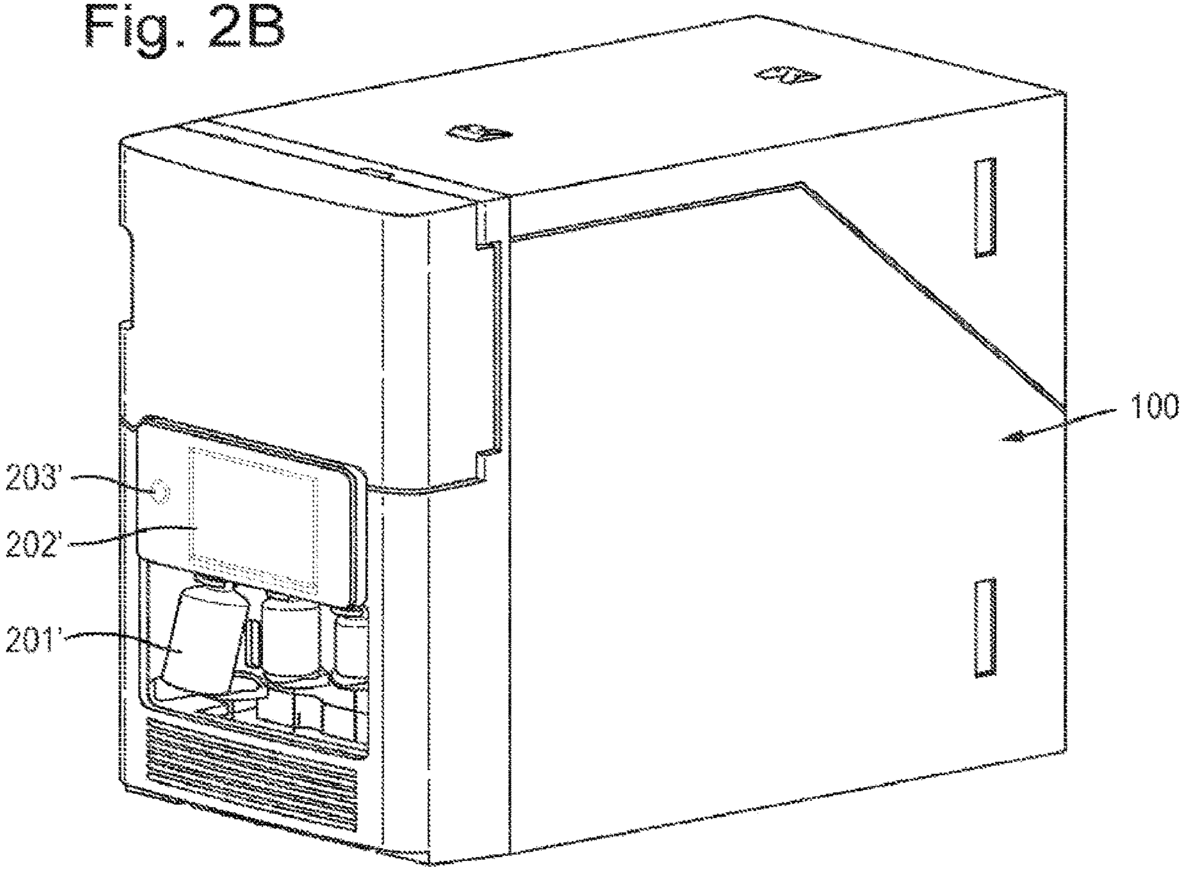
FIG. 2B shows a perspective view of a mass spectrometer according to various embodiments and FIG. 2C illustrates in more detail various icons which may be displayed on the front display panel in order to highlight the status of the instrument to a user and to indicate if a potential fault has been detected.

FIG. 2A shows a front view of the mass spectrometer 100 according to various embodiments and FIG. 2B shows a perspective view of the mass spectrometer according to various embodiments. Three solvent bottles 201' may be coupled, plugged in or otherwise connected or inserted into the mass spectrometer 100. The solvent bottles 201' may be back lit in order to highlight the fill status of the solvent bottles 201' to a user.

One problem with a known mass spectrometer having a plurality of solvent bottles is that a user may connect a solvent bottle in a wrong location or position. Furthermore, a user may mount a solvent bottle but conventional mounting mechanisms will not ensure that a label on the front of the solvent bottle will be positioned so that it can be viewed by a user i.e. conventional instruments may allow a solvent bottle to be connected where a front facing label ends up facing away from the user. Accordingly, one problem with conventional instruments is that a user may not be able to read a label on a solvent bottle due to the fact that the solvent bottle ends up being positioned with the label of the solvent bottle facing away from the user. According to various embodiments conventional screw mounts which are conventionally used to mount solvent bottles have been replaced with a resilient spring mounting mechanism which allows the solvent bottles 201' to be connected without rotation.

According to various embodiments the solvent bottles 201' may be illuminated by a LED light tile in order to indicate the fill level of the solvent bottles 201' to a user. It will be understood that a single LED illuminating a bottle will be insufficient since the fluid in a solvent bottle 201' can attenuate the light from the LED. Furthermore, there is no good single position for locating a single LED.

The mass spectrometer 100 may have a display panel 202' upon which various icons may be displayed when illuminated by the instrument control system.

A start button 203' may be positioned on or adjacent the front display panel 202'. A user may press the start button 203' which will then initiate a power-up sequence or routine. The power-up sequence or routine may comprise powering-up all instrument modules and initiating instrument pump-down i.e. generating a low pressure in each of the vacuum chambers within the body of the mass spectrometer 100.

According to various embodiments the power-up sequence or routine may or may not include running a source pressure test and switching the instrument into an Operate mode of operation.

According to various embodiments a user may hold the start button 203' for a period of time, e.g. 5 seconds, in order to initiate a power-down sequence.

If the instrument is in a maintenance mode of operation then pressing the start button 203' on the front panel of the instrument may initiate a power-up sequence. Furthermore, when the instrument is in a maintenance mode of operation then holding the start button 203' on the front panel of the instrument for a period of time, e.g. 5 seconds, may initiate a power-down sequence.

Figure 2C:
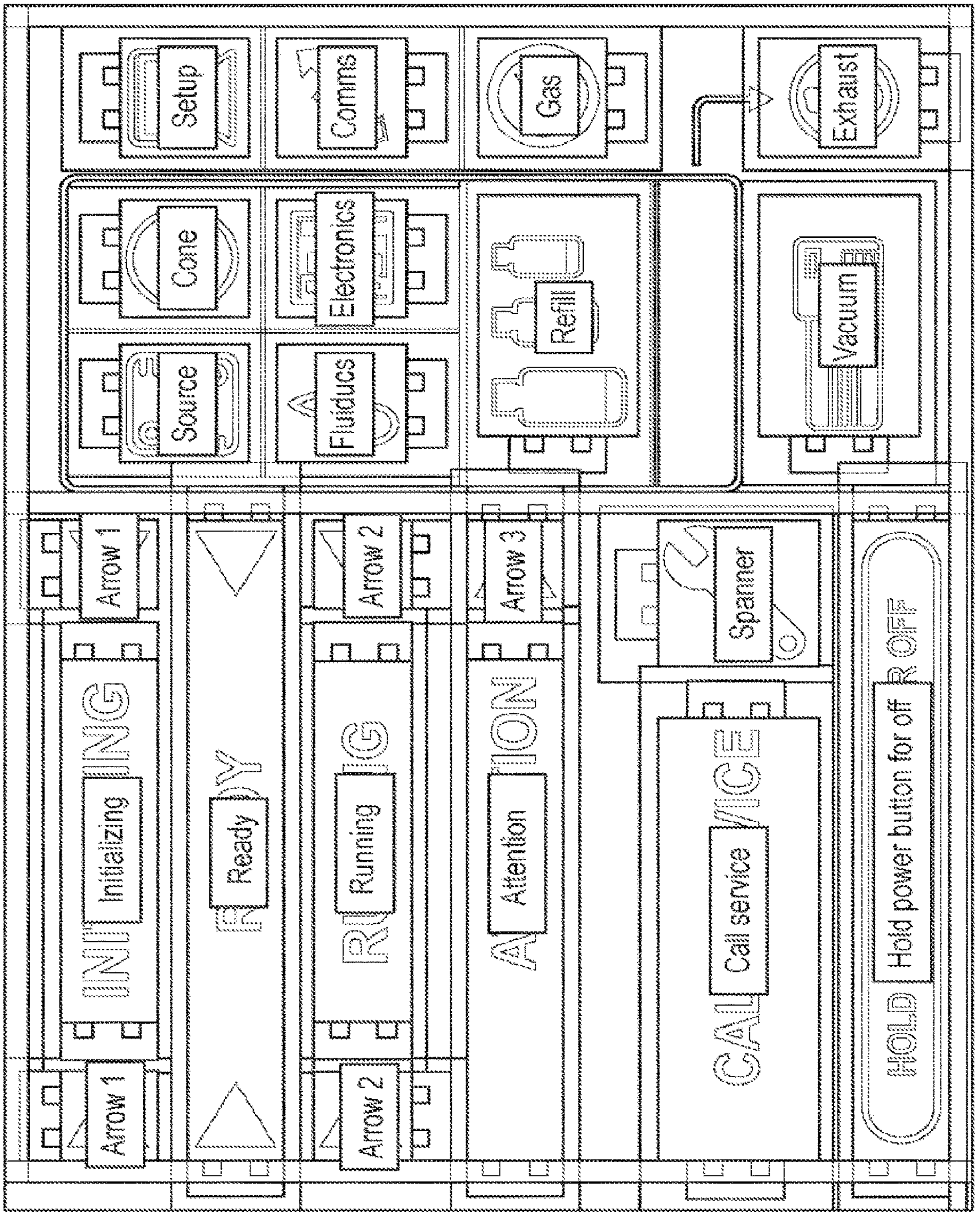

FIG. 2C illustrates in greater detail various icons which may be displayed on the display panel 202' and which may illuminated under the control of instrument hardware and/or software. According to various embodiments one side of the display panel 202' (e.g. the left-hand side) may have various icons which generally relate to the status of the instrument or mass spectrometer 100. For example, icons may be displayed in the colour green to indicate that the instrument is in an initialisation mode of operation, a ready mode of operation or a running mode of operation.

In the event of a detected error which may require user interaction or user input a yellow or amber warning message may be displayed. A yellow or amber warning message or icon may be displayed on the display panel 202' and may convey only relatively general information to a user e.g. indicating that there is a potential fault and a general indication of what component or aspect of the instrument may be at fault.

According to various embodiments it may be necessary for a user to refer to an associated computer display or monitor in order to get fuller details or gain a fuller appreciation of the nature of the fault and to receive details of potential corrective action which is recommended to perform in order to correct the fault or to place the instrument in a desired operational state.

A user may be invited to confirm that a corrective action should be performed and/or a user may be informed that a certain corrective action is being performed.

In the event of a detected error which cannot be readily corrected by a user and which instead requires the services of a skilled service engineer then a warning message may be displayed indicating that a service engineer needs to be called. A warning message indicating the need for a service engineer may be displayed in the colour red and a spanner or other icon may also be displayed or illuminated to indicate to a user that an engineer is required.

The display panel 202' may also display a message that the power button 203' should be pressed in order to turn the instrument OFF.

According to an embodiment one side of the display panel 202' (e.g. the right-hand side) may have various icons which indicate different components or modules of the instrument where an error or fault has been detected. For example, a yellow or amber icon may be displayed or illuminated in order to indicate an error or fault with the ion source, a fault in the inlet cone region, a fault with the fluidic systems, an electronics fault, a fault with one or more of the solvent or other bottles 201' (i.e. indicating that one or more solvent bottles 201' needing to be refilled or emptied), a vacuum pressure fault associated with one or more of the vacuum chambers, an instrument setup error, a communication error, a problem with a gas supply or a problem with an exhaust.

It will be understood that the display panel 202' may merely indicate the general status of the instrument and/or the general nature of a fault. In order to be able to resolve the fault or to understand the exact nature of an error or fault a user may need to refer to the display screen of an associated computer or other device. For example, as will be understood by those skilled in the art an associated computer or other device may be arranged to receive and process mass spectral and other data output from the instrument or mass spectrometer 100 and may display mass spectral data or images on a computer display screen for the benefit of a user.

According to various embodiments the status display may indicate whether the instrument is in one of the following states namely Running, Ready, Getting Ready, Ready Blocked or Error.

The status display may display health check indicators such as Service Required, Cone, Source, Set-up, Vacuum, Communications, Fluidics, Gas, Exhaust, Electronics, Lockmass, Calibrant and Wash.

A "Hold power button for OFF" LED tile is shown in FIG. 2C and may remain illuminated when the power button 203' is pressed and may remain illuminated until the power button 203' is released or until a period of time (e.g. 5 seconds) has elapsed whichever is sooner. If the power button 203' is released before the set period of time (e.g. less than 5 seconds after it is pressed) then the "Hold power button for OFF" LED tile may fade out over a time period of e.g. 2 s.

The initialising LED tile may be illuminated when the instrument is started via the power button 203' and may remain ON until software assumes control of the status panel or until a power-up sequence or routine times out.

According to various embodiments an instrument health check may be performed and printer style error correction instructions may be provided to a user via a display screen of a computer monitor (which may be separate to the front display panel 202') in order to help guide a user through any steps that the user may need to perform.

The instrument may attempt to self-diagnose any error messages or warning status alert(s) and may attempt to rectify any problem(s) either with or without notifying the user.

Depending upon the severity of any problem the instrument control system may either attempt to correct the problem(s) itself, request the user to carry out some form of intervention in order to attempt to correct the issue or problem(s) or may inform the user that the instrument requires a service engineer.

In the event where corrective action may be taken by a user then the instrument may display instructions for the user to follow and may provide details of methods or steps that should be performed which may allow the user to fix or otherwise resolve the problem or error. A resolve button may be provided on a display screen which may be pressed by a user having followed the suggested resolution instructions. The instrument may then run a test again and/or may check if the issue has indeed been corrected. For example, if a user were to trigger an interlock then once the interlock is closed a pressure test routine may be initialised as detailed below.

Figure 3:
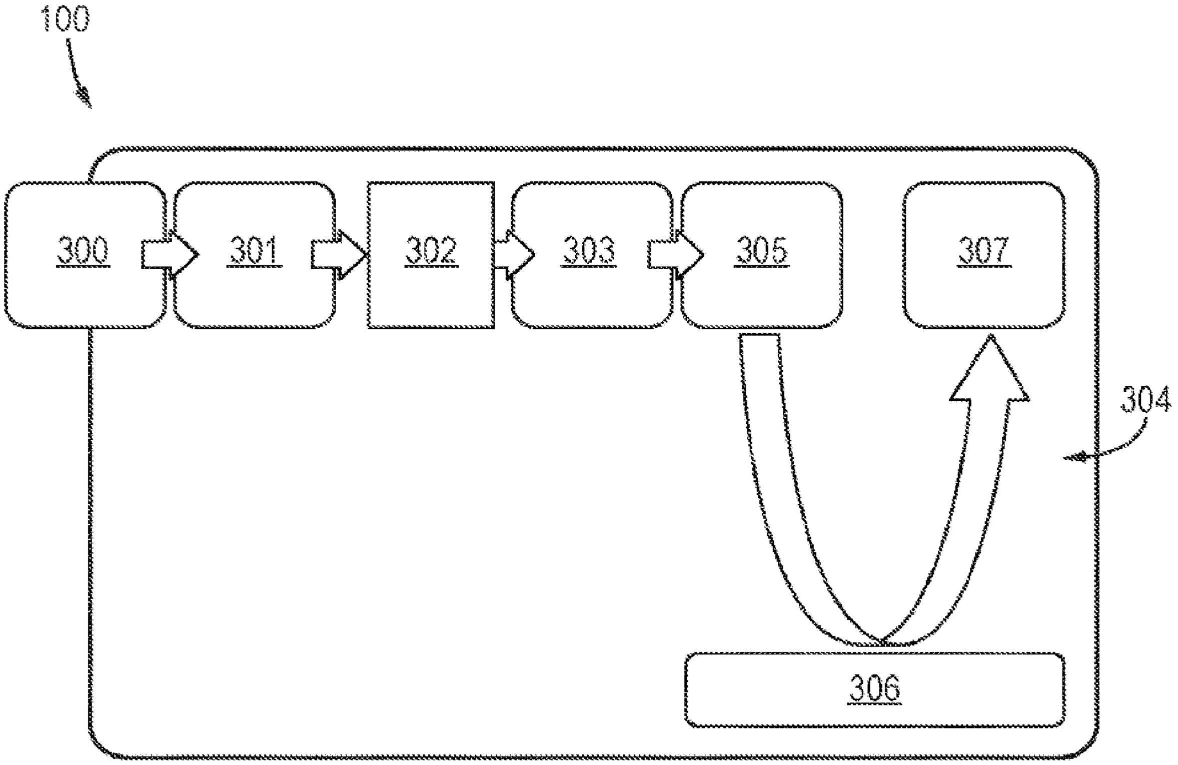
FIG. 3 shows a schematic representation of mass spectrometer according to various embodiments, wherein the instrument comprises an Electrospray Ionisation ("ESI") or other ion source, a conjoined ring ion guide, a segmented quadrupole rod set ion guide, one or more transfer lenses and a Time of Flight mass analyser comprising a pusher electrode, a reflectron and an ion detector.

FIG. 3 shows a high level schematic of the mass spectrometer 100 according to various embodiments wherein the instrument may comprise an ion source 300, such as an Electrospray Ionisation ("ESI") ion source. However, it should be understood that the use of an Electrospray Ionisation ion source 300 is not essential and that according to other embodiments a different type of ion source may be used. For example, according to various embodiments a Desorption Electrospray Ionisation ("DESI") ion source may be used. According to yet further embodiments a Rapid Evaporative Ionisation Mass Spectrometry ("REIMS") ion source may be used.

If an Electrospray ion source 300 is provided then the ion source 300 may comprise an Electrospray probe and associated power supply.

Figure 6A:
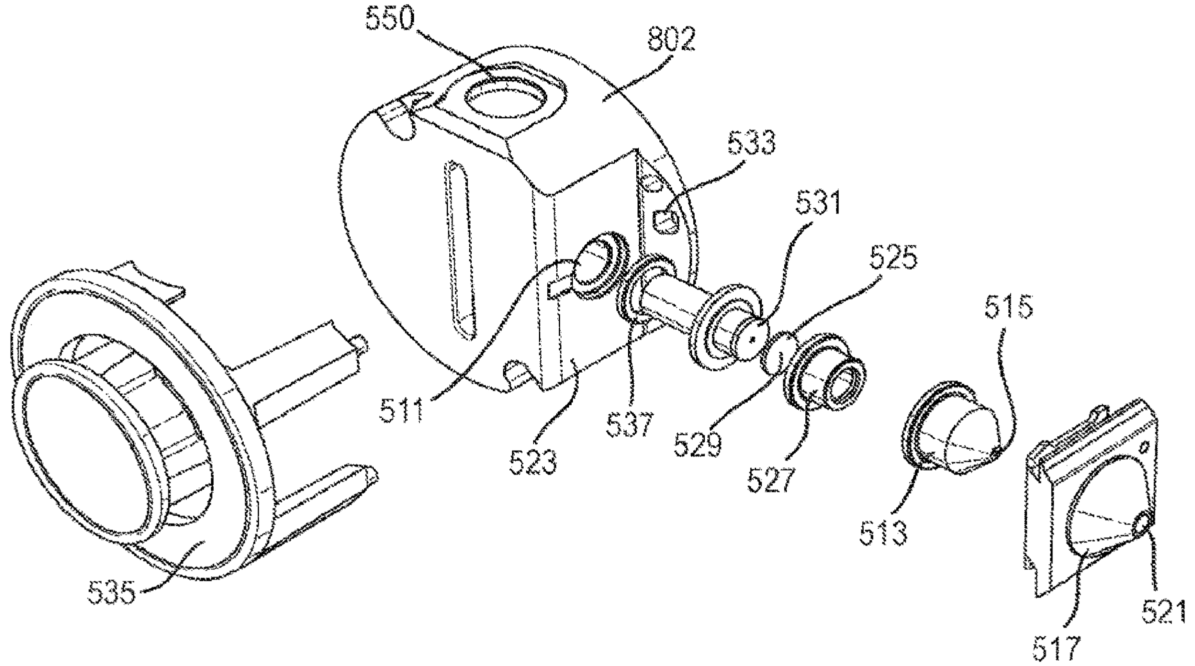
Fig. 6A Prior art
FIG. 6A shows an exploded view of the first known ion inlet assembly.
Figure 6B:
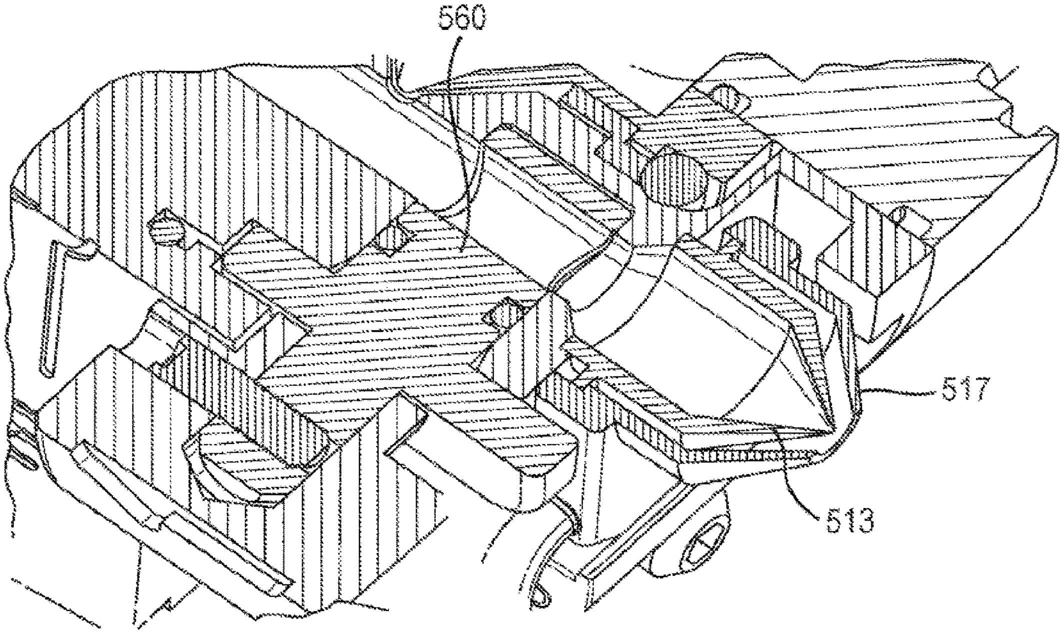
Fig. 6B Prior art
FIG. 6B shows a second different known ion inlet assembly having an isolation valve.
Figure 6C:
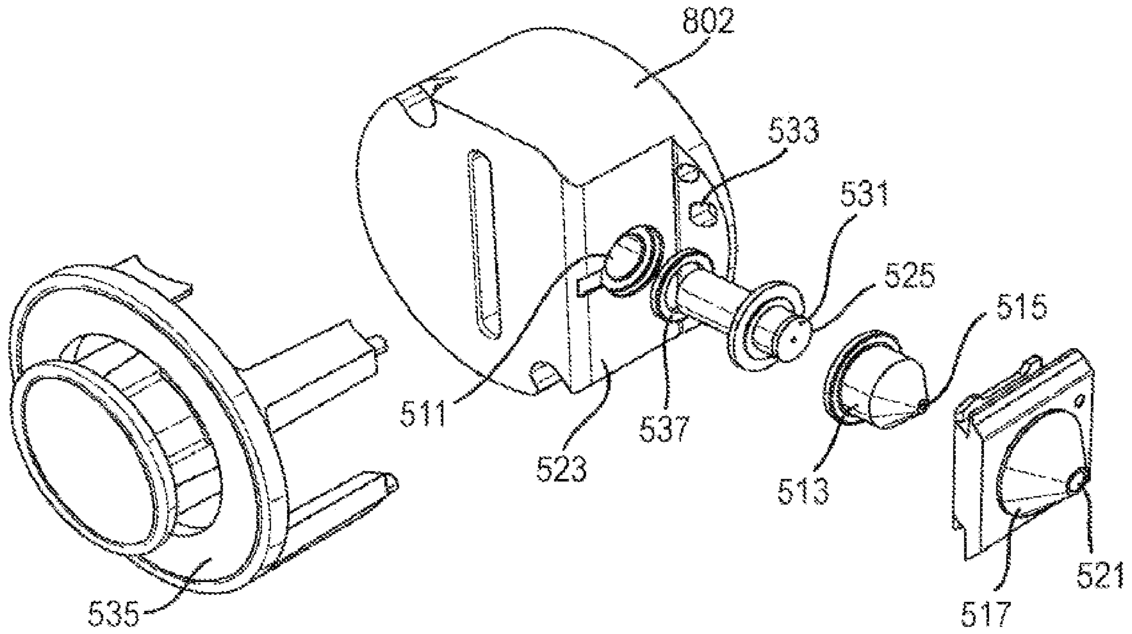
FIG. 6C shows an exploded view of an ion inlet assembly according to various embodiments.

The initial stage of the associated mass spectrometer 100 comprises an ion block 802 (as shown in FIG. 6C) and a source enclosure may be provided if an Electrospray Ionisation ion source 300 is provided.

If a Desorption Electrospray Ionisation ("DESI") ion source is provided then the ion source may comprise a DESI source, a DESI sprayer and an associated DESI power supply. The initial stage of the associated mass spectrometer may comprise an ion block 802 as shown in more detail in FIG. 6C. However, according to various embodiments if a DESI source is provided then the ion block 802 may not enclosed by a source enclosure.

It will be understood that a REIMS source involves the transfer of analyte, smoke, fumes, liquid, gas, surgical smoke, aerosol or vapour produced from a sample which may comprise a tissue sample. In some embodiments, the REIMS source may be arranged and adapted to aspirate the analyte, smoke, fumes, liquid, gas, surgical smoke, aerosol or vapour in a substantially pulsed manner. The REIMS source may be arranged and adapted to aspirate the analyte, smoke, fumes, liquid, gas, surgical smoke, aerosol or vapour substantially only when an electrosurgical cutting applied voltage or potential is supplied to one or more electrodes, one or more electrosurgical tips or one or more laser or other cutting devices.

The mass spectrometer 100 may be arranged so as to be capable of obtaining ion images of a sample. For example, according to various embodiments mass spectral and/or other physico-chemical data may be obtained as a function of position across a portion of a sample. Accordingly, a determination can be made as to how the nature of the sample may vary as a function of position along, across or within the sample.

The mass spectrometer 100 may comprise a first ion guide 301 such as a StepWave® ion guide 301 having a plurality of ring and conjoined ring electrodes. The mass spectrometer 100 may further comprise a segmented quadrupole rod set ion guide 302, one or more transfer lenses 303 and a Time of Flight mass analyser 304. The quadrupole rod set ion guide 302 may be operated in an ion guiding mode of operation and/or in a mass filtering mode of operation. The Time of Flight mass analyser 304 may comprise a linear acceleration Time of Flight region or an orthogonal acceleration Time of Flight mass analyser.

If the Time of Flight mass analyser comprises an orthogonal acceleration Time of Flight mass analyser 304 then the mass analyser 304 may comprise a pusher electrode 305, a reflectron 306 and an ion detector 307. The ion detector 307 may be arranged to detect ions which have been reflected by the reflectron 306. It should be understood, however, that the provision of a reflectron 306 though desirable is not essential.

According to various embodiments the first ion guide 301 may be provided downstream of an atmospheric pressure interface. The atmospheric pressure interface may comprises an ion inlet assembly.

The first ion guide 301 may be located in a first vacuum chamber or first differential pumping region.

The first ion guide 301 may comprise a part ring, part conjoined ring ion guide assembly wherein ions may be transferred in a generally radial direction from a first ion path formed within a first plurality of ring or conjoined ring electrodes into a second ion path formed by a second plurality of ring or conjoined ring electrodes. The first and second plurality of ring electrodes may be conjoined along at least a portion of their length. Ions may be radially confined within the first and second plurality of ring electrodes.

The second ion path may be aligned with a differential pumping aperture which may lead into a second vacuum chamber or second differential pumping region.

The first ion guide 301 may be utilised to separate charged analyte ions from unwanted neutral particles. The unwanted neutral particles may be arranged to flow towards an exhaust port whereas analyte ions are directed on to a different flow path and are arranged to be optimally transmitted through a differential pumping aperture into an adjacent downstream vacuum chamber.

It is also contemplated that according to various embodiments ions may in a mode of operation be fragmented within the first ion guide 301. In particular, the mass spectrometer 100 may be operated in a mode of operation wherein the gas pressure in the vacuum chamber housing the first ion guide 301 is maintained such that when a voltage supply causes ions to be accelerated into or along the first ion guide 301 then the ions may be arranged to collide with background gas in the vacuum chamber and to fragment to form fragment, daughter or product ions. According to various embodiments a static DC voltage gradient may be maintained along at least a portion of the first ion guide 301 in order to urge ions along and through the first ion guide 301 and optionally to cause ions in a mode of operation to fragment.

However, it should be understood that it is not essential that the mass spectrometer 100 is arranged so as to be capable of performing ion fragmentation in the first ion guide 301 in a mode of operation.

The mass spectrometer 100 may comprise a second ion guide 302 downstream of the first ion guide 302 and the second ion guide 302 may be located in the second vacuum chamber or second differential pumping region.

The second ion guide 302 may comprise a segmented quadrupole rod set ion guide or mass filter 302. However, other embodiments are contemplated wherein the second ion guide 302 may comprise a quadrupole ion guide, a hexapole ion guide, an octopole ion guide, a multipole ion guide, a segmented multipole ion guide, an ion funnel ion guide, an ion tunnel ion guide (e.g. comprising a plurality of ring electrodes each having an aperture through which ions may pass or otherwise forming an ion guiding region) or a conjoined ring ion guide.

The mass spectrometer 100 may comprise one or more transfer lenses 303 located downstream of the second ion guide 302. One of more of the transfer lenses 303 may be located in a third vacuum chamber or third differential pumping region. Ions may be passed through a further differential pumping aperture into a fourth vacuum chamber or fourth differential pumping region. One or more transfer lenses 303 may also be located in the fourth vacuum chamber or fourth differential pumping region.

The mass spectrometer 100 may comprise a mass analyser 304 located downstream of the one or more transfer lenses 303 and may be located, for example, in the fourth or further vacuum chamber or fourth or further differential pumping region. The mass analyser 304 may comprise a Time of Flight ("TOF") mass analyser. The Time of Flight mass analyser 304 may comprise a linear or an orthogonal acceleration Time of Flight mass analyser.

According to various embodiments an orthogonal acceleration Time of Flight mass analyser 304 may be provided comprising one or more orthogonal acceleration pusher electrode(s) 305 (or alternatively and/or additionally one or more puller electrode(s)) and an ion detector 307 separated by a field free drift region. The Time of Flight mass analyser 304 may optionally comprise one or more reflectrons 306 intermediate the pusher electrode 305 and the ion detector 307.

Although highly desirable, it should be recognised that the mass analyser does not have to comprise a Time of Flight mass analyser 304. More generally, the mass analyser 304 may comprise either: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; or (xiv) a linear acceleration Time of Flight mass analyser.

Although not shown in FIG. 3, the mass spectrometer 100 may also comprise one or more optional further devices or stages. For example, according to various embodiments the mass spectrometer 100 may additionally comprise one or more ion mobility separation devices and/or one or more Field Asymmetric Ion Mobility Spectrometer ("FAIMS") devices and/or one or more devices for separating ions temporally and/or spatially according to one or more physico-chemical properties. For example, the mass spectrometer 100 according to various embodiments may comprise one or more separation stages for temporally or otherwise separating ions according to their mass, collision cross section, conformation, ion mobility, differential ion mobility or another physico-chemical parameter.

The mass spectrometer 100 may comprise one or more discrete ion traps or one or more ion trapping regions. However, as will be described in more detail below, an axial trapping voltage may be applied to one or more sections or one or more electrodes of either the first ion guide 301 and/or the second ion guide 302 in order to confine ions axially for a short period of time. For example, ions may be trapped or confined axially for a period of time and then released. The ions may be released in a synchronised manner with a downstream ion optical component. For example, in order to enhance the duty cycle of analyte ions of interest, an axial trapping voltage may be applied to the last electrode or stage of the second ion guide 302. The axial trapping voltage may then be removed and the application of a voltage pulse to the pusher electrode 305 of the Time of Flight mass analyser 304 may be synchronised with the pulsed release of ions so as to increase the duty cycle of analyte ions of interest which are then subsequently mass analysed by the mass analyser 304. This approach may be referred to as an Enhanced Duty Cycle ("EDC") mode of operation.

Furthermore, the mass spectrometer 100 may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The mass spectrometer 100 may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The fourth or further vacuum chamber or fourth or further differential pumping region may be maintained at a lower pressure than the third vacuum chamber or third differential pumping region. The third vacuum chamber or third differential pumping region may be maintained at a lower pressure than the second vacuum chamber or second differential pumping region and the second vacuum chamber or second differential pumping region may be maintained at a lower pressure than the first vacuum chamber or first differential pumping region. The first vacuum chamber or first differential pumping region may be maintained at lower pressure than ambient. Ambient pressure may be considered to be approx. 1013 mbar at sea level.

The mass spectrometer 100 may comprise an ion source configured to generate analyte ions. In various particular embodiments, the ion source may comprise an Atmospheric Pressure Ionisation ("API") ion source such as an Electrospray Ionisation ("ESI") ion source or an Atmospheric Pressure Chemical Ionisation ("APCI") ion source.

Figure 4:
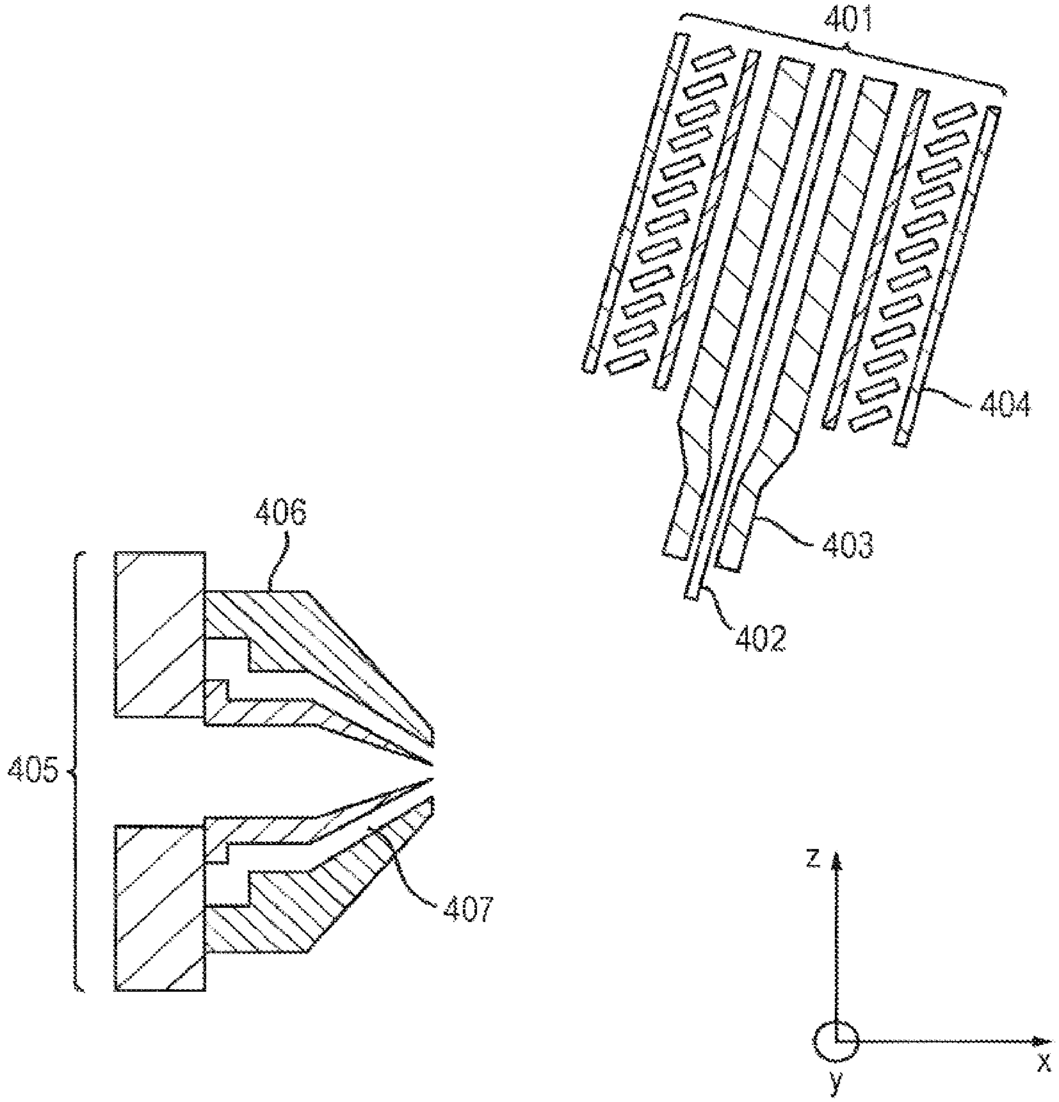
Fig. 4 Prior art
FIG. 4 shows a known Atmospheric Pressure Ionisation ("API") ion source which may be used with the mass spectrometer according to various embodiments.

FIG. 4 shows in general form a known Atmospheric Pressure Ionisation ("API") ion source such as an Electrospray Ionisation ("ESI") ion source or an Atmospheric Pressure Chemical Ionisation ("APCI") ion source. The ion source may comprise, for example, an Electrospray Ionisation probe 401 which may comprise an inner capillary tube 402 through which an analyte liquid may be supplied. The analyte liquid may comprise mobile phase from a LC column or an infusion pump. The analyte liquid enters via the inner capillary tube 402 or probe and is pneumatically converted to an electrostatically charged aerosol spray. Solvent is evaporated from the spray by means of heated desolvation gas. Desolvation gas may be provided through an annulus which surrounds both the inner capillary tube 402 and an intermediate surrounding nebuliser tube 403 through which a nebuliser gas emerges. The desolvation gas may be heated by an annular electrical desolvation heater 404. The resulting analyte and solvent ions are then directed towards a sample or sampling cone aperture mounted into an ion block 405 forming an initial stage of the mass spectrometer 100.

The inner capillary tube 402 is preferably surrounded by a nebuliser tube 403. The emitting end of the inner capillary tube 402 may protrude beyond the nebuliser tube 403. The inner capillary tube 402 and the nebuliser tube 403 may be surrounded by a desolvation heater arrangement 404 as shown in FIG. 4 wherein the desolvation heater 404 may be arranged to heat a desolvation gas. The desolvation heater 404 may be arranged to heat a desolvation gas from ambient temperature up to a temperature of around 600° C. According to various embodiments the desolvation heater 404 is always OFF when the API gas is OFF.

The desolvation gas and the nebuliser gas may comprise nitrogen, air or another gas or mixture of gases. The same gas (e.g. nitrogen, air or another gas or mixture of gases) may be used as both a desolvation gas, nebuliser gas and cone gas. The function of the cone gas will be described in more detail below.

The inner probe capillary 402 may be readily replaced by an unskilled user without needing to use any tools. The Electrospray probe 402 may support LC flow rates in the range of 0.3 to 1.0 mL/min.

According to various embodiments an optical detector may be used in series with the mass spectrometer 100. It will be understood that an optical detector may have a maximum pressure capability of approx. 1000 psi. Accordingly, the Electrospray Ionisation probe 401 may be arranged so as not to cause a back pressure of greater than around 500 psi, allowing for back pressure caused by other system components. The instrument may be arranged so that a flow of 50:50 methanol/water at 1.0 mL/min does not create a backpressure greater than 500 psi.

According to various embodiments a nebuliser flow rate of between 106 to 159 L/hour may be utilised.

The ESI probe 401 may be powered by a power supply which may have an operating range of 0.3 to 1.5 kV.

It should, however, be understood that various other different types of ion source may instead be coupled to the mass spectrometer 100. For example, according to various embodiments, the ion source may more generally comprise either: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; or (xxx) a Low Temperature Plasma ("LTP") ion source.

A chromatography or other separation device may be provided upstream of the ion source 300 and may be coupled so as to provide an effluent to the ion source 300. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer 100 may comprise an atmospheric pressure interface or ion inlet assembly downstream of the ion source 300. According to various embodiments the atmospheric pressure interface may comprise a sample or sampling cone 406,407 which is located downstream of the ion source 401. Analyte ions generated by the ion source 401 may pass via the sample or sampling cone 406,407 into or onwards towards a first vacuum chamber or first differential pumping region of the mass spectrometer 100. However, according to other embodiments the atmospheric pressure interface may comprise a capillary interface.

As shown in FIG. 4, ions generated by the ion source 401 may be directed towards an atmospheric pressure interface which may comprise an outer gas cone 406 and an inner sample cone 407. A cone gas may be supplied to an annular region between the inner sample cone 407 and the outer gas cone 406. The cone gas may emerge from the annulus in a direction which is generally opposed to the direction of ion travel into the mass spectrometer 100. The cone gas may act as a declustering gas which effectively pushes away large contaminants thereby preventing large contaminants from impacting upon the outer cone 406 and/or inner cone 407 and also preventing the large contaminants from entering into the initial vacuum stage of the mass spectrometer 100.

Figure 5:
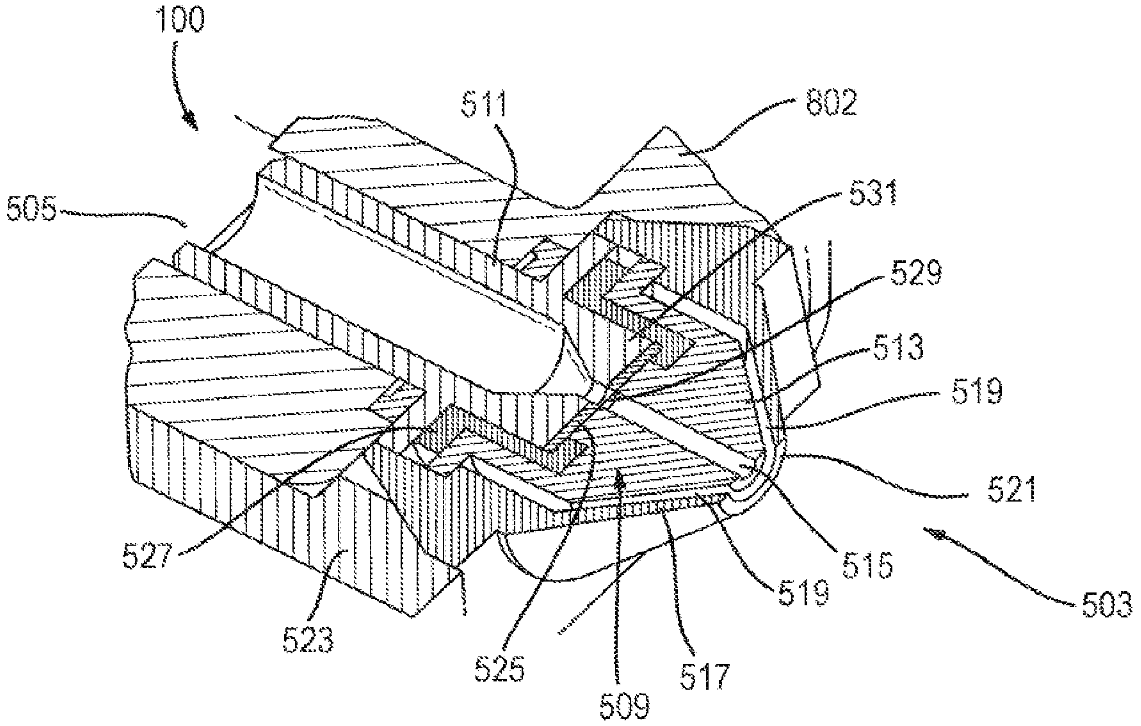
Fig. 5 Prior art
FIG. 5 shows a first known ion inlet assembly which shares features with an ion inlet assembly according to various embodiments.

FIG. 5 shows in more detail a first known ion inlet assembly which is similar to an ion inlet assembly according to various embodiments. The known ion inlet assembly as shown and described below with reference to FIGS. 5 and 6A is presented in order to highlight various aspects of an ion inlet assembly according to various embodiments and also so that differences between an ion inlet assembly according to various embodiments as shown and discussed below with reference to FIG. 6C can be fully appreciated.

With reference to FIG. 5, it will be understood that the ion source (not shown) generates analyte ions which are directed towards a vacuum chamber 505 of the mass spectrometer 100.

A gas cone assembly is provided comprising an inner gas cone or sampling cone 513 having an aperture 515 and an outer gas cone 517 having an aperture 521. A disposable disc 525 is arranged beneath or downstream of the inner gas cone or sampling 513 and is held in position by a mounting element 527. The disc 525 covers an aperture 511 of the vacuum chamber 505. The disc 525 is removably held in position by the inner gas cone 513 resting upon the mounting element 527.

As will be discussed in more detail below with reference to FIG. 6C, according to various embodiments the mounting element 527 is not provided in the preferred ion inlet assembly.

The disc 525 has an aperture or sampling orifice 529 through which ions can pass.

A carrier 531 is arranged underneath or below the disc 525. The carrier 531 is arranged to cover the aperture 511 of the vacuum chamber 505. Upon removal of the disc 525, the carrier 531 may remain in place due to suction pressure.

FIG. 6A shows an exploded view of the first known ion inlet assembly. The outer gas cone 517 has a cone aperture 521 and is slidably mounted within a clamp 535. The clamp 535 allows a user to remove the outer gas cone 517 without physically having to touch the outer gas cone 517 which will get hot during use.

An inner gas cone or sampling cone 513 is shown mounted behind or below the outer gas cone 517.

The known arrangement utilises a carrier 531 which has a 1 mm diameter aperture. The ion block 802 is also shown having a calibration port 550. However, the calibration port 550 is not provided in an ion inlet assembly according to various embodiments.

FIG. 6B shows an second different known ion inlet assembly as used on a different instrument which has an isolation valve 560 which is required to hold vacuum pressure when the outer cone gas nozzle 517 and the inner nozzle 513 are removed for servicing. The inner cone 513 has a gas limiting orifice into the subsequent stages of the mass spectrometer. The inner gas cone 513 comprises a high cost, highly precisioned part which requires routine removal and cleaning. The inner gas cone 513 is not a disposable or consumable item. Prior to removing the inner sampling cone 513 the isolation valve 560 must be rotated into a closed position in order to isolate the downstream vacuum stages of the mass spectrometer from atmospheric pressure. The isolation valve 560 is therefore required in order to hold vacuum pressure whilst the inner gas sampling cone 513 is removed for cleaning.

FIG. 6C shows an exploded view of an ion inlet assembly according to various embodiments. The ion inlet assembly according to various embodiments is generally similar to the first known ion inlet assembly as shown and described above with reference to FIGS. 5 and 6A except for a few differences. One difference is that a calibration port 550 is not provided in the ion block 802 and a mounting member or mounting element 527 is not provided.

Accordingly, the ion block 802 and ion inlet assembly have been simplified. Furthermore, importantly the disc 525 may comprise a 0.25 or 0.30 mm diameter aperture disc 525 which is substantially smaller diameter than conventional arrangements.

According to various embodiments both the disc 525 and the vacuum holding member or carrier 531 may have a substantially smaller diameter aperture than conventional arrangements such as the first known arrangement as shown and described above with reference to FIGS. 5 and 6A.

For example, the first known instrument utilises a vacuum holding member or carrier 531 which has a 1 mm diameter aperture. In contrast, according to various embodiments the vacuum holding member or carrier 531 according to various embodiments may have a much smaller diameter aperture e.g. a 0.3 mm or 0.40 mm diameter aperture.

Figure 6D:
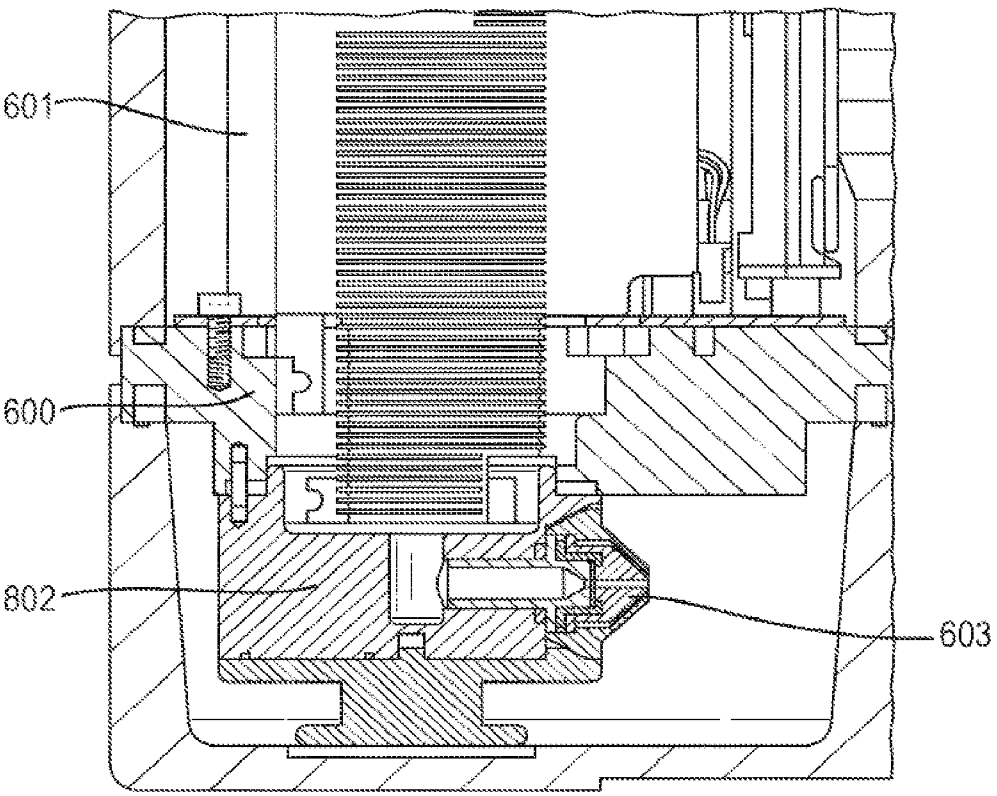
FIG. 6D shows the arrangement of an ion block attached to a pumping block upstream of a vacuum chamber housing a first ion guide according to various embodiments.

FIG. 6D shows in more detail how the ion block assembly 802 according to various embodiments may be enclosed in an atmospheric pressure source or housing. The ion block assembly 802 may be mounted to a pumping block or thermal interface 600. Ions pass through the ion block assembly 802 and then through the pumping block or thermal interface 600 into a first vacuum chamber 601 of the mass spectrometer 100. The first vacuum chamber 601 preferably houses the first ion guide 301 which as shown in FIG. 6D and which may comprise a conjoined ring ion guide 301. FIG. 6D also indicates how ion entry 603 into the mass spectrometer 100 also represents a potential leak path. A correct pressure balance is required between the diameters of the various gas flow restriction apertures in the ion inlet assembly with the configuration of the vacuum pumping system.

Figure 6E:
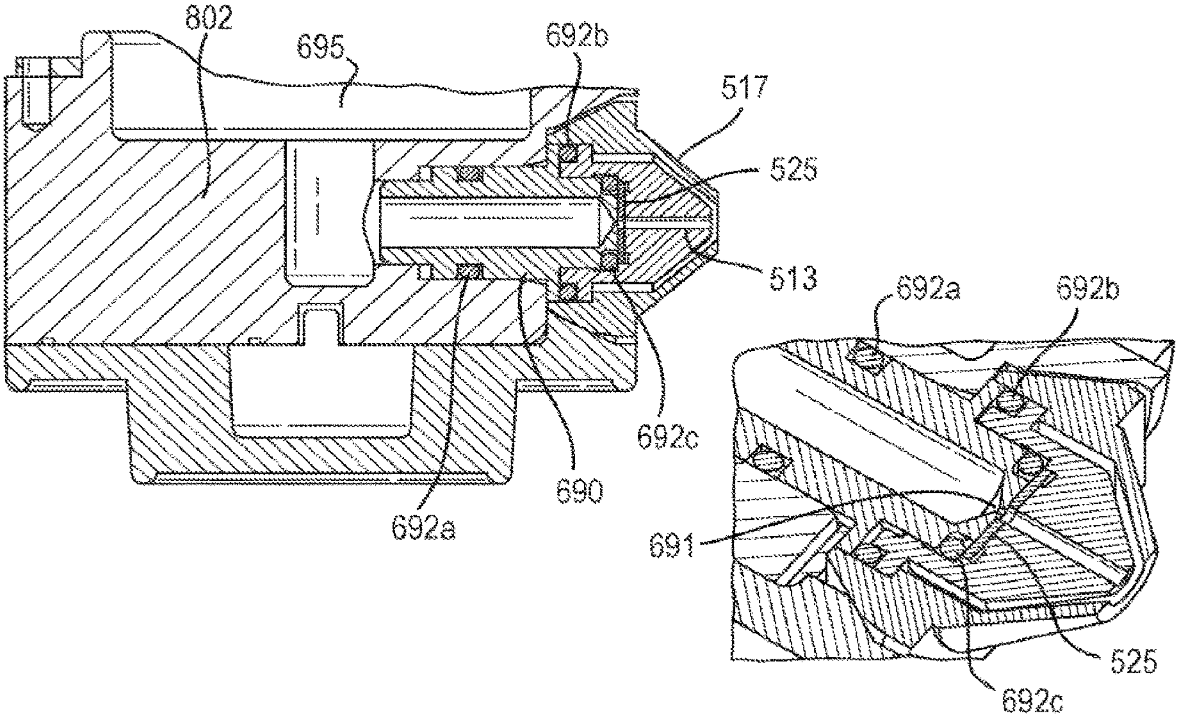
FIG. 6E shows in more detail a fixed valve assembly which is retained within an ion block according to various embodiments.

FIG. 6E shows the ion inlet assembly according to various embodiments and illustrates how ions pass through an outer gas cone 517 and an inner gas cone or sampling cone 513 before passing through an apertured disc 525. No mounting member or mounting element is provided unlike the first known ion inlet assembly as described above.

The ions then pass through an aperture in a fixed valve 690. The fixed valve 690 is held in place by suction pressure and is not removable by a user in normal operation. Three O-ring vacuum seals 692*a*,692*b*,692*c* are shown. The fixed valve 690 may be formed from stainless steel. A vacuum region 695 of the mass spectrometer 100 is generally indicated.

Figure 6F:
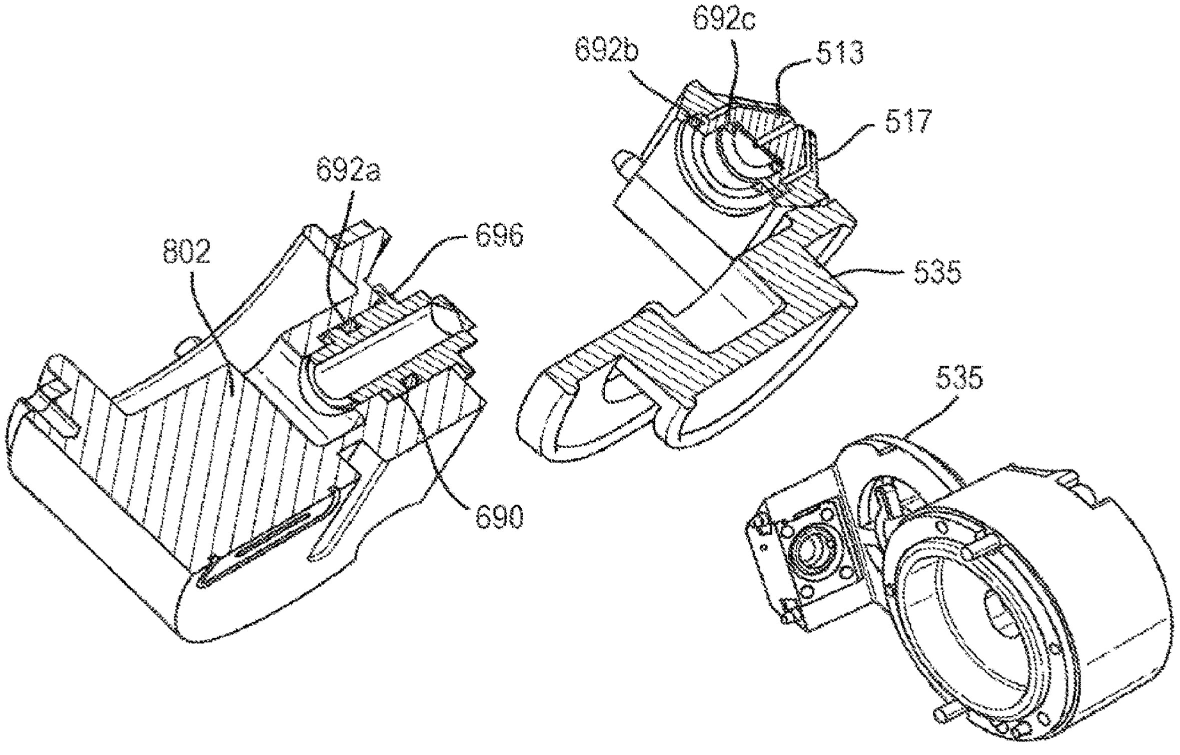
FIG. 6F shows the removal by a user of a cone assembly attached to a clamp to expose a fixed valve having a gas flow restriction aperture which is sufficient to maintain the low pressure within a downstream vacuum chamber when the cone is removed and FIG. 6G illustrates how the fixed valve may be retained in position by suction pressure according to various embodiments.

FIG. 6F shows the outer cone 517, inner sampling cone 513 and apertured disc 525 having been removed by a user by withdrawing or removing a clamp 535 to which at least the outer cone 517 is slidably inserted. According to various embodiments the inner sampling cone 513 may also be attached or secured to the outer cone 517 so that both are removed at the same time.

Instead of utilising a conventional rotatable isolation valve, a fixed non-rotatable valve 690 is provided or otherwise retained in the ion block 802. An O-ring seal 692*a* is shown which ensures that a vacuum seal is provided between the exterior body of the fixed valve 690 and the ion block 802. An ion block voltage contact 696 is also shown. O-rings seals 692*b*,692*c* for the inner and outer cones 513,517 are also shown.

Figure 6G:
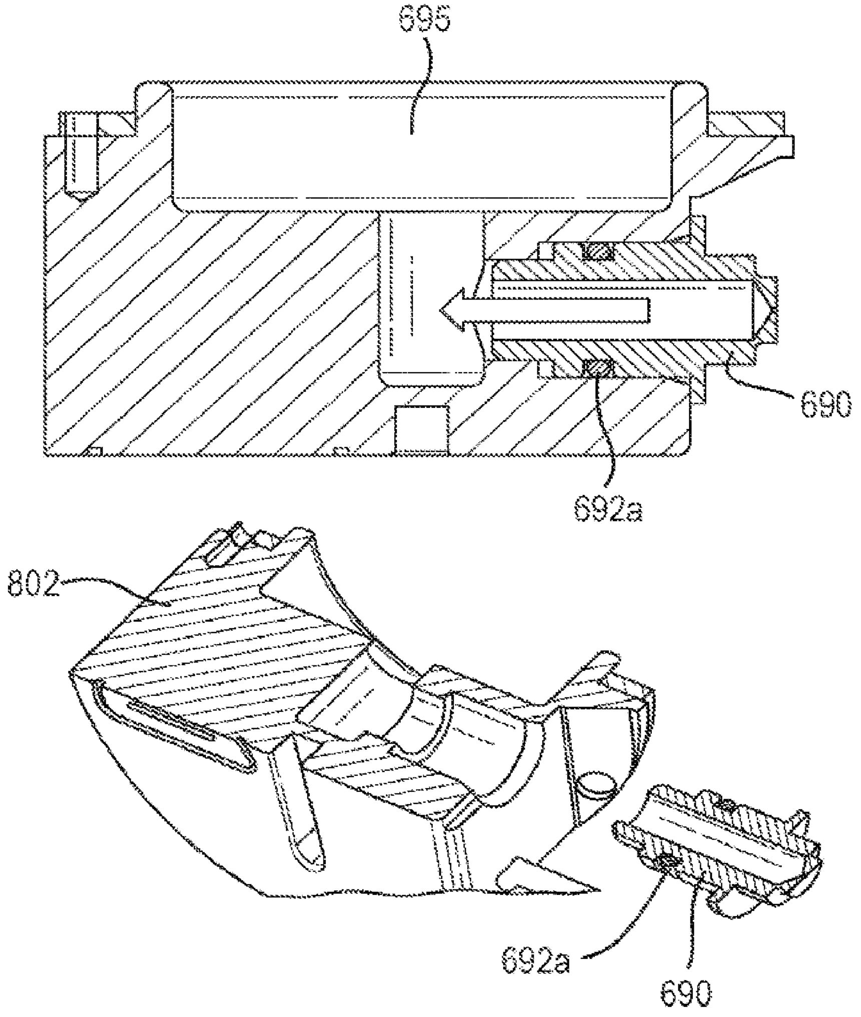

FIG. 6G illustrates how according to various embodiments a fixed valve 690 may be retained within an ion block 802 and may form a gas tight sealing therewith by virtue of an O-ring seal 692*a*. A user is unable to remove the fixed valve 690 from the ion block 802 when the instrument is operated due to the vacuum pressure within the vacuum chamber 695 of the instrument. The direction of suction force which holds the fixed valve 690 in a fixed position against the ion block 802 during normal operation is shown.

The size of the entrance aperture into the fixed valve 690 is designed for optimum operation conditions and component reliability. Various embodiments are contemplated wherein the shape of the entrance aperture may be cylindrical. However, other embodiments are contemplated wherein there may be more than one entrance aperture and/or wherein the one or more entrance apertures to the fixed valve 690 may have a non-circular aperture. Embodiments are also contemplated wherein the one or more entrance apertures may be angled at a non-zero angle to the longitudinal axis of the fixed valve 690.

It will be understood that total removal of the fixed valve 690 from the ion block 802 will rapidly result in total loss of vacuum pressure within the mass spectrometer 100.

According to various embodiments the ion inlet assembly may be temporarily sealed in order to allow a vacuum housing within the mass spectrometer 100 to be filled with dry nitrogen for shipping. It will be appreciated that filling a vacuum chamber with dry nitrogen allows faster initial pump-down during user initial instrument installation.

It will be appreciated that since according to various embodiments the internal aperture in the vacuum holding member or carrier 531 is substantially smaller in diameter than conventional arrangements, then the vacuum within the first and subsequent vacuum chambers of the instrument can be maintained for substantially longer periods of time than is possible conventionally when the disc 525 is removed and/or replaced.

Accordingly, the mass spectrometer 100 according to various embodiments does not require an isolation valve in contrast with other known mass spectrometers in order to maintain the vacuum within the instrument when a component such as the outer gas cone 517, the inner gas cone 513 or the disc 525 are removed.

A mass spectrometer 100 according to various embodiments therefore enables a reduced cost instrument to be provided which is also simpler for a user to operate since no isolation valve is needed. Furthermore, a user does not need to be understand or learn how to operate such an isolation valve.

The ion block assembly 802 may comprise a heater in order to keep the ion block 802 above ambient temperature in order to prevent droplets of analyte, solvent, neutral particles or condensation from forming within the ion block 802.

According to an embodiment when a user wishes to replace and/or remove either the outer cone 517 and/or the inner sampling cone 513 and/or the disc 525 then both the source or ion block heater and the desolvation heater 404 may be turned OFF. The temperature of the ion block 802 may be monitored by a thermocouple which may be provided within the ion block heater or which may be otherwise provided in or adjacent to the ion block 802.

When the temperature of the ion block is determined to have dropped below a certain temperature such as e.g. 55° C. then the user may be informed that the clamp 535, outer gas cone 517, inner gas sampling cone 513 and disc 525 are sufficiently cooled down such that a user can touch them without serious risk of injury.

According to various embodiment a user can simply remove and/or replace the outer gas cone 517 and/or inner gas sampling cone 513 and/or disc 525 in less than two minutes without needing to vent the instrument. In particular, the low pressure within the instrument is maintained for a sufficient period of time by the aperture in the fixed valve 690.

According to various embodiments the instrument may be arranged so that the maximum leak rate into the source or ion block 802 during sample cone maintenance is approx. 7 mbar L/s. For example, assuming a backing pump speed of 9 $m^3$/hour (2.5 L/s) and a maximum acceptable pressure of 3 mbar, then the maximum leak rate during sampling cone maintenance may be approx. 2.5 L/s×3 mbar=7.5 mbar L/s.

The ion block 802 may comprise an ion block heater having a K-type thermistor. As will be described in more detail below, according to various embodiments the source (ion block) heater may be disabled to allow forced cooling of the source or ion block 802. For example, desolvation heater 404 and/or ion block heater may be switched OFF whilst API gas is supplied to the ion block 802 in order to cool it down. According to various embodiments either a desolvation gas flow and/or a nebuliser gas flow from the probe 401 may be directed towards the cone region 517,513 of the ion block 802. Additionally and/or alternatively, the cone gas supply may be used to cool the ion block 802 and the inner and outer cones 513,517. In particular, by turning the desolvation heater 404 OFF but maintaining a supply of nebuliser and/or desolvation gas from the probe 401 so as to fill the enclosure housing the ion block with ambient temperature nitrogen or other gas will have a rapid cooling effect upon the metal and plastic components forming the ion inlet assembly which may be touched by a user during servicing. Ambient temperature (e.g. in the range 18-25° C.) cone gas may also be supplied in order to assist with cooling the ion inlet assembly in a rapid manner. Conventional instruments do not have the functionality to induce rapid cooling of the ion block 802 and gas cones 521,513.

Liquid and gaseous exhaust from the source enclosure may be fed into a trap bottle. The drain tubing may be routed so as to avoid electronic components and wiring. The instrument may be arranged so that liquid in the source enclosure always drains out even when the instrument is switched OFF. For example, it will be understood that an LC flow into the source enclosure could be present at any time.

An exhaust check valve may be provided so that when the API gas is turned OFF the exhaust check valve prevents a vacuum from forming in the source enclosure and trap bottle. The exhaust trap bottle may have a capacity ≥5 L.

The fluidics system may comprise a piston pump which allows the automated introduction of a set-up solution into the ion source. The piston pump may have a flow rate range of 0.4 to 50 mL/min. A divert/select valve may be provided which allows rapid automated changeover between LC flow and the flow of one or two internal set-up solutions into the source.

According to various embodiments three solvent bottles 201' may be provided. Solvent A bottle may have a capacity within the range 250-300 mL, solvent B bottle may have a capacity within the range 50-60 mL and solvent C bottle may have a capacity within the range 100-125 mL. The solvent bottles 201' may be readily observable by a user who may easily refill the solvent bottles.

According to an embodiment solvent A may comprise a lock-mass, solvent B may comprise a calibrant and solvent C may comprise a wash. Solvent C (wash) may be connected to a rinse port.

A driver PCB may be provided in order to control the piston pump and the divert/select valve. On power-up the piston pump may be homed and various purge parameters may be set.

Fluidics may be controlled by software and may be enabled as a function of the instrument state and the API gas valve state in a manner as detailed below:

| Instrument state | API gas valve | Software control of fluidics |
|---|---|---|
| Operate | Open | Enabled |
| Operate | Closed | Disabled |
| Over-pressure | Open | Enabled |
| Over-pressure | Closed | Disabled |
| Power Save | Open | Disabled |
| Power Save | Closed | Disabled |

When software control of the fluidics is disabled then the valve is set to a divert position and the pump is stopped.

Figure 7A:
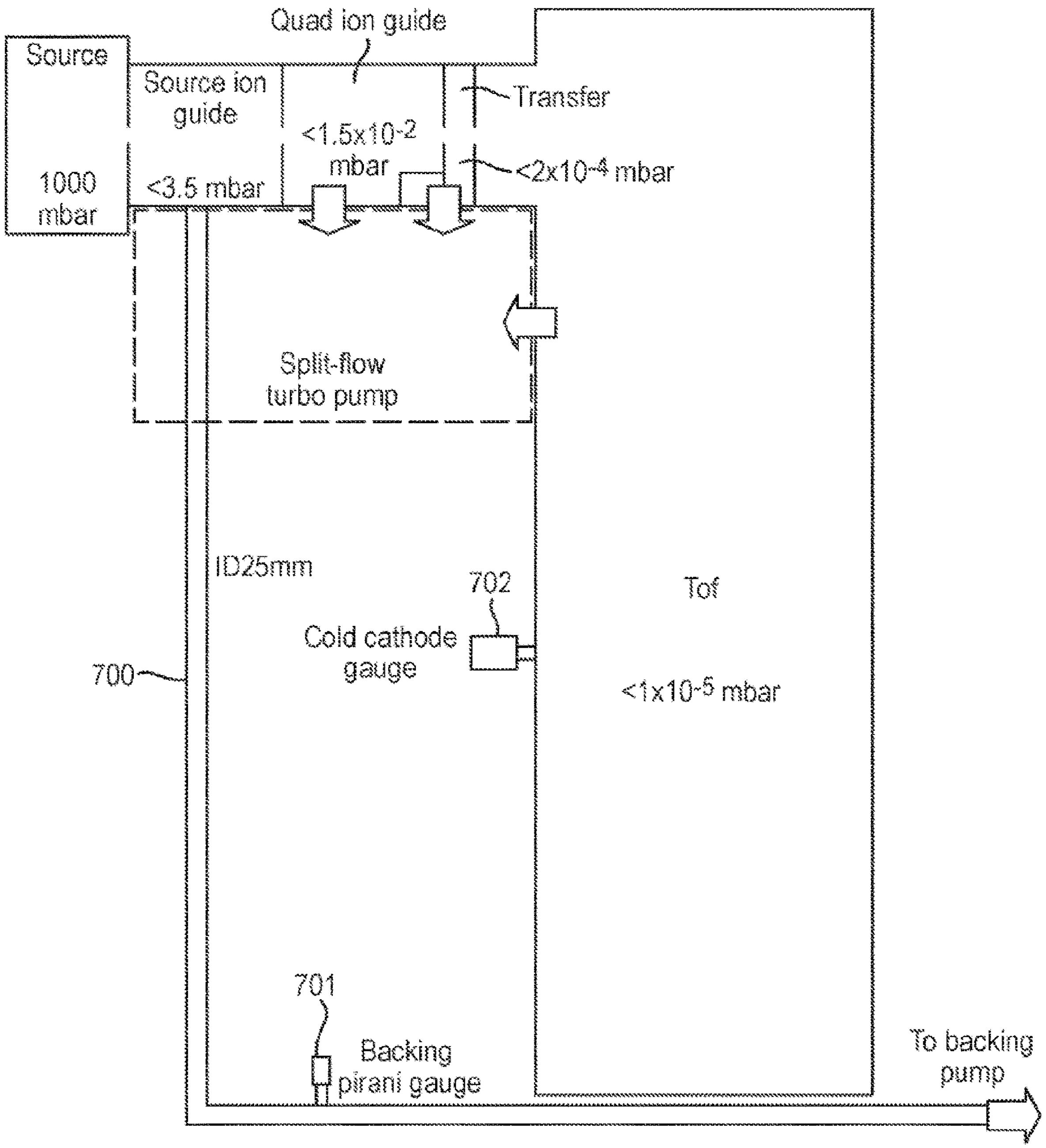
FIG. 7A shows a pumping arrangement according to various embodiments.

FIG. 7A illustrates a vacuum pumping arrangement according to various embodiments.

A split-flow turbo molecular vacuum pump (commonly referred to as a "turbo" pump) may be used to pump the fourth or further vacuum chamber or fourth or further differential pumping region, the third vacuum chamber or third differential pumping region, and the second vacuum chamber or second differential pumping region. According to an embodiment the turbo pump may comprise either a Pfeiffer® Splitflow 310 fitted with a TC110 controller or an Edwards® nEXT300/100/100D turbo pump. The turbo pump may be air cooled by a cooling fan.

The turbo molecular vacuum pump may be backed by a rough, roughing or backing pump such as a rotary vane vacuum pump or a diaphragm vacuum pump. The rough, roughing or backing pump may also be used to pump the first vacuum chamber housing the first ion guide 301. The rough, roughing or backing pump may comprise an Edwards® nRV14i backing pump. The backing pump may be provided external to the instrument and may be connected to the first vacuum chamber which houses the first ion guide 301 via a backing line 700 as shown in FIG. 7A.

A first pressure gauge such as a cold cathode gauge 702 may be arranged and adapted to monitor the pressure of the fourth or further vacuum chamber or fourth or further differential pumping region. According to an embodiment the Time of Flight housing pressure may be monitored by an Inficon® MAG500 cold cathode gauge 702.

A second pressure gauge such as a Pirani gauge 701 may be arranged and adapted to monitor the pressure of the backing pump line 700 and hence the first vacuum chamber which is in fluid communication with the upstream pumping block 600 and ion block 802. According to an embodiment the instrument backing pressure may be monitored by an Inficon® PSG500 Pirani gauge 701.

According to various embodiments the observed leak plus outgassing rate of the Time of Flight chamber may be arranged to be less than $4\times10^{-5}$ mbar L/s. Assuming a 200 L/s effective turbo pumping speed then the allowable leak plus outgassing rate is $5\times10^{-7}$ mbar×200 L/s=$1\times10^{-4}$ mbar L/s.

A turbo pump such as an Edwards® nEXT300/100/100D turbo pump may be used which has a main port pumping speed of 400 L/s. As will be detailed in more detail below, EMC shielding measures may reduce the pumping speed by approx. 20% so that the effective pumping speed is 320 L/s. Accordingly, the ultimate vacuum according to various embodiments may be $4\times10^{-5}$ mbar L/s/320 L/s=$1.25\times10^{-7}$ mbar.

Figure 7B:
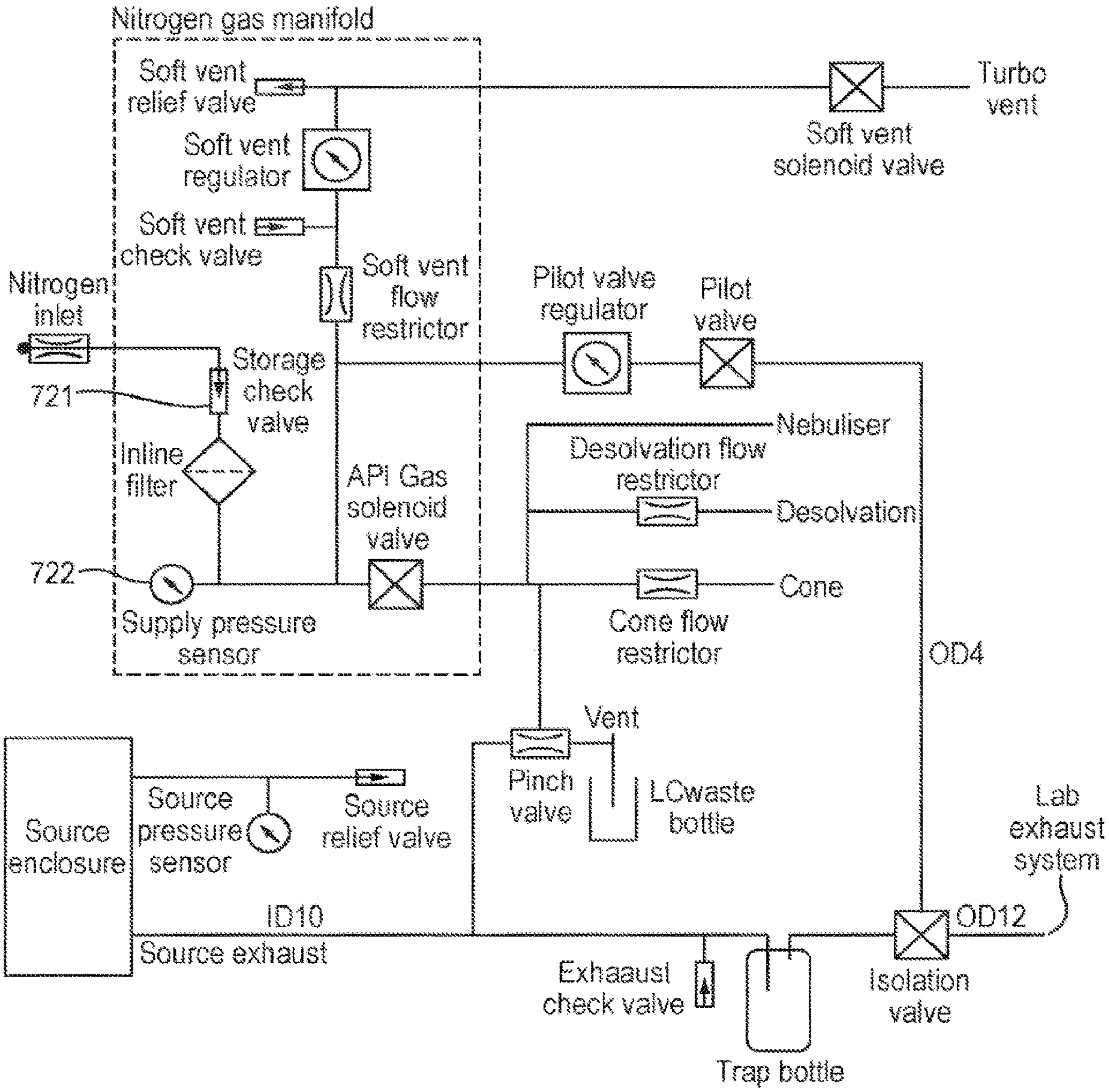
FIG. 7B shows further details of a gas handling system which may be implemented.

According to an embodiment a pump-down sequence may comprise closing a soft vent solenoid as shown in FIG. 7B, starting the backing pump and waiting until the backing pressure drops to 32 mbar. If 32 mbar is not reached within 3 minutes of starting the backing pump then a vent sequence may be performed. Assuming that a pressure of 32 mbar is reached within 3 minutes then the turbo pump is then started. When the turbo speed exceeds 80% of maximum speed then the Time of Flight vacuum gauge 702 may then be switched ON. It will be understood that the vacuum gauge 702 is a sensitive detector and hence is only switched ON when the vacuum pressure is such that the vacuum gauge 702 which not be damaged.

If the turbo speed does not reach 80% of maximum speed within 8 minutes then a vent sequence may be performed.

A pump-down sequence may be deemed completed once the Time of Flight vacuum chamber pressure is determined to be $<1\times10^{-5}$ mbar.

If a vent sequence is to be performed then the instrument may be switched to a Standby mode of operation. The Time of Flight vacuum gauge 702 may be switched OFF and the turbo pump may also be switched OFF. When the turbo pump speed falls to less than 80% of maximum then a soft vent solenoid valve as shown in FIG. 7B may be opened. The system may then wait for 10 seconds before then switching OFF the backing pump.

It will be understood by those skilled in the art that the purpose of the turbo soft vent solenoid valve as shown in FIG. 7B and the soft vent line is to enable the turbo pump to be vented at a controlled rate. It will be understood that if the turbo pump is vented at too fast a rate then the turbo pump may be damaged.

The instrument may switch into a maintenance mode of operation which allows an engineer to perform service work on all instrument sub-systems except for the vacuum system or a subsystem incorporating the vacuum system without having to vent the instrument. The instrument may be pumped down in maintenance mode and conversely the instrument may also be vented in maintenance mode.

A vacuum system protection mechanism may be provided wherein if the turbo speed falls to less than 80% of maximum speed then a vent sequence is initiated. Similarly, if the backing pressure increases to greater than 10 mbar then a vent sequence may also be initiated. According to an embodiment if the turbo power exceeds 120 W for more than 15 minutes then a vent sequence may also be initiated. If on instrument power-up the turbo pump speed is >80% of maximum then the instrument may be set to a pumped state, otherwise the instrument may be set to a venting state.

FIG. 7B shows a schematic of a gas handling system which may be utilised according to various embodiments. A storage check valve 721 may be provided which allows the instrument to be filled with nitrogen for storage and transport. The storage check valve 721 is in fluid communication with an inline filter.

A soft vent flow restrictor may be provided which may limit the maximum gas flow to less than the capacity of a soft vent relief valve in order to prevent the analyser pressure from exceeding 0.5 bar in a single fault condition. The soft vent flow restrictor may comprise an orifice having a diameter in the range 0.70 to 0.75 mm.

A supply pressure sensor 722 may be provided which may indicate if the nitrogen pressure has fallen below 4 bar.

An API gas solenoid valve may be provided which is normally closed and which has an aperture diameter of not less than 1.4 mm.

An API gas inlet is shown which preferably comprises a Nitrogen gas inlet. According to various embodiments the nebuliser gas, desolvation gas and cone gas are all supplied from a common source of nitrogen gas.

A soft vent regulator may be provided which may function to prevent the analyser pressure exceeding 0.5 bar in normal condition.

A soft vent check valve may be provided which may allow the instrument to vent to atmosphere in the event that the nitrogen supply is OFF.

A soft vent relief valve may be provided which may have a cracking pressure of 345 mbar. The soft vent relief valve may function to prevent the pressure in the analyser from exceeding 0.5 bar in a single fault condition. The gas flow rate through the soft vent relief valve may be arranged so as not to be less than 2000 L/h at a differential pressure of 0.5 bar.

The soft vent solenoid valve may normally be in an open position. The soft vent solenoid valve may be arranged to restrict the gas flow rate in order to allow venting of the turbo pump at 100% rotational speed without causing damage to the pump. The maximum orifice diameter may be 1.0 mm.

The maximum nitrogen flow may be restricted such that in the event of a catastrophic failure of the gas handling the maximum leak rate of nitrogen into the lab should be less than 20% of the maximum safe flow rate. According to various embodiments an orifice having a diameter of 1.4 to 1.45 mm may be used.

A source pressure sensor may be provided.

A source relief valve having a cracking pressure of 345 mbar may be provided. The source relief valve may be arranged to prevent the pressure in the source from exceeding 0.5 bar in a single fault condition. The gas flow rate through the source relief valve may be arranged so as not to be less than 2000 L/h at a differential pumping pressure of 0.5 bar. A suitable valve is a Ham-Let® H-480-S-G-1/4-5 psi valve.

A cone restrictor may be provided to restrict the cone flow rate to 36 L/hour for an input pressure of 7 bar. The cone restrictor may comprise a 0.114 mm orifice.

The desolvation flow may be restricted by a desolvation flow restrictor to a flow rate of 940 L/hour for an input pressure of 7 bar. The desolvation flow restrictor may comprise a 0.58 mm orifice.

A pinch valve may be provided which has a pilot operating pressure range of at least 4 to 7 bar gauge. The pinch valve may normally be open and may have a maximum inlet operating pressure of at least 0.5 bar gauge.

When the instrument is requested to turn the API gas OFF, then control software may close the API gas valve, wait 2 seconds and then close the source exhaust valve.

In the event of an API gas failure wherein the pressure switch opens (pressure <4 bar) then software control of the API gas may be disabled and the API gas valve may be closed. The system may then wait 2 seconds before closing the exhaust valve.

In order to turn the API gas ON a source pressure monitor may be turned ON except while a source pressure test is performed. An API gas ON or OFF request from software may be stored as an API Gas Request state which can either be ON or OFF. Further details are presented below:

| API Gas Request state | API Gas Control state | API gas valve |
|---|---|---|
| ON | Enabled | Open |
| ON | Disabled | Closed |

-continued

| API Gas Request state | API Gas Control state | API gas valve |
|---|---|---|
| OFF | Enabled | Closed |
| OFF | Disabled | Closed |

Figure 7C:
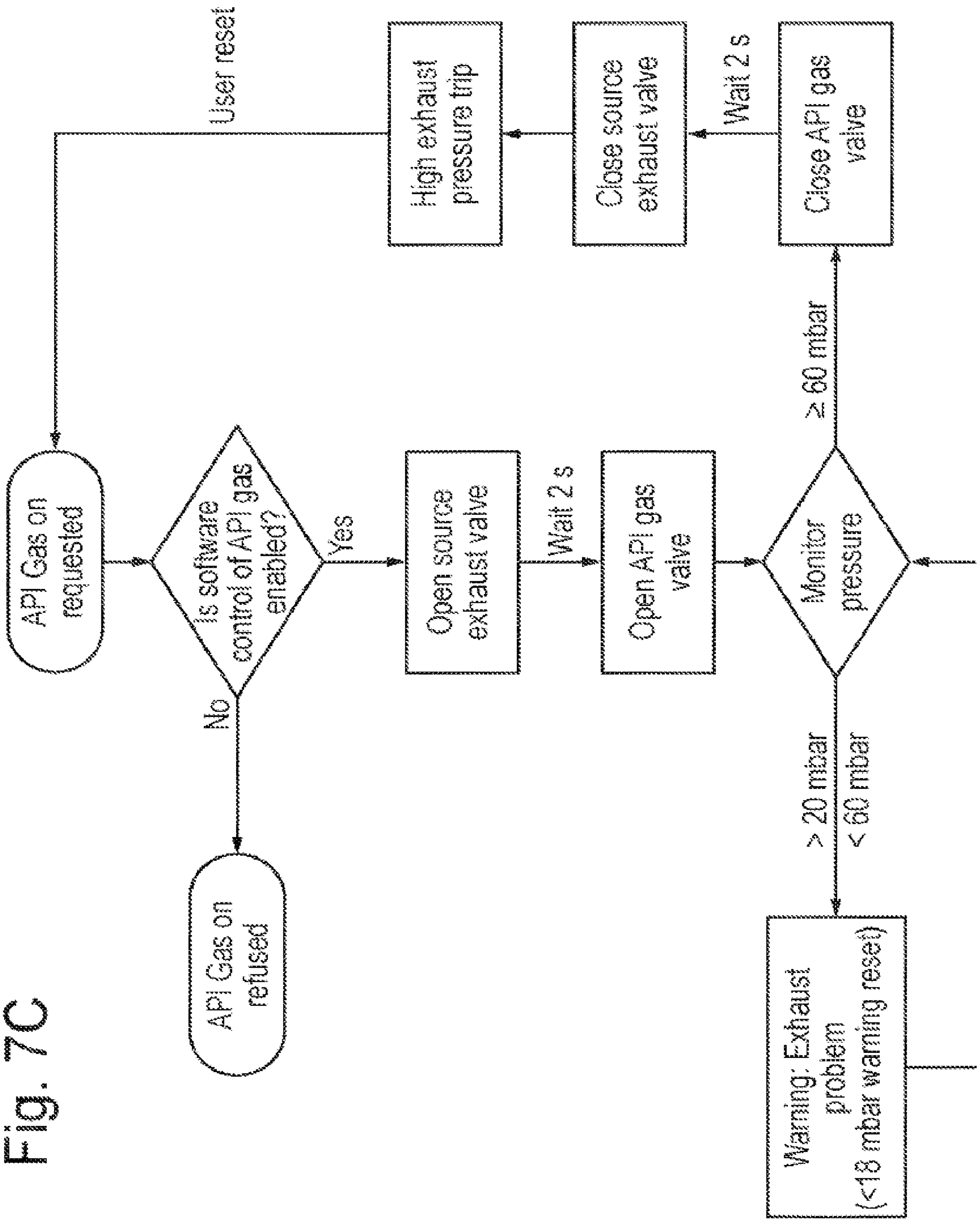
FIG. 7C shows a flow diagram illustrating the steps which may be performed following a user request to the turn the Atmospheric Pressure Ionisation ("API") gas ON and FIG. 7D shows a flow chart illustrating a source pressure test which may be performed according to various embodiments.

FIG. 7C shows a flow diagram showing an instrument response to a user request to turn the API gas ON. A determination may be made as to whether or not software control of API gas is enabled. If software control is not enabled then the request may be refused. If software control of API gas is enabled then the open source exhaust valve may be opened. Then after a delay of 2 seconds the API gas valve may be opened. The pressure is then monitored. If the pressure is determined to be between 20-60 mbar then a warning message may be communicated or issued. If the pressure is greater than 60 mbar then then the API gas valve may be closed. Then after a delay of 2 seconds the source exhaust valve may be closed and a high exhaust pressure trip may occur.

A high exhaust pressure trip may be reset by running a source pressure test.

According to various embodiments the API gas valve may be closed within 100 ms of an excess pressure being sensed by the source pressure sensor.

Figure 7D:
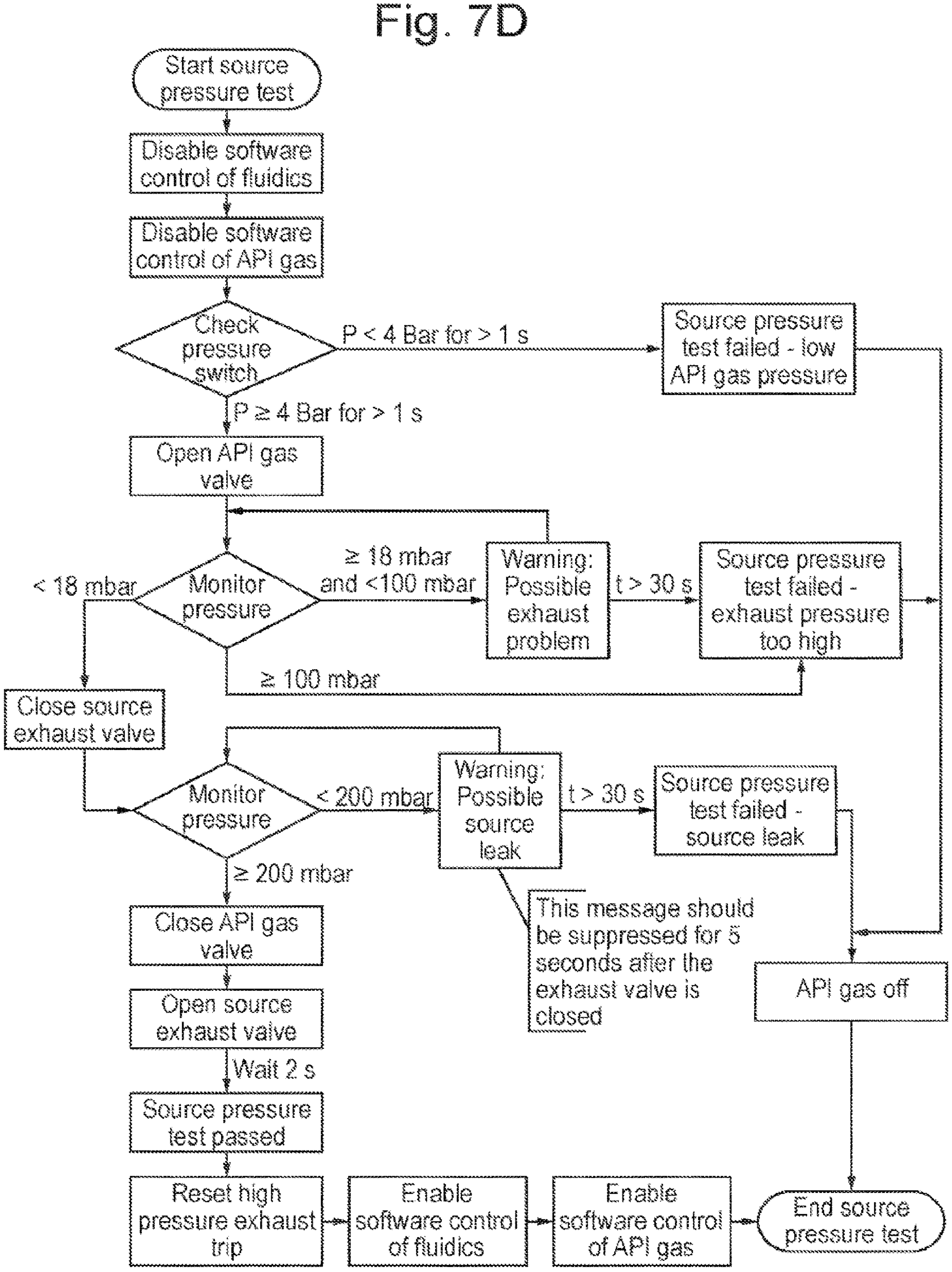

FIG. 7D shows a flow diagram illustrating a source pressure test which may be performed according to various embodiments. The source pressure test may be commenced and software control of fluidics may be disabled so that no fluid flows into the Electrospray probe 401. Software control of the API gas may also be disabled i.e. the API is turned OFF. The pressure switch may then be checked. If the pressure is above 4 bar for more than 1 second then the API gas valve may be opened. However, if the pressure is less than 4 bar for more than 1 second then the source pressure test may move to a failed state due to low API gas pressure.

Assuming that the API gas valve is opened then the pressure may then be monitored. If the pressure is in the range 18-100 mbar then a warning message may be output indicating a possible exhaust problem. If the warning status continues for more than 30 seconds then the system may conclude that the source pressure test has failed due to the exhaust pressure being too high.

If the monitored pressure is determined to be less than 18 mbar then the source exhaust valve is closed.

The pressure may then again be monitored. If the pressure is less than 200 mbar then a warning message indicating a possible source leak may be issued.

If the pressure is determined to be greater than 200 mbar then the API gas valve may be closed and the source exhaust valve may be opened i.e. the system looks to build pressure and to test for leaks. The system may then wait 2 seconds before determining that the source pressure test is passed.

If the source pressure test has been determined to have been passed then the high pressure exhaust trip may be reset and software control of fluidics may be enabled. Software control of the API gas may then be enabled and the source pressure test may then be concluded.

According to various embodiments the API gas valve may be closed within 100 ms of an excess pressure being sensed by the source pressure sensor.

In the event of a source pressure test failure, the divert valve position may be set to divert and the valve may be kept in this position until the source pressure test is either passed or the test is over-ridden.

It is contemplated that the source pressure test may be over-ridden in certain circumstances. Accordingly, a user may be permitted to continue to use an instrument where they have assessed any potential risk as being acceptable. If the user is permitted to continue using the instrument then the source pressure test status message may still be displayed in order to show the original failure. As a result, a user may be reminded of the continuing failed status so that the user may continually re-evaluate any potential risk.

In the event that a user requests a source pressure test over-ride then the system may reset a high pressure exhaust trip and then enable software control of the divert valve. The system may then enable software control of the API gas before determining that the source pressure test over-ride is complete.

The pressure reading used in the source pressure test and source pressure monitoring may include a zero offset correction.

The gas and fluidics control responsibility may be summarised as detailed below:

| Mode of operation | Software | Electronics |
|---|---|---|
| Operate | Gas and fluidics | None |
| Power save | Gas | Fluidics |
| Standby | Gas | Fluidics |
| SPT/Failure | None | Gas and fluidics |
| Vacuum loss | None | Gas and fluidics |
| Gas fail state | None | Gas and fluidics |
| Operate gas OFF | Gas | Fluidics |

A pressure test may be initiated if a user triggers an interlock.

The instrument may operate in various different modes of operation. If the turbo pump speed falls to less than 80% of maximum speed whilst in Operate, Over-pressure or Power save mode then the instrument may enter a Standby state or mode of operation.

If the pressure in the Time of Flight vacuum chamber is greater than $1\times10^{-5}$ mbar and/or the turbo speed is less than 80% of maximum speed then the instrument may be prevented from operating in an Operate mode of operation.

According to various embodiments the instrument may be operated in a Power save mode. In a Power save mode of operation the piston pump may be stopped. If the instrument is switched into a Power save mode while the divert valve is in the LC position, then the divert valve may change to a divert position. A Power save mode of operation may be considered as being a default mode of operation wherein all back voltages are kept ON, front voltages are turned OFF and gas is OFF.

If the instrument switches from a Power save mode of operation to an Operate mode of operation then the piston pump divert valves may be returned to their previous states i.e. their states immediately before a Power save mode of operation was entered.

If the Time of Flight region pressure rises above $1.5\times10^{-5}$ mbar while the instrument is in an Operate mode of operation then the instrument may enter an Over-pressure mode of operation or state.

If the Time of Flight pressure enters the range $1\times10^{-8}$ to $1\times10^{-5}$ mbar while the instrument is in an Over-pressure mode of operation then the instrument may enter an Operate mode of operation.

If the API gas pressure falls below its trip level while the instrument is in an Operate mode of operation then the instrument may enter a Gas Fail state or mode of operation.

The instrument may remain in a Gas Fail state until both: (i) the API gas pressure is above its trip level; and (ii) the instrument is operated in either Standby or Power save mode.

According to an embodiment the instrument may transition from an Operate mode of operation to an Operate with Source Interlock Open mode of operation when the source cover is opened. Similarly, the instrument may transition from an Operate with Source Interlock Open mode of operation to an Operate mode of operation when the source cover is closed.

According to an embodiment the instrument may transition from an Over-pressure mode of operation to an Over-pressure with Source Interlock Open mode of operation when the source cover is opened. Similarly, the instrument may transition from an Over-pressure with Source Interlock Open mode of operation to an Over-pressure mode of operation when the source cover is closed.

The instrument may operate in a number of different modes of operation which may be summarised as follows:

| Mode of operation | Analyser voltages | Front end voltages | Desolvation heater | Source heater | API gas control state |
|---|---|---|---|---|---|
| Standby | OFF | OFF | OFF | ON | Enabled |
| Operate | ON | ON | ON | ON | Enabled |
| Power Save | ON | OFF | OFF | ON | Enabled |
| Over-pressure | OFF | ON | ON | ON | Enabled |
| Gas Fail | ON | OFF | OFF | ON | Disabled |
| Operate with Source Interlock | ON | OFF | OFF | OFF | Disabled |
| Over-pressure with Source interlock | OFF | OFF | OFF | OFF | Disabled |
| Not Pumped | OFF | OFF | OFF | OFF | Enabled |

Reference to front end voltages relates to voltages which are applied to the Electrospray capillary electrode 402, the source offset, the source or first ion guide 301, aperture #1 (see FIG. 15A) and the quadrupole ion guide 302.

Reference to analyser voltages relates to all high voltages except the front end voltages.

Reference to API gas refers to desolvation, cone and nebuliser gases.

Reference to Not Pumped refers to all vacuum states except pumped.

If any high voltage power supply loses communication with the overall system or a global circuitry control module then the high voltage power supply may be arranged to switch OFF its high voltages. The global circuitry control module may be arranged to detect the loss of communication of any subsystem such as a power supply unit ("PSU"), a pump or gauge etc.

According to various embodiments the system will not indicate its state or mode of operation as being Standby if the system is unable to verify that all subsystems are in a Standby state.

As is apparent from the above table, when the instrument is operated in an Operate mode of operation then all voltages are switched ON. When the instrument transitions to operate in an Operate mode of operation then the following voltages are ON namely transfer lens voltages, ion guide voltages, voltages applied to the first ion guide 301 and the capillary electrode 402. In addition, the desolvation gas and desolvation heater are all ON.

If a serious fault were to develop then the instrument may switch to a Standby mode of operation wherein all voltages apart from the source heater provided in the ion block 802 are turned OFF and only a service engineer can resolve the fault. It will be understood that the instrument may only be put into a Standby mode of operation wherein voltages apart from the source heater in the ion block 802 are turned OFF only if a serious fault occurs or if a service engineer specifies that the instrument should be put into a Standby mode operation. A user or customer may (or may not) be able to place an instrument into a Standby mode of operation. Accordingly, in a Standby mode of operation all voltages are OFF and the desolvation gas flow and desolvation heater 404 are all OFF. Only the source heater in the ion block 802 may be left ON.

The instrument may be kept in a Power Save mode by default and may be switched so as to operate in an Operate mode of operation wherein all the relevant voltages and gas flows are turned ON. This approach significantly reduces the time taken for the instrument to be put into a useable state. When the instrument transitions to a Power Save mode of operation then the following voltages are ON—pusher electrode 305, reflectron 306, ion detector 307 and more generally the various Time of Flight mass analyser 304 voltages.

The stability of the power supplies for the Time of Flight mass analyser 304, ion detector 307 and reflectron 306 can affect the mass accuracy of the instrument. The settling time when turning ON or switching polarity on a known conventional instrument is around 20 minutes.

It has been established that if the power supplies are cold or have been left OFF for a prolonged period of time then they may require up to 10 hours to warm up and stabilise. For this reason customers may be prevented from going into a Standby mode of operation which would switch OFF the voltages to the Time of Flight analyser 304 including the reflectron 306 and ion detector 307 power supplies.

On start-up the instrument may move to a Power save mode of operation as quickly as possible as this allows the power supplies the time they need to warm up whilst the instrument is pumping down. As a result, by the time the instrument has reached the required pressure to carry out instrument setup the power supplies will have stabilised thus reducing any concerns relating to mass accuracy.

According to various embodiments in the event of a vacuum failure in the vacuum chamber housing the Time of Flight mass analyser 304 then power may be shut down or turned OFF to all the peripherals or sub-modules e.g. the ion source 300, first ion guide 301, the segmented quadrupole rod set ion guide 302, the transfer optics 303, the pusher electrode 305 high voltage supply, the reflectron 306 high voltage supply and the ion detector 307 high voltage supply. The voltages are primarily all turned OFF for reasons of instrument protection and in particular protecting sensitive components of the Time of Flight mass analyser 307 from high voltage discharge damage.

It will be understood that high voltages may be applied to closely spaced electrodes in the Time of Flight mass analyser 304 on the assumption that the operating pressure will be very low and hence there will be no risk of sparking or electrical discharge effects. Accordingly, in the event of a serious vacuum failure in the vacuum chamber housing the Time of Flight mass analyser 304 then the instrument may remove power or switch power OFF to the following modules or sub-modules: (i) the ion source high voltage supply module; (ii) the first ion guide 301 voltage supply module; (iii) the quadrupole ion guide 302 voltage supply module; (iv) the high voltage pusher electrode 305 supply module;

(v) the high voltage reflectron 306 voltage supply module; and (vi) the high voltage detector 307 module. The instrument protection mode of operation is different to a Standby mode of operation wherein electrical power is still supplied to various power supplies or modules or sub-modules. In contrast, in an instrument protection mode of operation power is removed to the various power supply modules by the action of a global circuitry control module. Accordingly, if one of the power supply modules were faulty it would still be unable in a fault condition to turn voltages ON because the module would be denied power by the global circuitry control module.

Figure 8:
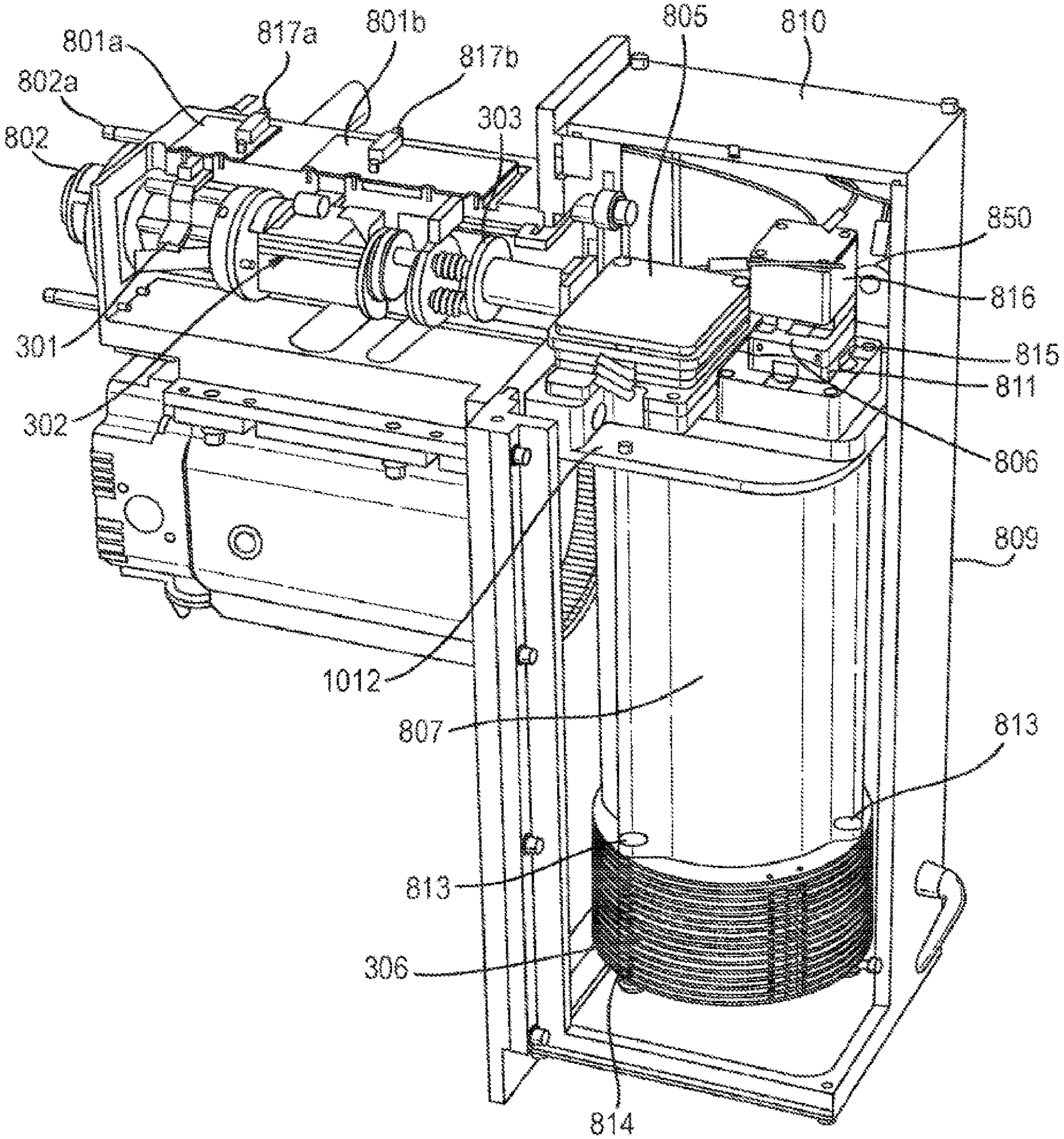
FIG. 8 shows in more detail a mass spectrometer according to various embodiments.

FIG. 8 shows a view of a mass spectrometer 100 according to various embodiments in more detail. The mass spectrometer 100 may comprise a first vacuum PCB interface 801*a* having a first connector 817*a* for directly connecting the first vacuum interface PCB 801*a* to a first local control circuitry module (not shown) and a second vacuum PCB interface 801*b* having a second connector 817*b* for directly connecting the second vacuum interface PCB 801*b* to a second local control circuitry module (not shown).

The mass spectrometer 100 may further comprise a pumping or ion block 802 which is mounted to a pumping block or thermal isolation stage (not viewable in FIG. 8). According to various embodiments one or more dowels or projections 802*a* may be provided which enable a source enclosure (not shown) to connect to and secure over and house the ion block 802. The source enclosure may serve the purpose of preventing a user from inadvertently coming into contact with any high voltages associated with the Electrospray probe 402. A micro-switch or other form of interlock may be used to detect opening of the source enclosure by a user in order to gain source access whereupon high voltages to the ion source 402 may then be turned OFF for user safety reasons.

Ions are transmitted via an initial or first ion guide 301, which may comprise a conjoined ring ion guide, and then via a segmented quadrupole rod set ion guide 302 to a transfer lens or transfer optics arrangement 303. The transfer optics 303 may be designed in order to provide a highly efficient ion guide and interface into the Time of Flight mass analyser 304 whilst also reducing manufacturing costs.

Ions may be transmitted via the transfer optics 303 so that the ions arrive in a pusher electrode assembly 305. The pusher electrode assembly 305 may also be designed so as to provide high performance whilst at the same time reducing manufacturing costs.

According to various embodiments a cantilevered Time of Flight stack 807 may be provided. The cantilevered arrangement may be used to mount a Time of Flight stack or flight tube 807 and has the advantage of both thermally and electrically isolating the Time of Flight stack or flight tube 807. The cantilevered arrangement represents a significant design departure from conventional instruments and results in substantial improvements in instrument performance.

According to an embodiment an alumina ceramic spacer and a plastic (PEEK) dowel may be used.

According to an embodiment when a lock mass is introduced and the instrument is calibrated then the Time of Flight stack or flight tube 807 will not be subjected to thermal expansion. The cantilevered arrangement according to various embodiments is in contrast to known arrangements wherein both the reflectron 306 and the pusher assembly 305 were mounted to both ends of a side flange. As a result conventional arrangements were subjected to thermal impact.

Ions may be arranged to pass into a flight tube 807 and may be reflected by a reflectron 306 towards an ion detector 811. The output from the ion detector 811 is passed to a pre-amplifier (not shown) and then to an Analogue to Digital Converter ("ADC") (also not shown). The reflectron 306 is preferably designed so as to provide high performance whilst also reducing manufacturing cost and improvising reliability.

As shown in FIG. 8 the various electrode rings and spacers which collectively form the reflectron subassembly may be mounted to a plurality of PEEK support rods 814. The reflectron subassembly may then be clamped to the flight tube 807 using one or more cotter pins 813. As a result, the components of the reflectron subassembly are held under compression which enables the individual electrodes forming the reflectron to be maintained parallel to each other with a high level of precision. According to various embodiments the components may be held under spring loaded compression.

The pusher electrode assembly 305 and the detector electronics or a discrete detector module may be mounted to a common pusher plate assembly 1012. This is described in more detail below with reference to FIGS. 10A-10C.

The Time of Flight mass analyser 304 may have a full length cover 809 which may be readily removed enabling extensive service access. The full length cover 809 may be held in place by a plurality of screws e.g. 5 screws. A service engineer may undo the five screws in order to expose the full length of the time of flight tube 807 and the reflectron 306.

The mass analyser 304 may further comprise a removable lid 810 for quick service access. In particular, the removable lid 810 may provide access to a service engineer so that the service engineer can replace an entrance plate 1000 as shown in FIG. 10C. In particular, the entrance plate 1000 may become contaminated due to ions impacting upon the surface of the entrance plate 1000 resulting in surface charging effects and potentially reducing the efficiency of ion transfer from the transfer optics 303 into a pusher region adjacent the pusher electrode 305.

A SMA (SubMiniature version A) connector or housing 850 is shown but an AC coupler 851 is obscured from view.

Figure 9:
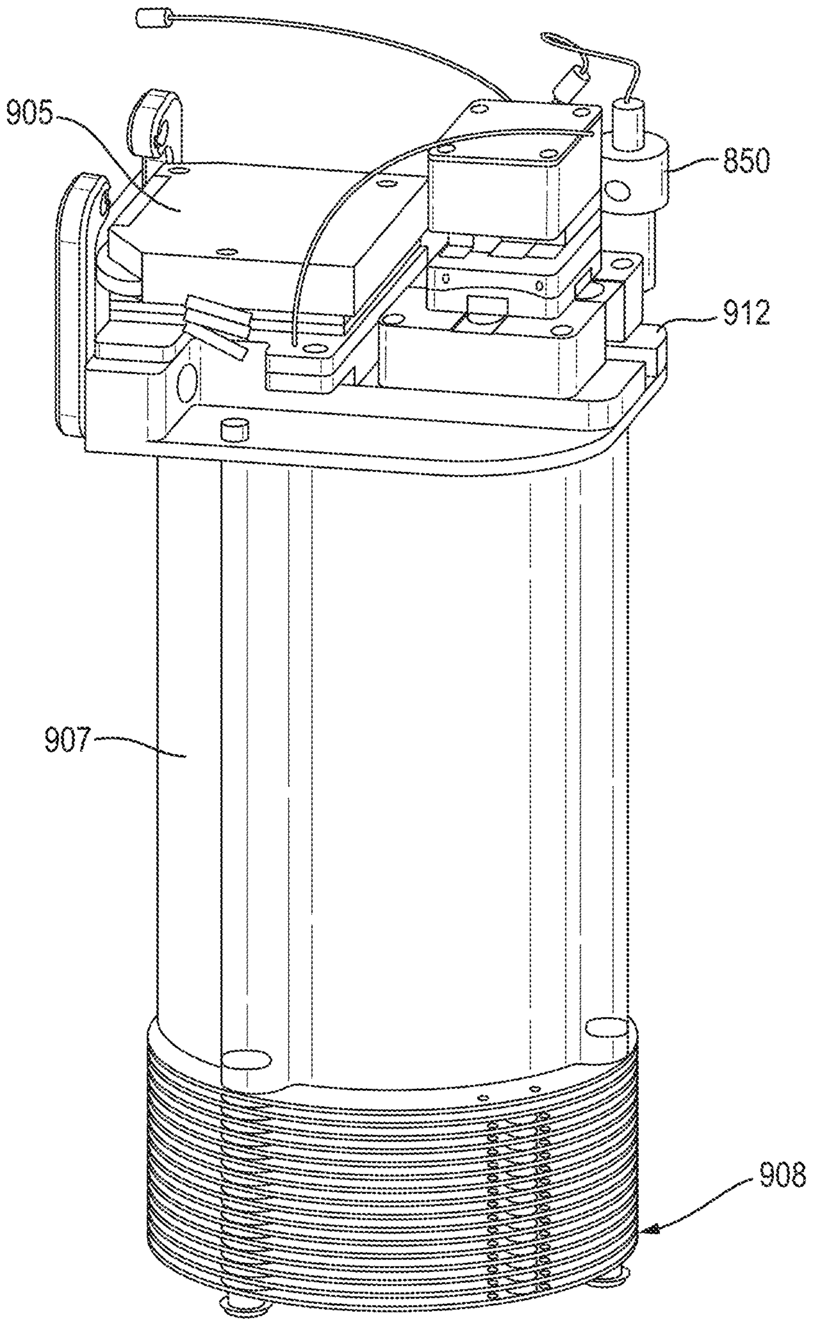
FIG. 9 shows a Time of Flight mass analyser assembly comprising a pusher plate assembly having mounted thereto a pusher electronics module and an ion detector module and wherein a reflectron assembly is suspended from an extruded flight tube which in turn is suspended from the pusher plate assembly.

FIG. 9 shows a pusher plate assembly 912, flight tube 907 and reflectron stack 908. A pusher assembly 905 having a pusher shielding cover is also shown. The flight tube 907 may comprise an extruded or plastic flight tube. The reflectron 306 may utilise fewer ceramic components than conventional reflectron assemblies thereby reducing manufacturing cost. According to various embodiments the reflectron 306 may make greater use of PEEK compared with conventional reflectron arrangements.

A SMA (SubMiniature version A) connector or housing 850 is shown but an AC coupler 851 is obscured from view.

According to other embodiments the reflectron 306 may comprise a bonded reflectron. According to another embodiment the reflectron 306 may comprise a metallised ceramic arrangement. According to another embodiment the reflectron 306 may comprise a jigged then bonded arrangement.

According to alternative embodiments instead of stacking, mounting and fixing multiple electrodes or rings, a single bulk piece of an insulating material such as a ceramic may be provided. Conductive metallised regions on the surface may then be provided with electrical connections to these regions so as to define desired electric fields. For example, the inner surface of a single piece of cylindrical shaped ceramic may have multiple parallel metallised conductive rings deposited as an alternative method of providing potential surfaces as a result of stacking multiple individual rings as is known conventionally. The bulk ceramic material provides insulation between the different potentials applied to different surface regions. The alternative arrangement reduces the number of components thereby simplifying the overall design, improving tolerance build up and reducing manufacturing cost. Furthermore, it is contemplated that multiple devices may be constructed this way and may be combined with or without grids or lenses placed in between. For example, according to one embodiment a first grid electrode may be provided, followed by a first ceramic cylindrical element, followed by a second grid electrode followed by a second ceramic cylindrical element.

Figure 10A:
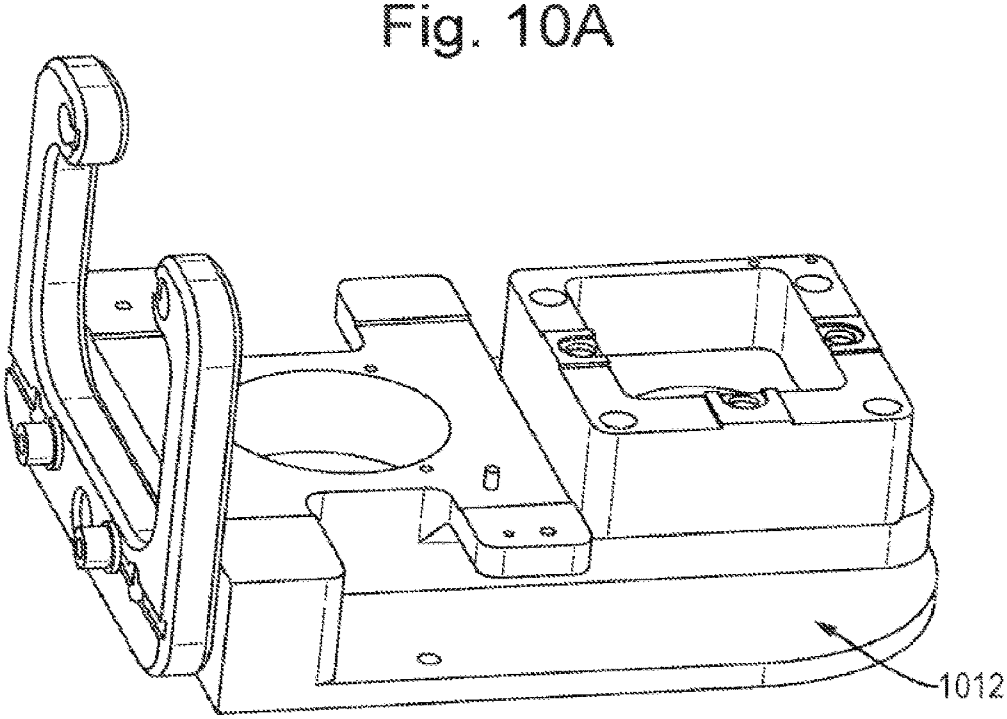
FIG. 10A shows in more detail a pusher plate assembly.
Figure 10B:
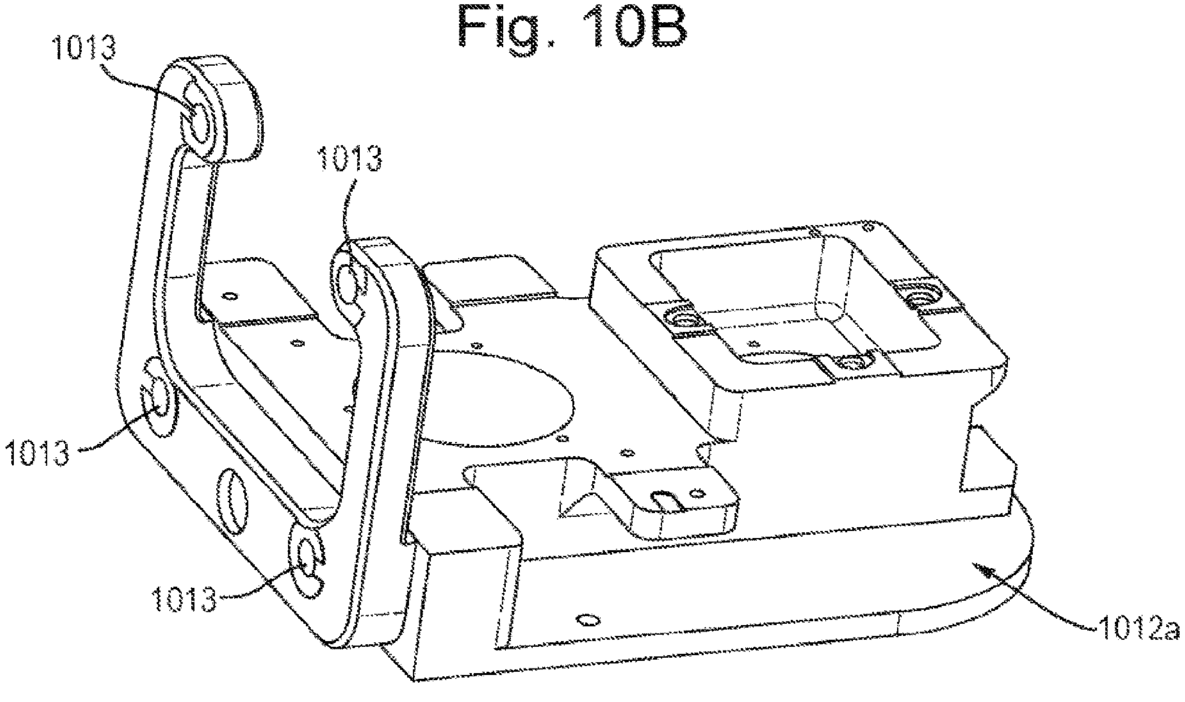
FIG. 10B shows a monolithic pusher plate assembly according to various embodiments and FIG. 10C shows a pusher plate assembly with a pusher electrode assembly or module and an ion detector assembly or module mounted thereto.
Figure 10C:
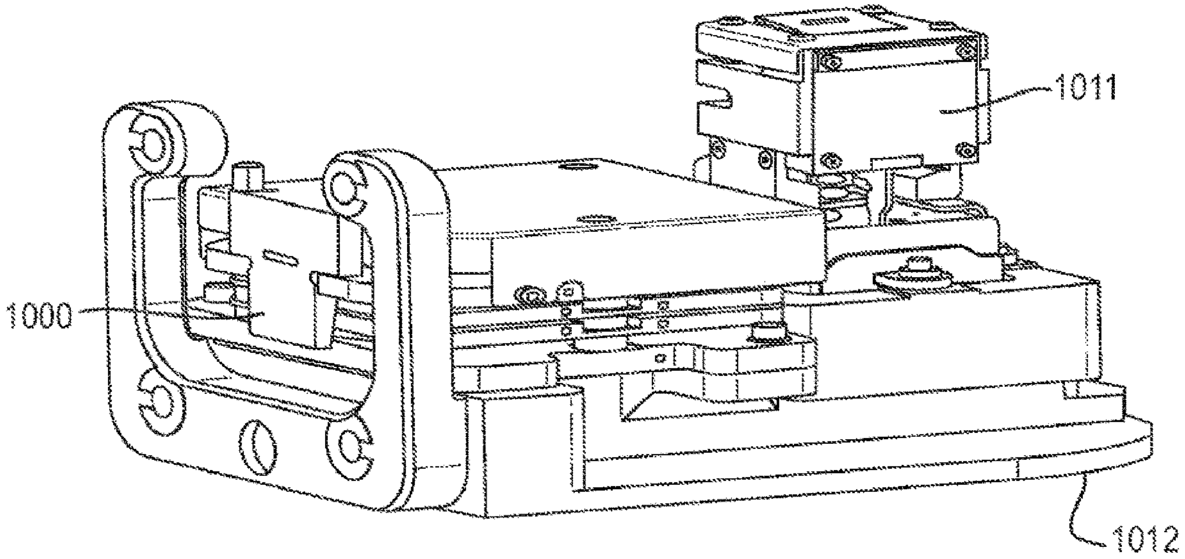

FIG. 10A shows a pusher plate assembly 1012 comprising three parts according to various embodiments. According to an alternative embodiment a monolithic support plate 1012*a* may be provided as shown in FIG. 10B. The monolithic support plate 1012*a* may be made by extrusion. The support plate 1012*a* may comprise a horse shoe shaped bracket having a plurality (e.g. four) fixing points 1013. According to an embodiment four screws may be used to connect the horse shoe shaped bracket to the housing of the mass spectrometer and enable a cantilevered arrangement to be provided. The bracket may be maintained at a voltage which may be the same as the Time of Flight voltage i.e. 4.5 kV. By way of contrast, the mass spectrometer housing may be maintained at ground voltage i.e. 0V.

FIG. 10C shows a pusher plate assembly 1012 having mounted thereon a pusher electrode assembly and an ion detector assembly 1011. An entrance plate 1000 having an ion entrance slit or aperture is shown.

Figure 16A:
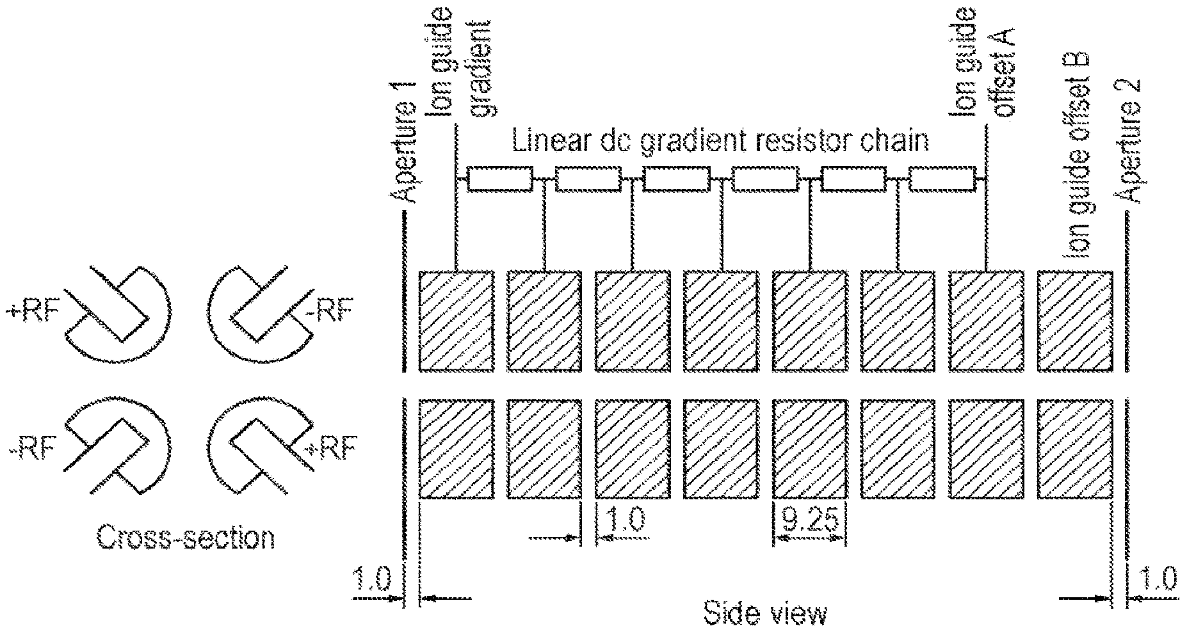
FIG. 16A shows in more detail a segmented quadrupole rod set ion guide according to various embodiments which may be provided downstream of the first ion guide and which comprises a plurality of rod electrodes.
Figure 16B:
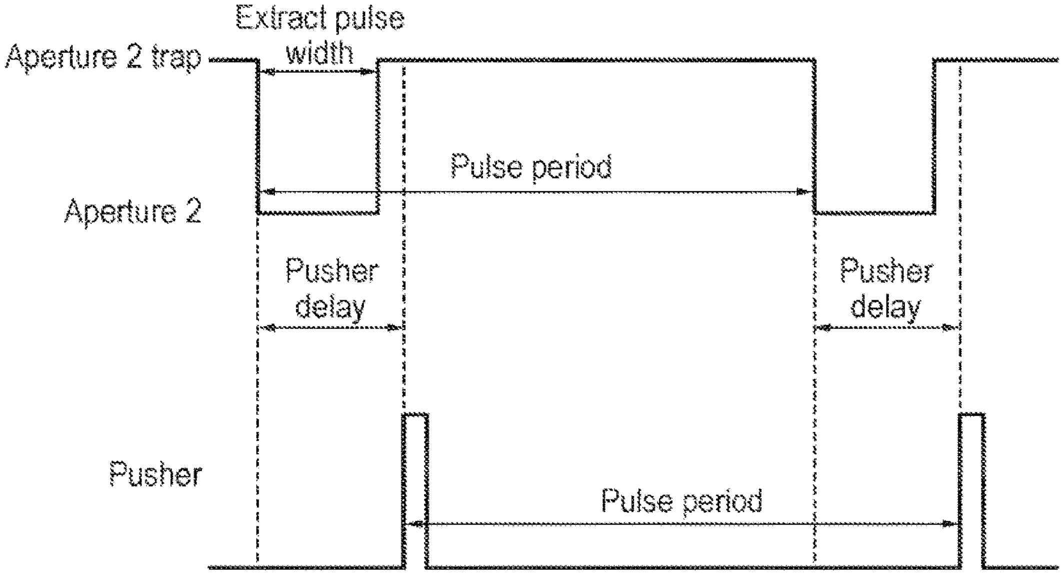
FIG. 16B illustrates how a voltage pulse applied to a pusher electrode of a Time of Flight mass analyser may be synchronised with trapping and releasing ions from the end region of the segmented quadrupole rod set ion guide.
Figure 16C:
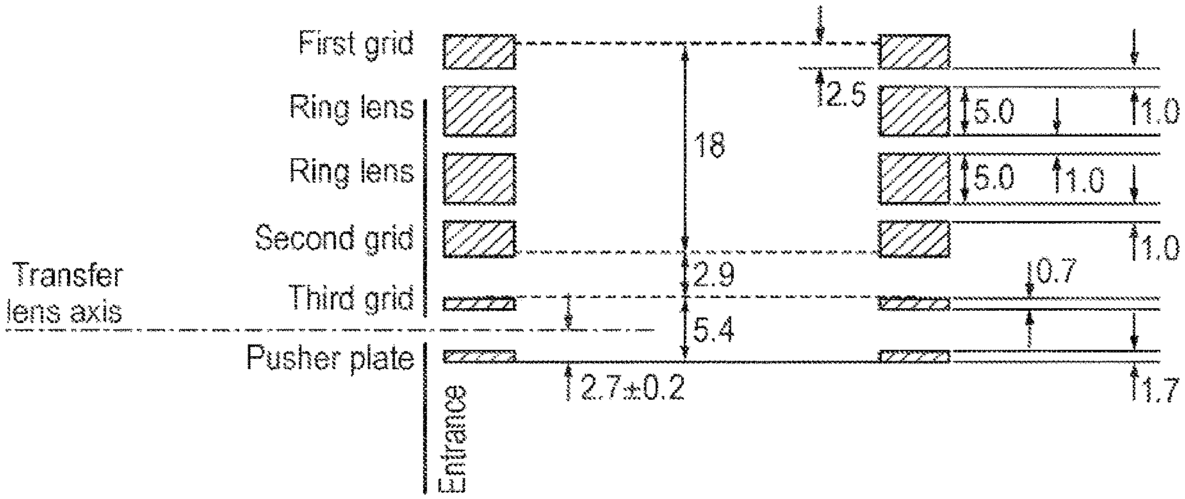
FIG. 16C illustrates in more detail the pusher electrode geometry and shows the arrangement of grid and ring lenses or electrodes and their relative spacing.

The pusher electrode may comprise a double grid electrode arrangement having a 2.9 mm field free region between a second and third grid electrode as shown in more detail in FIG. 16C.

Figure 11:
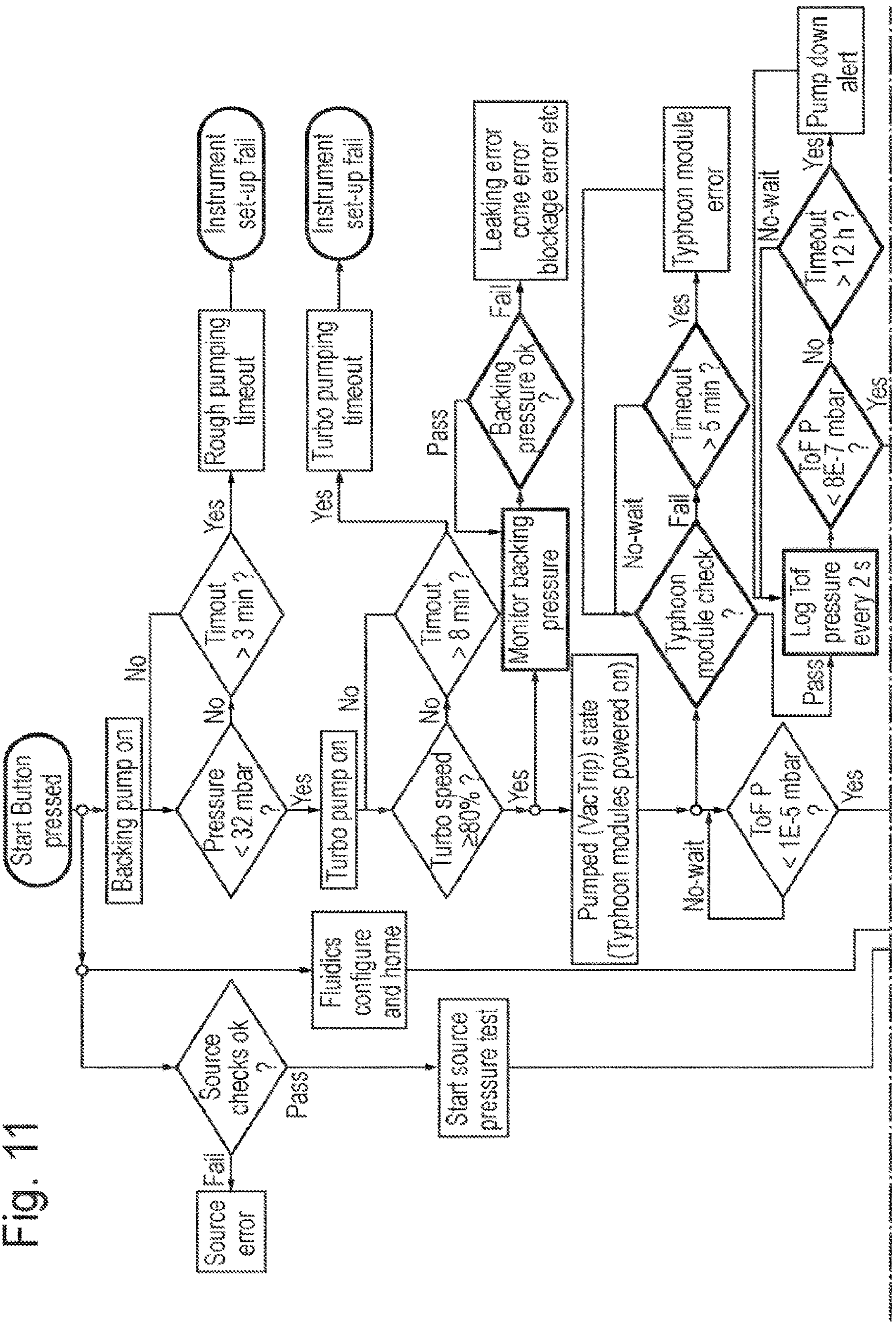
FIG. 11 shows a flow diagram illustrating various processes which occur upon a user pressing a start button on the front panel of the instrument according to various embodiments.
Figure 11:
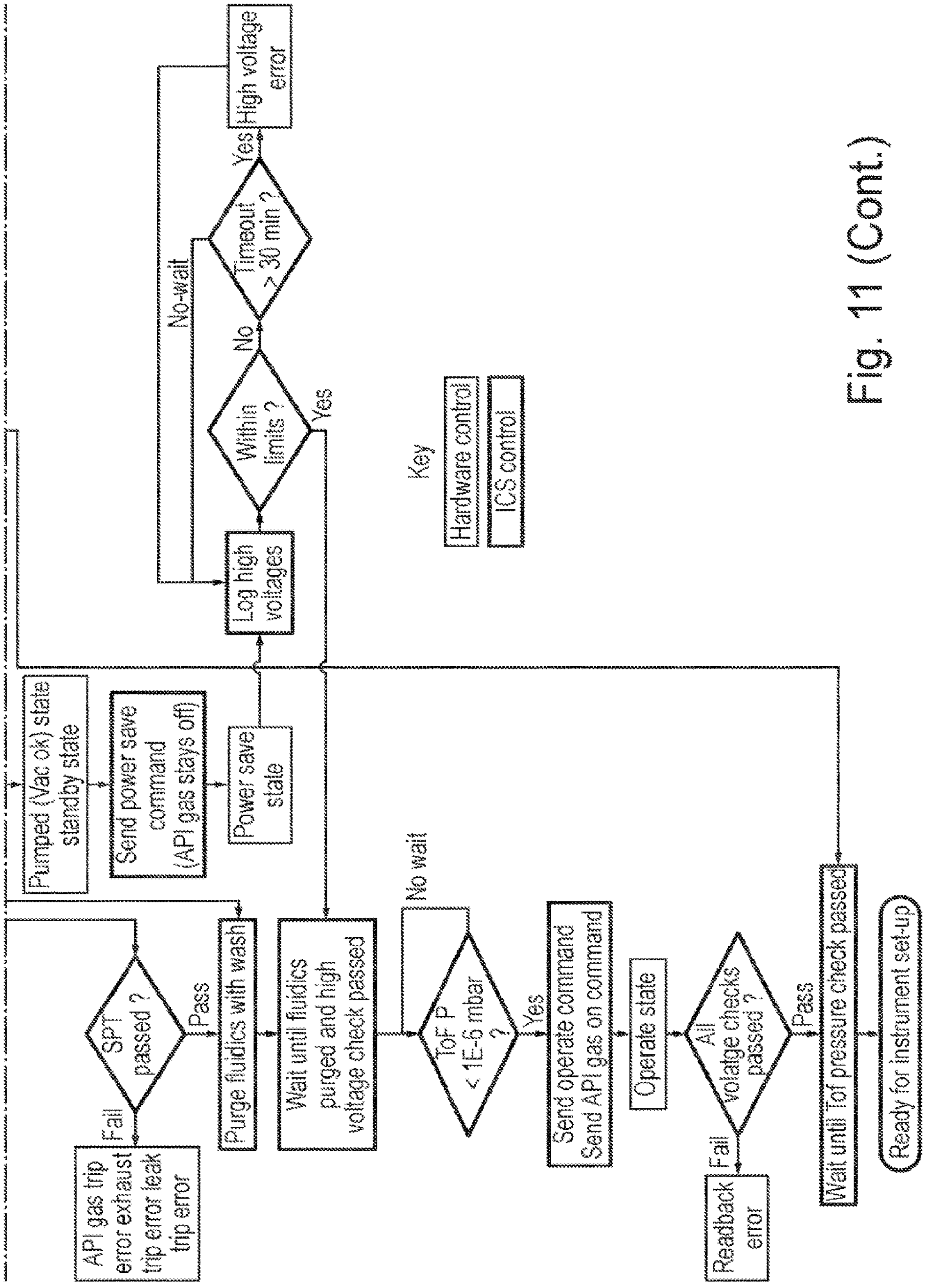

FIG. 11 shows a flow diagram illustrating various processes which may occur once a start button has been pressed.

According to an embodiment when the backing pump is turned ON a check may be made that the pressure is <32 mbar within three minutes of operation. If a pressure of <32 mbar is not achieved or established within three minutes of operation then a rough pumping timeout (amber) warning may be issued.

Figure 12A:
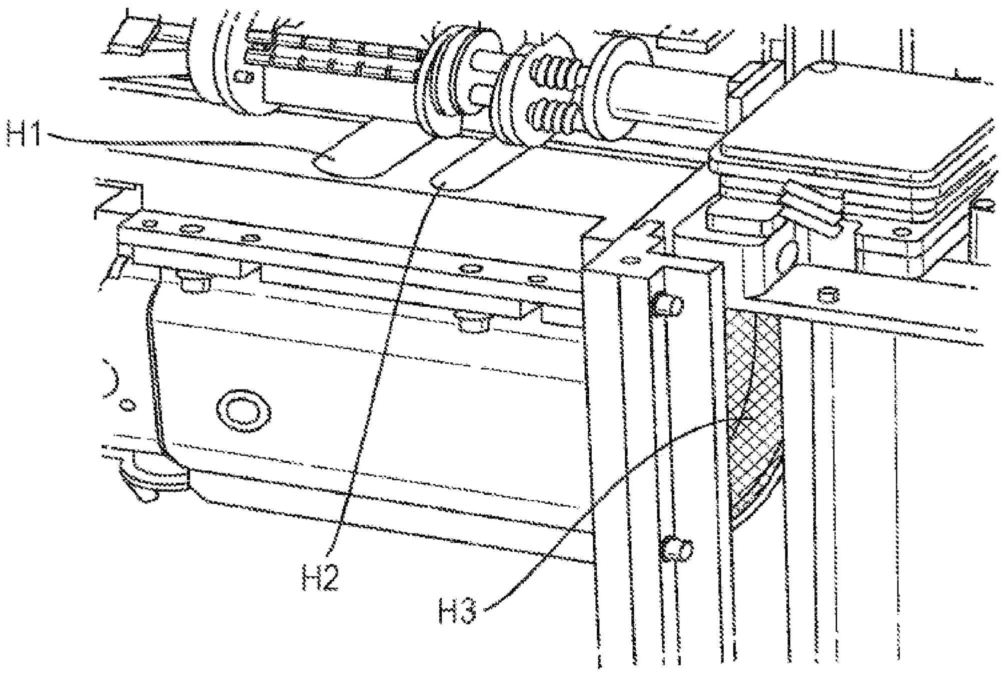
FIG. 12A shows in greater detail three separate pumping ports of a turbo molecular pump according to various embodiments and FIG. 12B shows in greater detail two of the three pumping ports which are arranged to pump separate vacuum chambers.

FIG. 12A shows the three different pumping ports of the turbo molecular pump according to various embodiments. The first pumping port H1 may be arranged adjacent the segmented quadrupole rod set 302. The second pumping port H2 may be arranged adjacent a first lens set of the transfer lens arrangement 303. The third pumping port (which may be referred to either as the H port or the H3 port) may be directly connected to Time of Flight mass analyser 304 vacuum chamber.

Figure 12B:
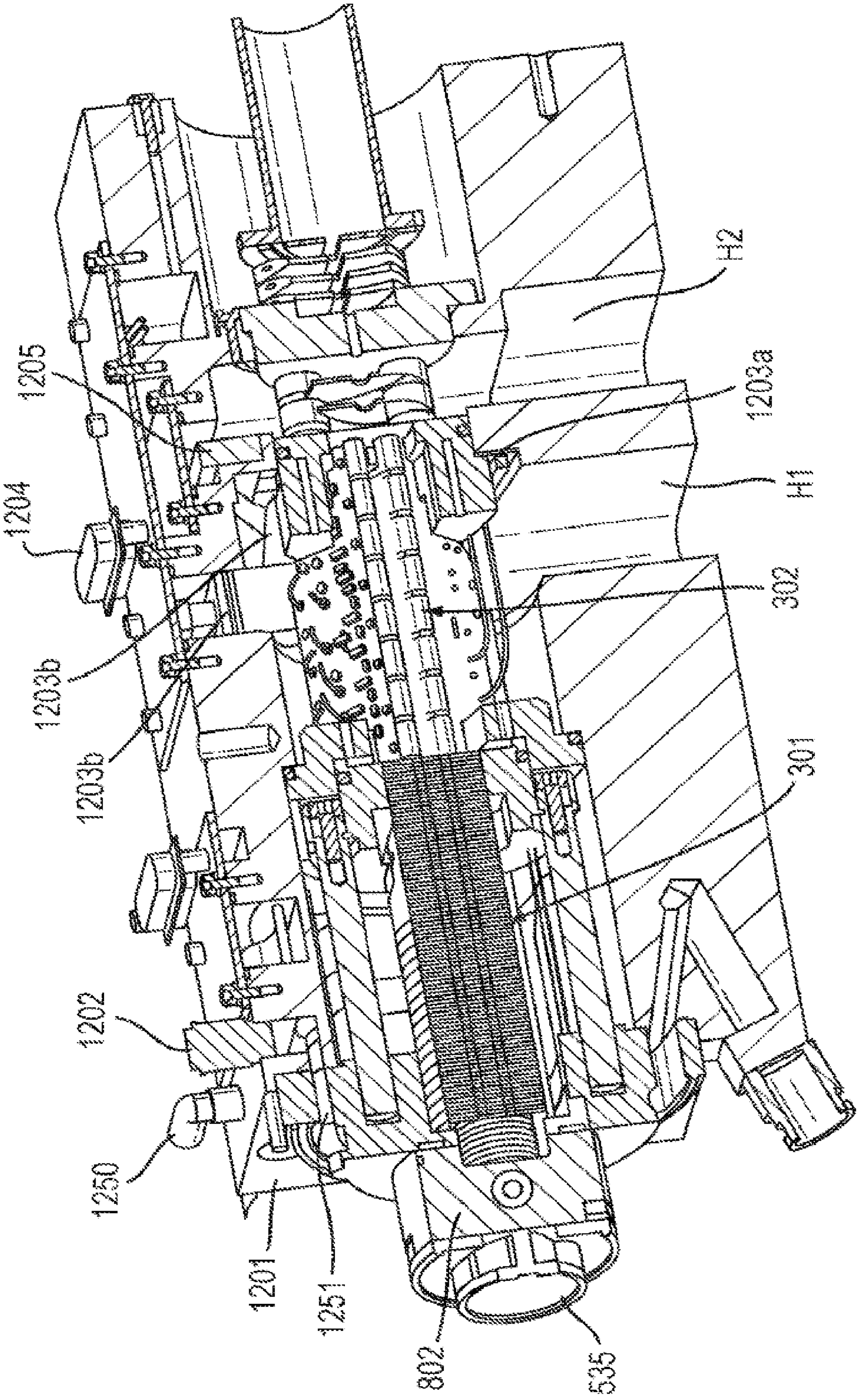

FIG. 12B shows from a different perspective the first pumping port H1 and the second pumping port H2. The user clamp 535 which is mounted in use to the ion block 802 is shown. The first ion guide 301 and the quadrupole rod set ion guide 302 are also indicated. A nebuliser or cone gas input 1201 is also shown. An access port 1251 is provided for measuring pressure in the source. A direct pressure sensor is provided (not fully shown) for measuring the pressure in the vacuum chamber housing the initial ion guide 301 and which is in fluid communication with the internal volume of the ion block 802. An elbow fitting 1250 and an over pressure relief valve 1202 are also shown.

One or more part-rigid and part-flexible printed circuit boards ("PCBs") may be provided. According to an embodiment a printed circuit board may be provided which comprises a rigid portion 1203*a* which is located at the exit of the quadrupole rod set region 302 and which is optionally at least partly arranged perpendicular to the optic axis or direction of ion travel through the quadrupole rod set 302. An upper or other portion of the printed circuit board may comprise a flexible portion 1203*b* so that the flexible portion 1203*b* of the printed circuit board has a stepped shape in side profile as shown in FIG. 12B.

According to various embodiments the H1 and H2 pumping ports may comprise EMC splinter shields.

It is also contemplated that the turbo pump may comprise dynamic EMC sealing of the H or H3 port. In particular, an EMC mesh may be provided on the H or H3 port.

Figure 13:
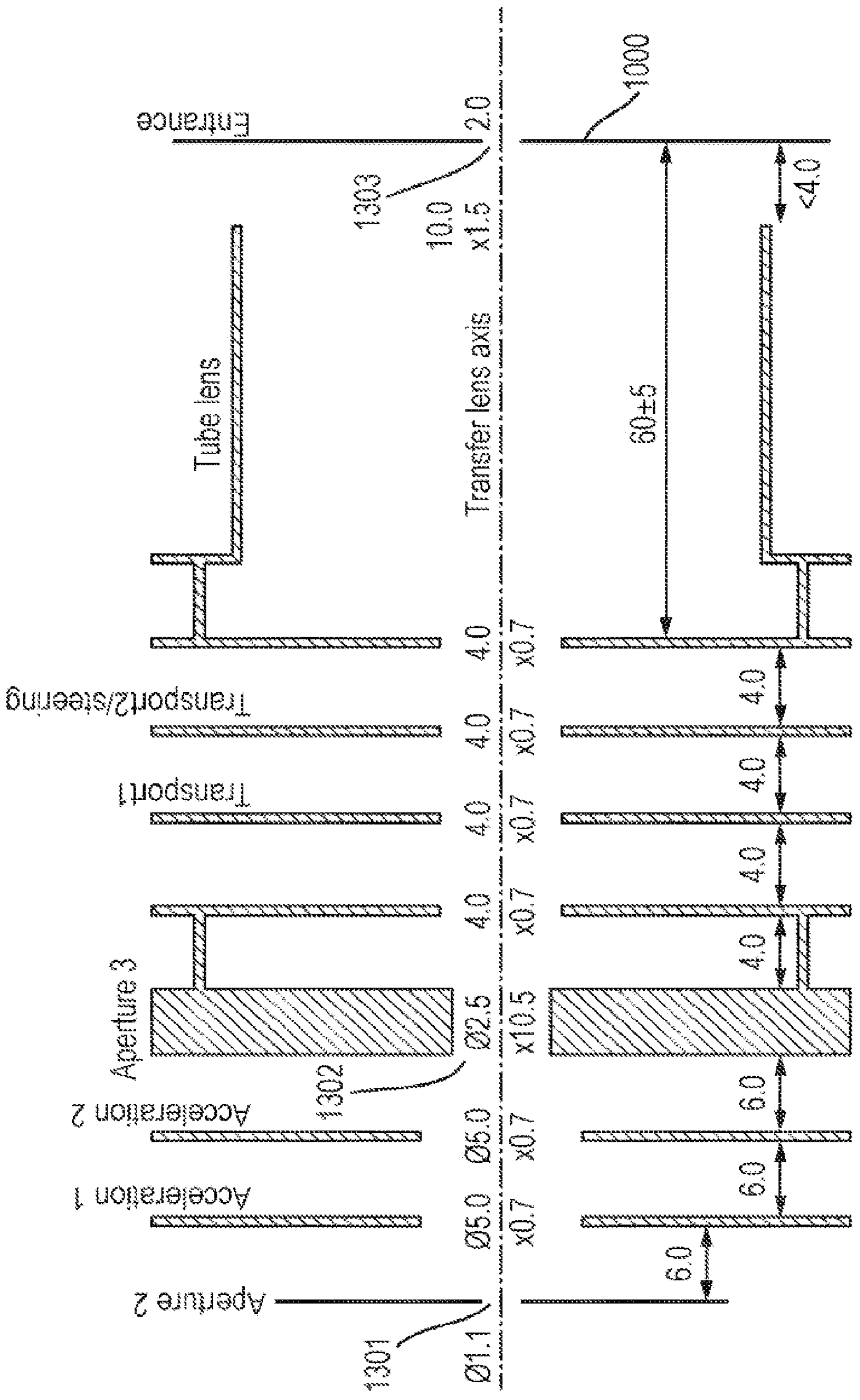
FIG. 13 shows in more detail a transfer lens arrangement.

FIG. 13 shows in more detail the transfer lens arrangement 303 and shows a second differential pumping aperture (Aperture #2) 1301 which separates the vacuum chamber housing the segmented quadrupole rod set 302 from first transfer optics which may comprise two acceleration electrodes. The relative spacing of the lens elements, their internal diameters and thicknesses according to an embodiment are shown. However, it should be understood that the relative spacing, size of apertures and thicknesses of the electrodes or lens elements may be varied from the specific values indicated in FIG. 13.

The region upstream of the second aperture (Aperture #2) 1301 may be in fluid communication with the first pumping port H1 of the turbo pump. A third differential pumping aperture (Aperture #3) 1302 may be provided between the first transfer optics and second transfer optics.

The region between the second aperture (Aperture #2) 1301 and the third aperture (Aperture #3) 1302 may be in fluid communication with the second pumping port H2 of the turbo pump.

The second transfer optics which is arranged downstream of the third aperture 1302 may comprises a lens arrangement comprising a first electrode which is electrical connection with the third aperture (Aperture #3) 1302. The lens arrangement may further comprise a second (transport) lens and a third (transport/steering) lens. Ions passing through the second transfer optics then pass through a tube lens before passing through an entrance aperture 1303. Ions passing through the entrance aperture 1303 pass through a slit or entrance plate 1000 into a pusher electrode assembly module.

The lens apertures after Aperture #3 1302 may comprise horizontal slots or plates. Transport 2/steering lens may comprise a pair of half plates.

The entrance plate 1000 may be arranged to be relatively easily removable by a service engineer for cleaning purposes.

One or more of the lens plates or electrodes which form a part of the overall transfer optics 303 may be manufactured by introducing an overcompensation etch of 5%. An additional post etch may also be performed. Conventional lens plates or electrodes may have a relatively sharp edge as a result of the manufacturing process. The sharp edges can cause electrical breakdown with conventional arrangements. Lens plates or electrodes which may be fabricated according to various embodiments using an overcompensation etching approach and/or additional post etch may have significantly reduced sharp edges which reduces the potential for electrical breakdown as well as reducing manufacturing cost.

Figure 14A:
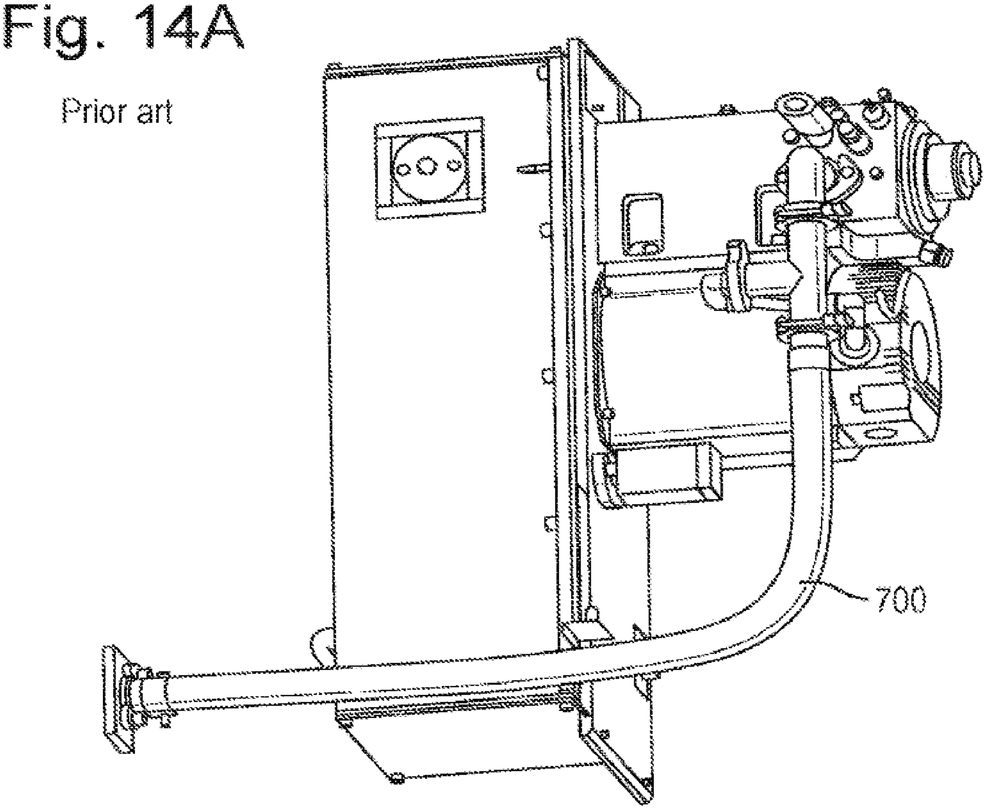
Fig. 14A Prior art
FIG. 14A shows details of a known internal vacuum configuration and FIG. 14B shows details of a new internal vacuum configuration according to various embodiments.
Figure 14B:
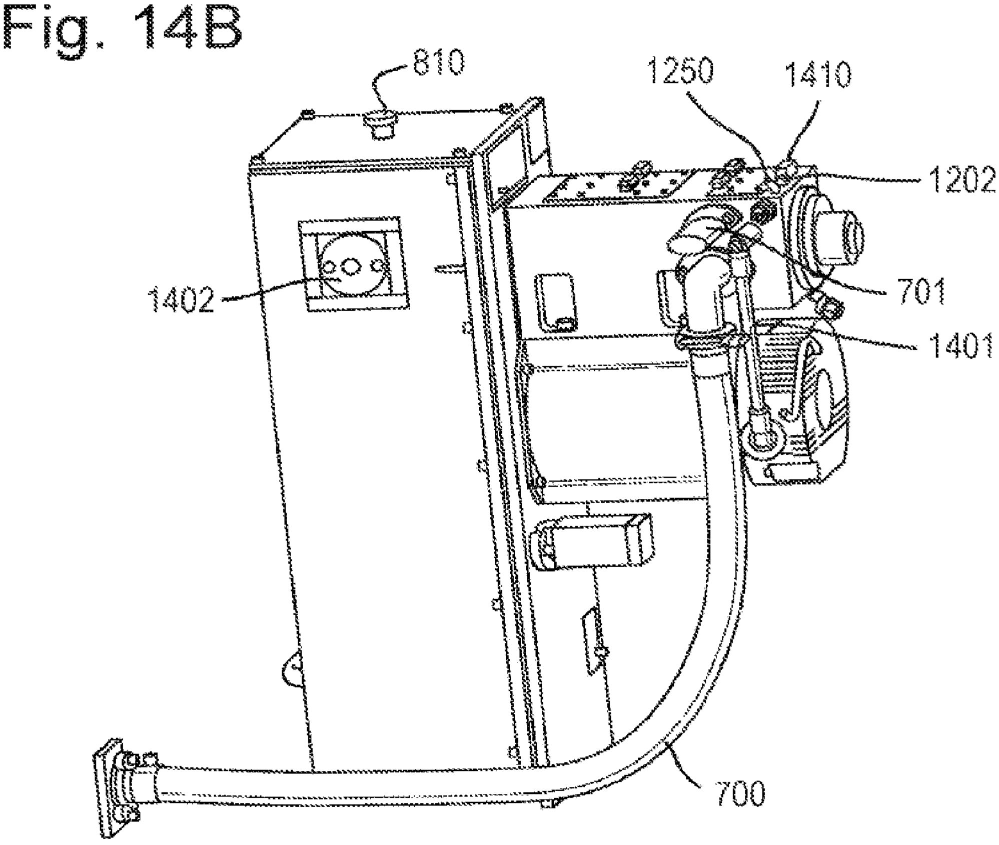

FIG. 14A shows details of a known internal vacuum configuration and FIG. 14B shows details of a new internal vacuum configuration according to various embodiments.

A conventional arrangement is shown in FIG. 14A wherein the connection 700 from the backing pump to the first vacuum chamber of a mass spectrometer makes a T-connection into the turbo pump when backing pressure is reached. However, this requires multiple components so that multiple separate potential leak points are established. Furthermore, the T-connection adds additional manufacturing and maintenance costs.

FIG. 14B shows an embodiment wherein the backing pump 700 is only directly connected to the first vacuum chamber i.e. the T-connection is removed. A separate connection 1401 is provided between the first vacuum chamber and the turbo pump.

A high voltage supply feed through 1402 is shown which provides a high voltage (e.g. 1.1 kV) to the pusher electrode module 305. An upper access panel 810 is also shown. A Pirani pressure gauge 701 is arranged to measure the vacuum pressure in the vacuum chamber housing the first ion guide 301. An elbow gas fitting 1250 is shown through which desolvation/cone gas may be supplied. With reference to FIG. 14B, behind the elbow gas fitting 1250 is shown the over pressure relief valve 1202 and behind the over pressure relief valve 1202 is shown a further elbow fitting which enables gas pressure from the source to be directly measured.

Figure 15A:
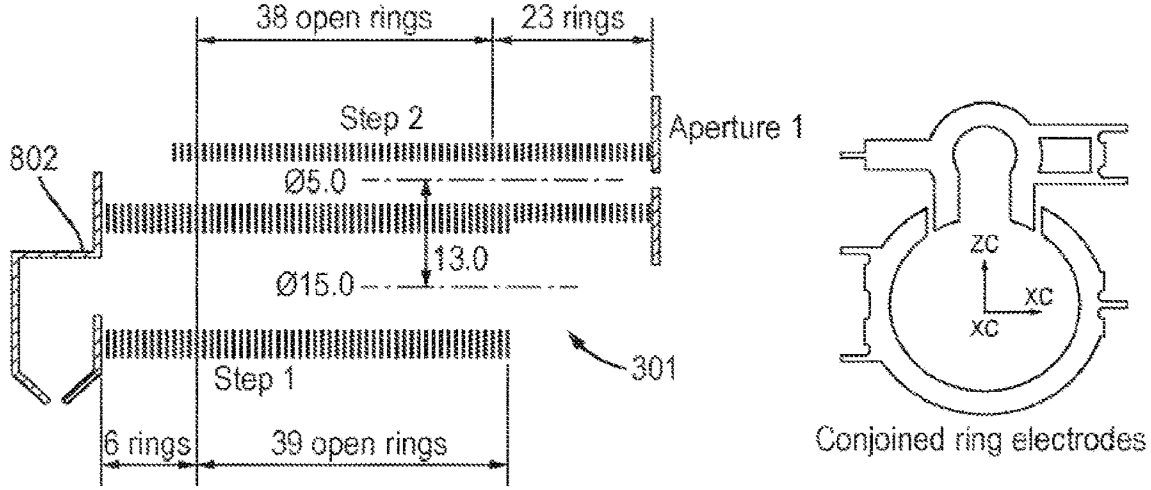
FIG. 15A shows a schematic of an arrangement of ring electrodes and conjoined ring electrodes forming a first ion guide which is arranged to separate charged ions from undesired neutral particles.

FIG. 15A shows a schematic of the ion block 802 and source or first ion guide 301. According to an embodiment the source or first ion guide 301 may comprise six initial ring electrodes followed by 38-39 open ring or conjoined electrodes. The source or first ion guide 301 may conclude with a further 23 rings. It will be appreciated, however, that the particular ion guide arrangement 301 shown in FIG. 15A may be varied in a number of different ways. In particular, the number of initial ring electrodes (e.g. 6) and/or the number of final stage (e.g. 23) ring electrodes may be varied. Similarly, the number of intermediate open ring or conjoined ring electrodes (e.g. 38-39) may also be varied.

It should be understood that the various dimensions illustrated on FIG. 15A are for illustrative purposes only and are not intended to be limiting. In particular, embodiments are contemplated wherein the sizing of ring and/or conjoined ring electrodes may be different from that shown in FIG. 15A.

A single conjoined ring electrode is also shown in FIG. 15A.

According to various embodiment the initial stage may comprise 0-5, 5-10, 10-15, 15-20, 20-25, 25-30, 30-35, 35-40, 40-45, 45-50 or >50 ring or other shaped electrodes. The intermediate stage may comprise 0-5, 5-10, 10-15, 15-20, 20-25, 25-30, 30-35, 35-40, 40-45, 45-50 or >50 open ring, conjoined ring or other shaped electrodes. The final stage may comprise 0-5, 5-10, 10-15, 15-20, 20-25, 25-30, 30-35, 35-40, 40-45, 45-50 or >50 ring or other shaped electrodes.

The ring electrodes and/or conjoined ring electrodes may have a thickness of 0.5 mm and a spacing of 1.0 mm. However, the electrodes may have other thicknesses and/or different spacings.

Aperture #1 plate may comprise a differential pumping aperture and may have a thickness of 0.5 mm and an orifice diameter of 1.50 mm. Again, these dimensions are illustrative and are not intended to be limiting.

A source or first ion guide RF voltage may be applied to all Step 1 and Step 2 electrodes in a manner as shown in FIG. 15A. The source or first ion guide RF voltage may comprise 200 V peak-to-peak at 1.0 MHz.

Embodiments are contemplated wherein a linear voltage ramp may be applied to Step 2 Offset (cone).

The Step 2 Offset (cone) voltage ramp duration may be made equal to the scan time and the ramp may start at the beginning of a scan. Initial and final values for the Step 2 Offset (cone) ramp may be specified over the complete range of Step 2 Offset (cone).

Figure 15B:
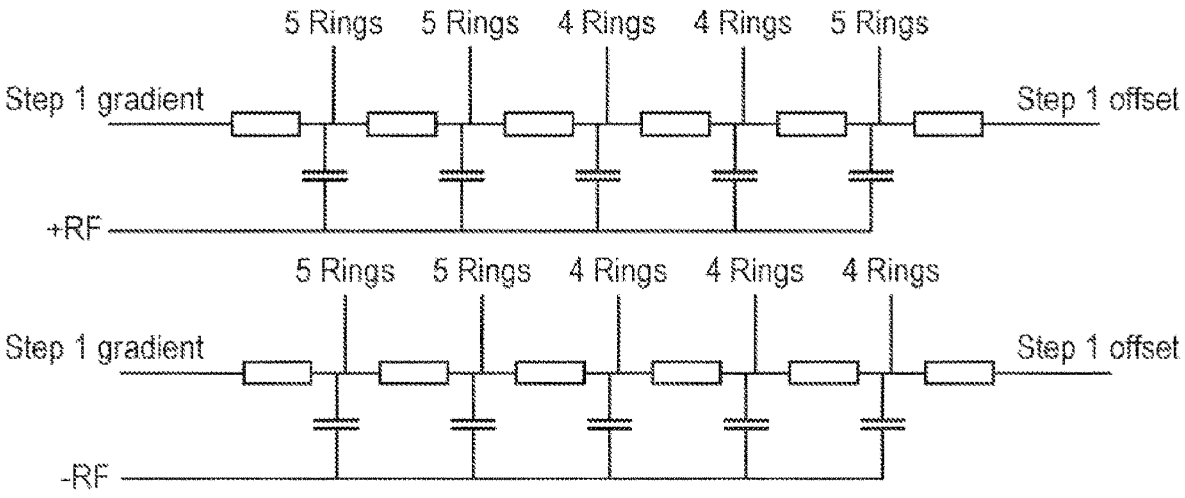
FIG. 15B shows a resistor chain which may be used to produce a linear axial DC electric field along the length of a first portion of the first ion guide and FIG. 15C shows a resistor chain which may be used to produce a linear axial DC electric field along the length of a second portion of the first ion guide.

According to various embodiments a resistor chain as shown in FIG. 15B may be used to produce a linear axial field along the length of Step 1. Adjacent ring electrodes may have opposite phases of RF voltage applied to them.

Figure 15C:
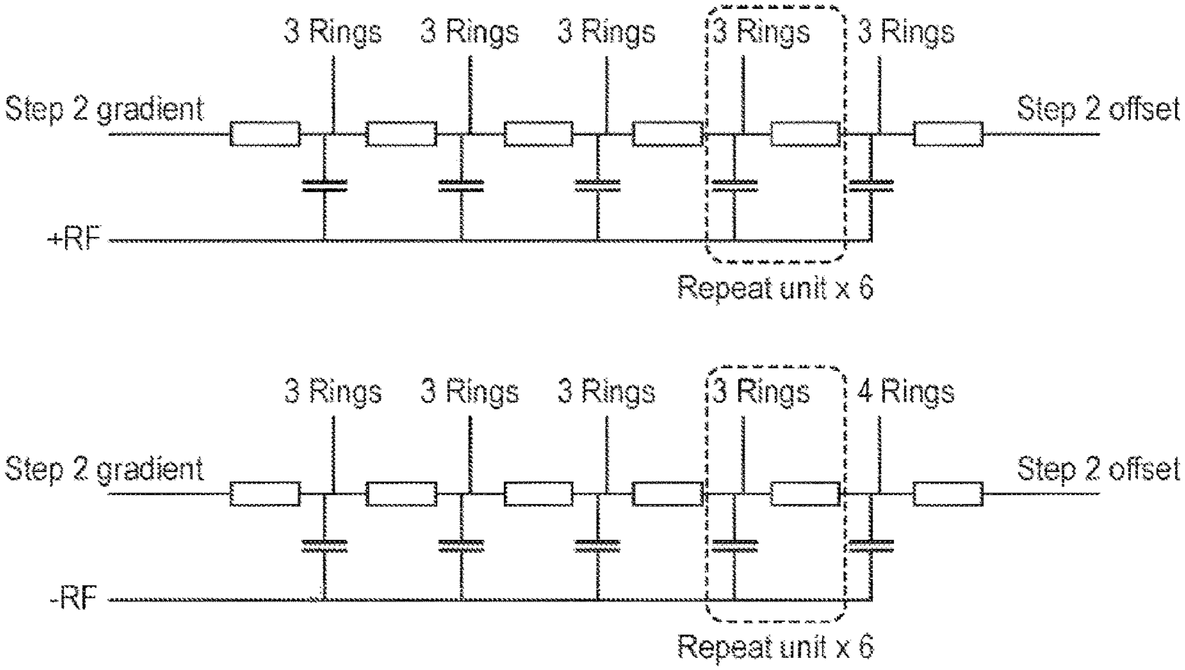

A resistor chain may also be used to produce a linear axial field along the length of Step 2 as shown in FIG. 15C. Adjacent ring electrodes may have opposite phases of RF voltage applied to them.

Embodiments are contemplated wherein the RF voltage applied to some or substantially all the ring and conjoined ring electrodes forming the first ion guide 301 may be reduced or varied in order to perform a non-mass to charge ratio specific attenuation of the ion beam. For example, as will be appreciated, with a Time of Flight mass analyser 304 the ion detector 307 may suffer from saturation effects if an intense ion beam is received at the pusher electrode 305. Accordingly, the intensity of the ion beam arriving adjacent the pusher electrode 305 can be controlled by varying the RF voltage applied to the electrodes forming the first ion guide 301. Other embodiments are also contemplated wherein the RF voltage applied to the electrodes forming the second ion guide 302 may additionally and/or alternatively be reduced or varied in order to attenuate the ion beam or otherwise control the intensity of the ion beam. In particular, it is desired to control the intensity of the ion beam as received in the pusher electrode 305 region.

FIG. 16A shows in more detail the quadrupole ion guide 302 according to various embodiments. The quadrupole rods may have a diameter of 6.0 mm and may be arranged with an inscribed radius of 2.55 mm. Aperture #2 plate which may comprise a differential pumping aperture may have a thickness of 0.5 mm and an orifice diameter of 1.50 mm. The various dimensions shown in FIG. 16A are intended to be illustrative and non-limiting.

The ion guide RF amplitude applied to the rod electrodes may be controllable over a range from 0 to 800 V peak-to-peak.

The ion guide RF voltage may have a frequency of 1.4 MHz. The RF voltage may be ramped linearly from one value to another and then held at the second value until the end of a scan.

As shown in FIG. 16B, the voltage on the Aperture #2 plate may be pulsed in an Enhanced Duty Cycle mode operation from an Aperture 2 voltage to an Aperture 2 Trap voltage. The extract pulse width may be controllable over the range 1-25 μs. The pulse period may be controllable over the range 22-85 μs. The pusher delay may be controllable over the range 0-85 μs.

FIG. 16C shows in more detail the pusher electrode arrangement. The grid electrodes may comprise Ø 60 parallel wire with 92% transmission (Ø 0.018 mm parallel wires at 0.25 mm pitch). The dimensions shown are intended to be illustrative and non-limiting.

Figure 16D:
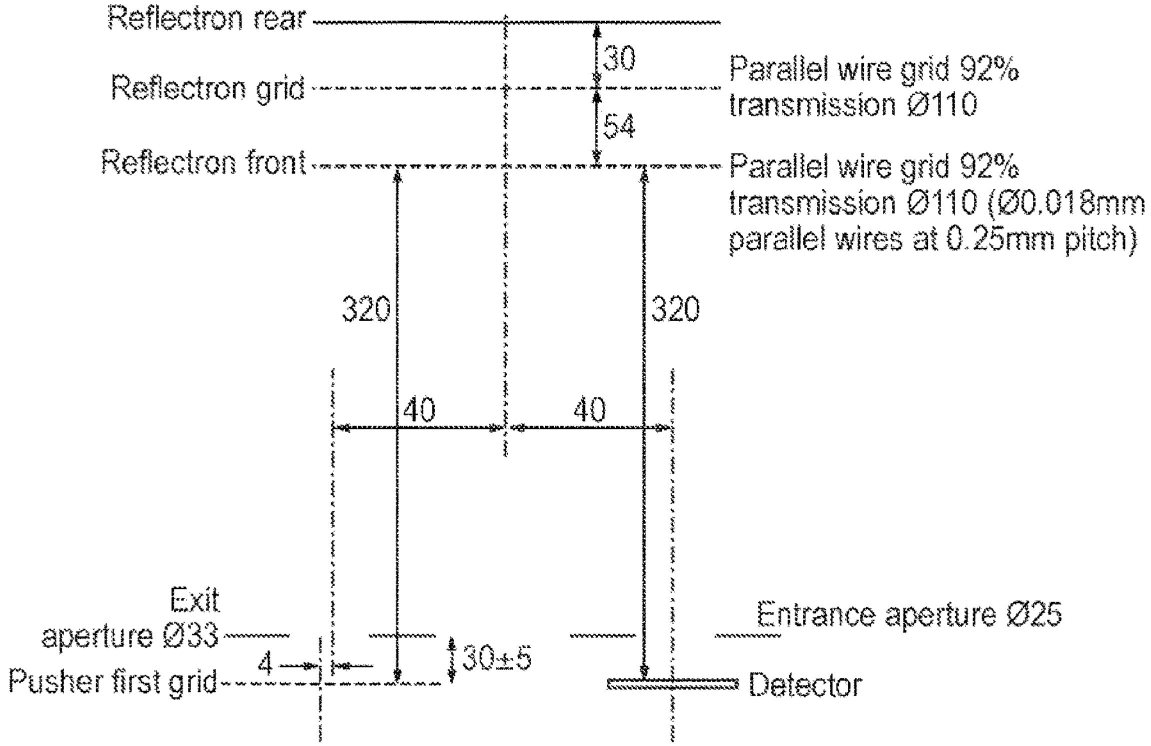
FIG. 16D illustrates in more detail the overall geometry of the Time of Flight mass analyser including the relative spacings of elements of the pusher electrode and associated electrodes, the reflectron grid electrodes and the ion detector.

FIG. 16D shows in more detail the Time of Flight geometry. The region between the pusher first grid, reflectron first grid and the detector grid preferably comprises a field free region. The position of the ion detector 307 may be defined by the ion impact surface in the case of a MagneTOF® ion detector or the surface of the front MCP in the case of a MCP detector.

The reflectron ring lenses may be 5 mm high with 1 mm spaces between them. The various dimensions shown in FIG. 16D are intended to be illustrative and non-limiting.

According to various embodiments the parallel wire grids may be aligned with their wires parallel to the instrument axis. It will be understood that the instrument axis runs through the source or first ion guide 301 through to the pusher electrode assembly 305.

A flight tube power supply may be provided which may have an operating output voltage of either +4.5 kV or −4.5 kV depending on the polarity requested.

A reflectron power supply may be provided which may have an operating output voltage ranging from 1625±100 V or −1625±100 V depending on the polarity requested.

Figure 16E:
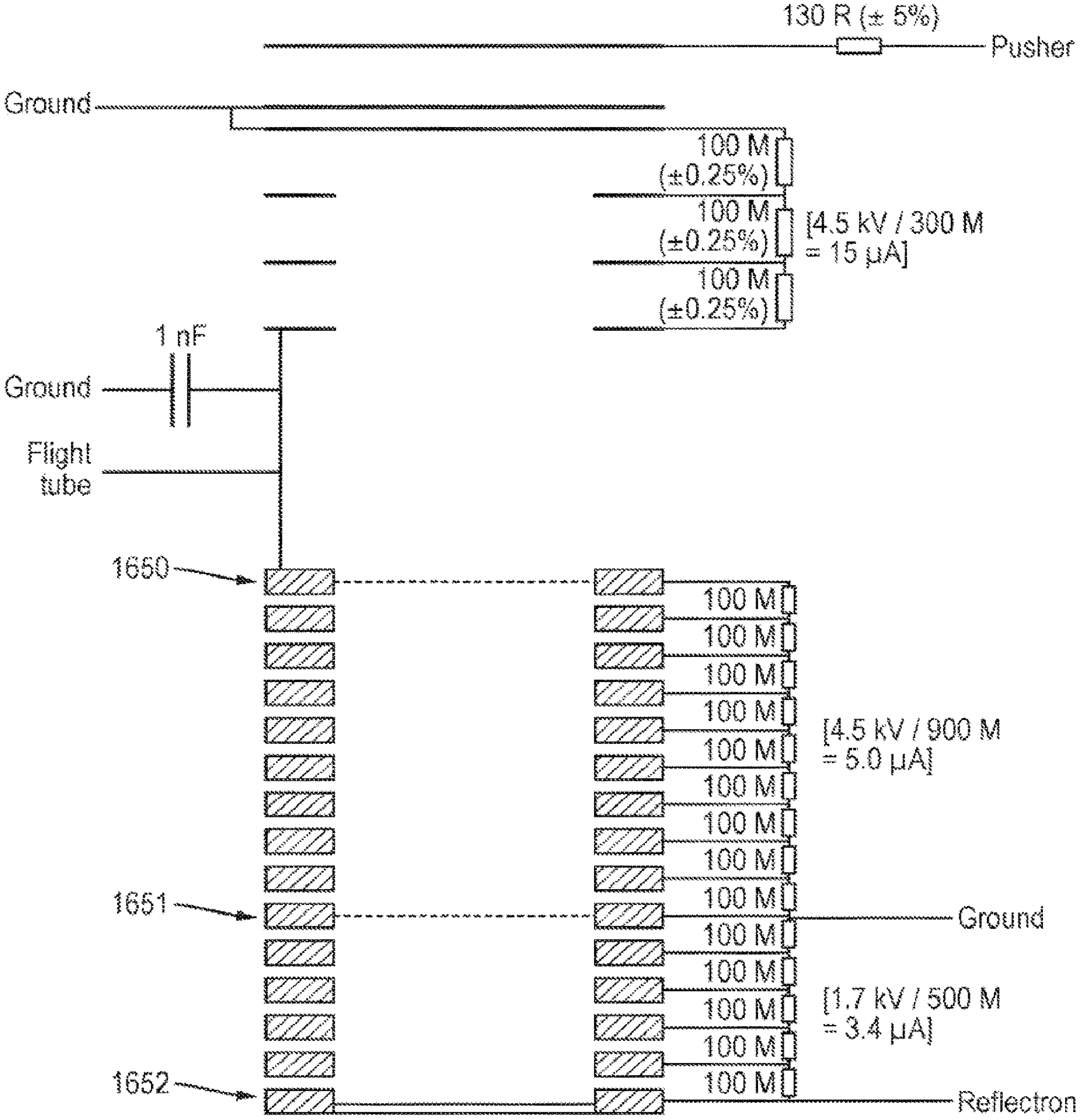
FIG. 16E is a schematic illustrating the wiring arrangement according to various embodiments of the pusher electrode and associated grid and ring electrodes and the grid and ring electrodes forming the reflectron.

FIG. 16E is a schematic of the Time of Flight wiring according to an embodiment. The various resistor values, voltages, currents and capacitances are intended to be illustrative and non-limiting.

According to various embodiments a linear voltage gradient may be maintained along the length of the reflectron 306. In a particular embodiment a reflectron clamp plate may be maintained at the reflectron voltage.

An initial electrode and associated grid 1650 of the reflectron 306 may be maintained at the same voltage or potential as the flight tube 807 and the last electrode of the pusher electrode assembly 305. According to an embodiment the initial electrode and associated grid 1650 of the reflectron 306, the flight tube 807 and the last electrode and associated grid of the pusher electrode assembly 305 may be maintained at a voltage or potential of e.g. 4.5 kV of opposite polarity to the instrument or mode of operation. For example, in positive ion mode the initial electrode and associated grid 1650 of the reflectron 306, the flight tube 807 and the last electrode and associated grid of the pusher electrode assembly 305 may be maintained at a voltage or potential of −4.5 kV.

The second grid electrode 1651 of the reflectron 306 may be maintained at ground or 0V.

The final electrode 1652 of the reflectron 306 may be maintained at a voltage or potential of 1.725 kV of the same polarity as the instrument. For example, in positive ion mode the final electrode 1652 of the reflectron 306 may be maintained at a voltage or potential of +1.725 kV.

It will be understood by those skilled in the art that the reflectron 306 acts to decelerate ions arriving from the time of flight region and to redirect the ions back out of the reflectron 306 in the direction of the ion detector 307.

The voltages and potentials applied to the reflectron 306 according to various embodiments and maintaining the second grid electrode 1651 of the reflectron at ground or 0V is different from the approach adopted in conventional reflectron arrangements.

The ion detector 307 may always be maintained at a positive voltage relative to the flight tube voltage or potential. According to an embodiment the ion detector 307 may be maintained at a +4 kV voltage relative to the flight tube.

Accordingly, in a positive ion mode of operation if the flight tube is maintained at an absolute potential or voltage of −4.5 kV then the detector may be maintained at an absolute potential or voltage of −0.5 kV.

FIG. 16F shows the DC lens supplies according to an embodiment. It will be understood that Same polarity means the same as instrument polarity and that Opposite polarity means opposite to instrument polarity. Positive means becomes more positive as the control value is increased and Negative means becomes more negative as the control value is increased. The particular values shown in FIG. 16F are intended to be illustrative and non-limiting.

Figure 16G:
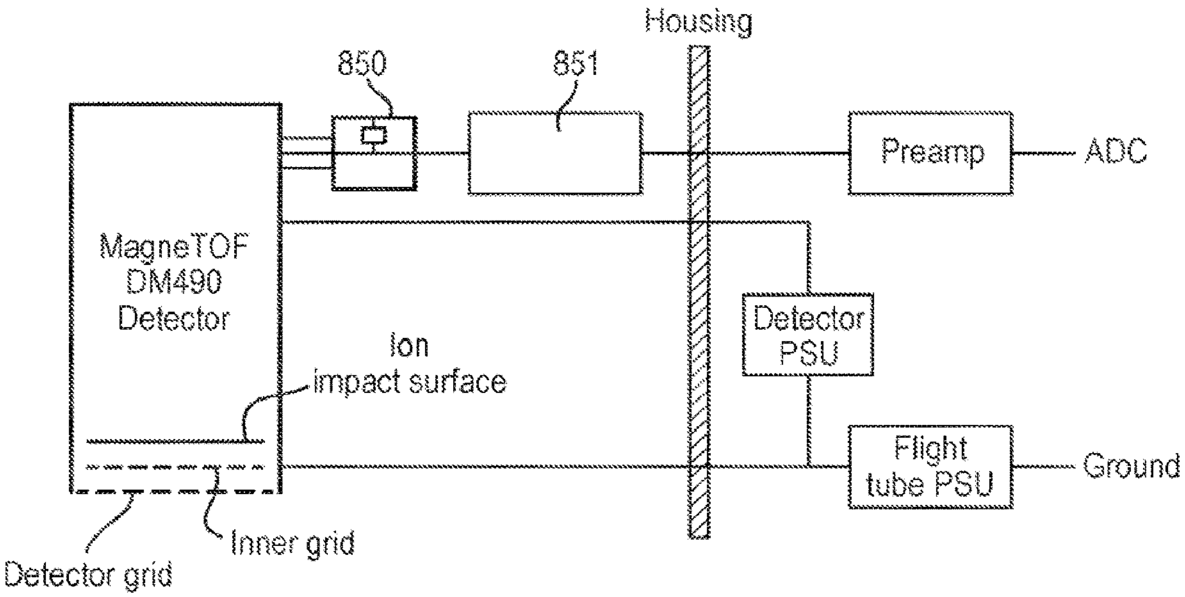
FIG. 16G is a schematic of an ion detector arrangement according to various embodiments and which shows various connections to the ion detector which are located both within and external to the Time of Flight housing and FIG. 16H shows an illustrative potential energy diagram.

FIG. 16G shows a schematic of an ion detector arrangement according to various embodiments. The detector grid may form part of the ion detector 307. The ion detector 307 may, for example, comprise a MagneTOF® DM490 ion detector. The inner grid electrode may be held at a voltage of +1320 V with respect to the detector grid and flight tube via a series of zener diodes and resistors. The ion detector 307 may be connected to a SMA 850 and an AC coupler 851 which may both be provided within or internal to the mass analyser housing or within the mass analyser vacuum chamber. The AC coupler 851 may be connected to an externally located preamp which in turn may be connected to an Analogue to Digital Converter ("ADC") module.

Figure 16H:
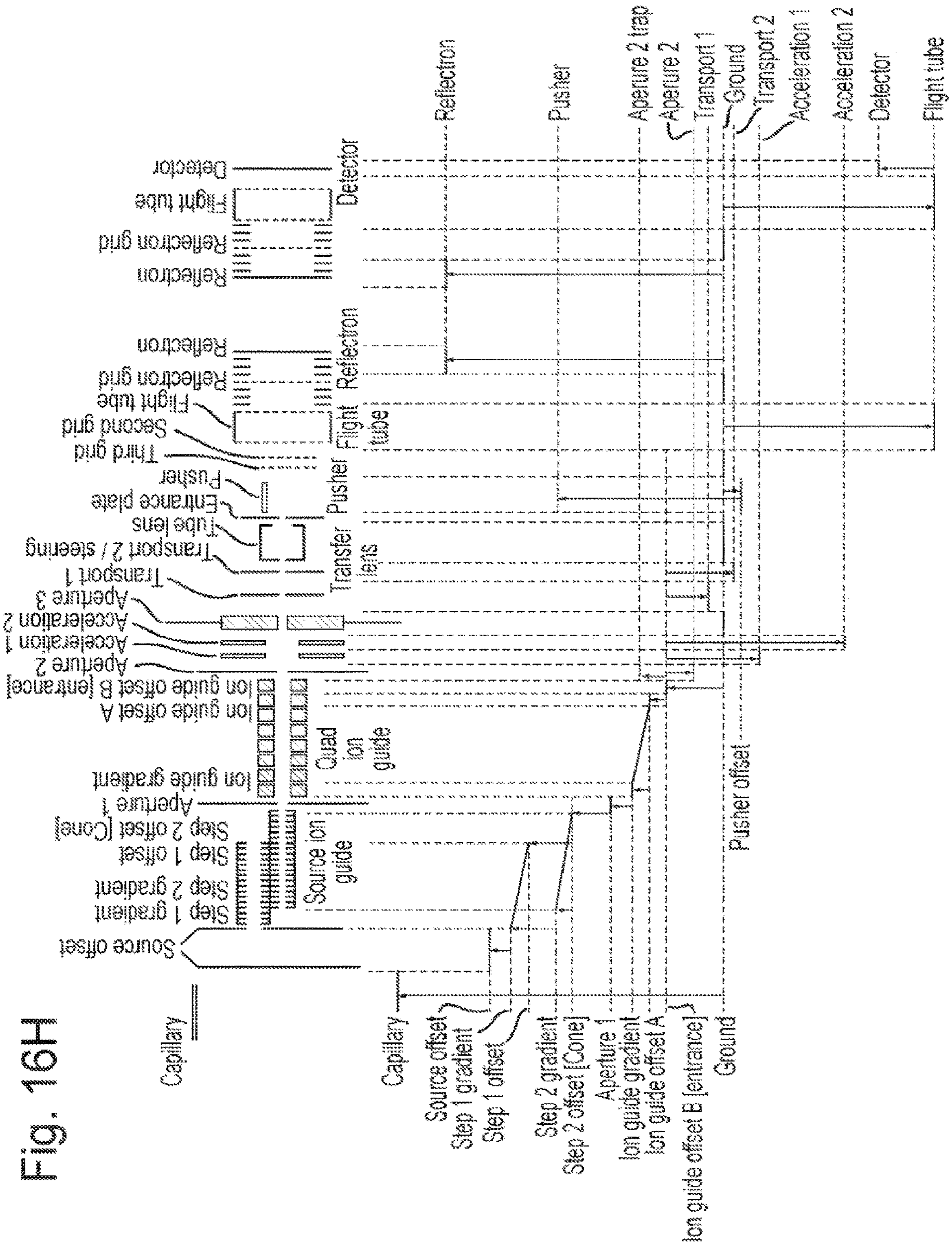

FIG. 16H shows a potential energy diagram for an instrument according to various embodiments. The potential energy diagram represents an instrument in positive ion mode. In negative ion mode all the polarities are reversed except for the detector polarity. The particular voltages/potentials shown in FIG. 16H are intended to be illustrative and non-limiting.

The instrument may include an Analogue to Digital Converter ("ADC") which may be operated in peak detecting ADC mode with fixed peak detecting filter coefficients. The ADC may also be run in a Time to Digital Converter ("TDC") mode of operation wherein all detected ions are assigned unit intensity. The acquisition system may support a scan rate of up to 20 spectra per second. A scan period may range from 40 ms to 1 s. The acquisition system may support a maximum input event rate of $7\times10^6$ events per second.

According to various embodiments the instrument may have a mass accuracy of 2-5 ppm may have a chromatographic dynamic range of $10^4$. The instrument may have a high mass resolution with a resolution in the range 10000-15000 for peptide mapping. The mass spectrometer 100 is preferably able to mass analyse intact proteins, glycoforms and lysine variants. The instrument may have a mass to charge ratio range of approx. 8000.

Instrument testing was performed with the instrument fitted with an ESI source 401. Sample was infused at a flow rate of 400 mL/min. Mass range was set to m/z 1000. The instrument was operated in positive ion mode and high resolution mass spectral data was obtained.

According to various embodiments the instrument may have a single analyser tune mode i.e. no sensitivity and resolution modes.

According to various embodiments the resolution of the instrument may be in the range 10000-15000 for high mass or mass to charge ratio ions such as peptide mapping applications. The resolution may be determined by measuring on any singly charged ion having a mass to charge ratio in the range 550-650.

The resolution of the instrument may be around 5500 for low mass ions. The resolution of instrument for low mass ions may be determined by measuring on any singly charged ion having a mass to charge ratio in the range 120-150.

According to various embodiments the instrument may have a sensitivity in MS positive ion mode of approx. 11,000 counts/second. The mass spectrometer 100 may have a mass accuracy of approx. 2-5 ppm Mass spectral data obtained according to various embodiments was observed as having reduced in-source fragmentation compared with conventional instruments. Adducts are reduced compared with conventional instruments. The mass spectral data also has cleaner valleys (<20%) for mAb glycoforms.

As disclosed in US 2015/0076338 (Micromass), the contents of which are incorporated herein by reference, the instrument according to various embodiment may comprise a plurality of discrete functional modules. The functional modules may comprise, for example, electrical, mechanical, electromechanical or software components. The modules may be individually addressable and may be connected in a network. A scheduler may be arranged to introduce discrete packets of instructions to the network at predetermined times in order to instruct one or more modules to perform various operations. A clock may be associated with the scheduler.

The functional modules may be networked together in a hierarchy such that the highest tier comprises the most time-critical functional modules and the lowest tier comprises functional modules which are the least time time-critical. The scheduler may be connected to the network at the highest tier.

For example, the highest tier may comprise functional modules such as a vacuum control system, a lens control system, a quadrupole control system, an electrospray module, a Time of Flight module and an ion guide module. The lowest tier may comprise functional modules such as power supplies, vacuum pumps and user displays.

The mass spectrometer 100 according to various embodiments may comprise multiple electronics modules for controlling the various elements of the spectrometer. As such, the mass spectrometer may comprise a plurality of discrete functional modules, each operable to perform a predetermined function of the mass spectrometer 100, wherein the functional modules are individually addressable and connected in a network and further comprising a scheduler operable to introduce discrete packets of instructions to the network at predetermined times in order to instruct at least one functional module to perform a predetermined operation.

The mass spectrometer 100 may comprise an electronics module for controlling (and for supplying appropriate voltage to) one or more or each of: (i) the source; (ii) the first ion guide; (iii) the quadrupole ion guide; (iv) the transfer optics; (v) the pusher electrode; (vi) the reflectron; and (vii) the ion detector.

This modular arrangement may allow the mass spectrometer to be reconfigured straightforwardly. For example, one or more different functional elements of the spectrometer may be removed, introduced or changed, and the spectrometer may be configured to automatically recognised which elements are present and to configure itself appropriately.

The instrument may allow for a schedule of packets to be sent onto the network at specific times and intervals during an acquisition. This reduces or alleviates the need for a host computer system with a real time operating system to control aspects of the data acquisition. The use of packets of information sent to individual functional modules also reduces the processing requirements of a host computer.

The modular nature conveniently allows flexibility in the design and/or reconfiguring of a mass spectrometer. According to various embodiments at least some of the functional modules may be common across a range of mass spectrometers and may be integrated into a design with minimal reconfiguration of other modules. Accordingly, when designing a new mass spectrometer, wholesale redesign of all the components and a bespoke control system are not necessary. A mass spectrometer may be assembled by connecting together a plurality of discrete functional modules in a network with a scheduler.

Furthermore, the modular nature of the mass spectrometer 100 according to various embodiments allows for a defective functional module to be replaced easily. A new functional module may simply be connected to the interface. Alternatively, if the control module is physically connected to or integral with the functional module, both can be replaced.

Figure 17:
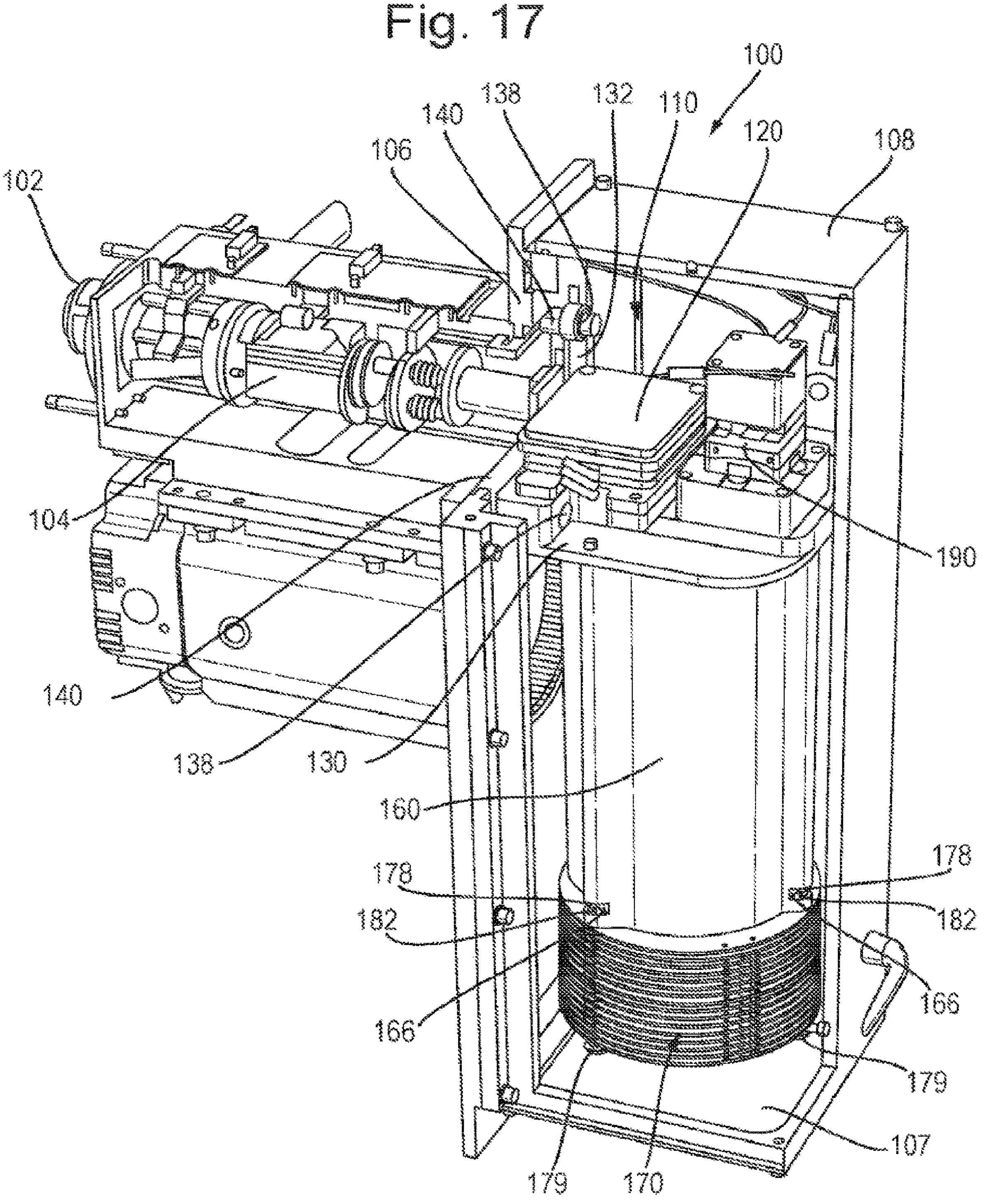
FIG. 17 shows various internal features of the mass spectrometer (e.g. as depicted in FIGS. 1, 2 and 3) including an analyser comprising a pusher assembly, a reflectron and a detector assembly.

FIG. 17 shows various internal features of a mass spectrometer 100 (e.g. as described above and/or depicted in FIGS. 1, 2 and 3).

The mass spectrometer 100 may comprise an ion inlet assembly or ion source 102 that may lead into one or more vacuum chambers enclosed in a housing 106. The housing 106 may comprise various portions that are secured together. The housing 106 may be configured to retain and house various components of the mass spectrometer 100, for example in the various portions.

A first portion 104 of the housing 106 may enclose, for example, a first ion guide comprising conjoined ring electrodes, a segmented quadrupole rod set ion guide or mass filter, and one or more transfer lenses.

The components held within the first portion 104 may be any suitable components configured to isolate ions within one or more mass to charge ratio and/or mobility ranges, which isolated ions are then passed to the second portion 108 and Time of Flight analyser therein for subsequent detection. The exact configuration of components in the first portion 104 of the mass spectrometer 100 is not critical to the broadest aspects of the present disclosure.

The housing 106 may comprise a second portion 108 that may be configured to house an analyser 110. The analyser may comprise a Time of Flight analyser (e.g. a Time of Flight mass analyser) comprising one or more of a pusher assembly 120, a pusher support assembly 130, a flight tube 160, a reflectron 170 and a detector assembly 190.

Connection of Analyser to Housing

Various embodiments of the present disclosure are directed to an assembly associated with the analyser 110, and in particular developments associated therewith for simplifying the manufacturing and maintenance of the analyser 110.

Figure 18A:
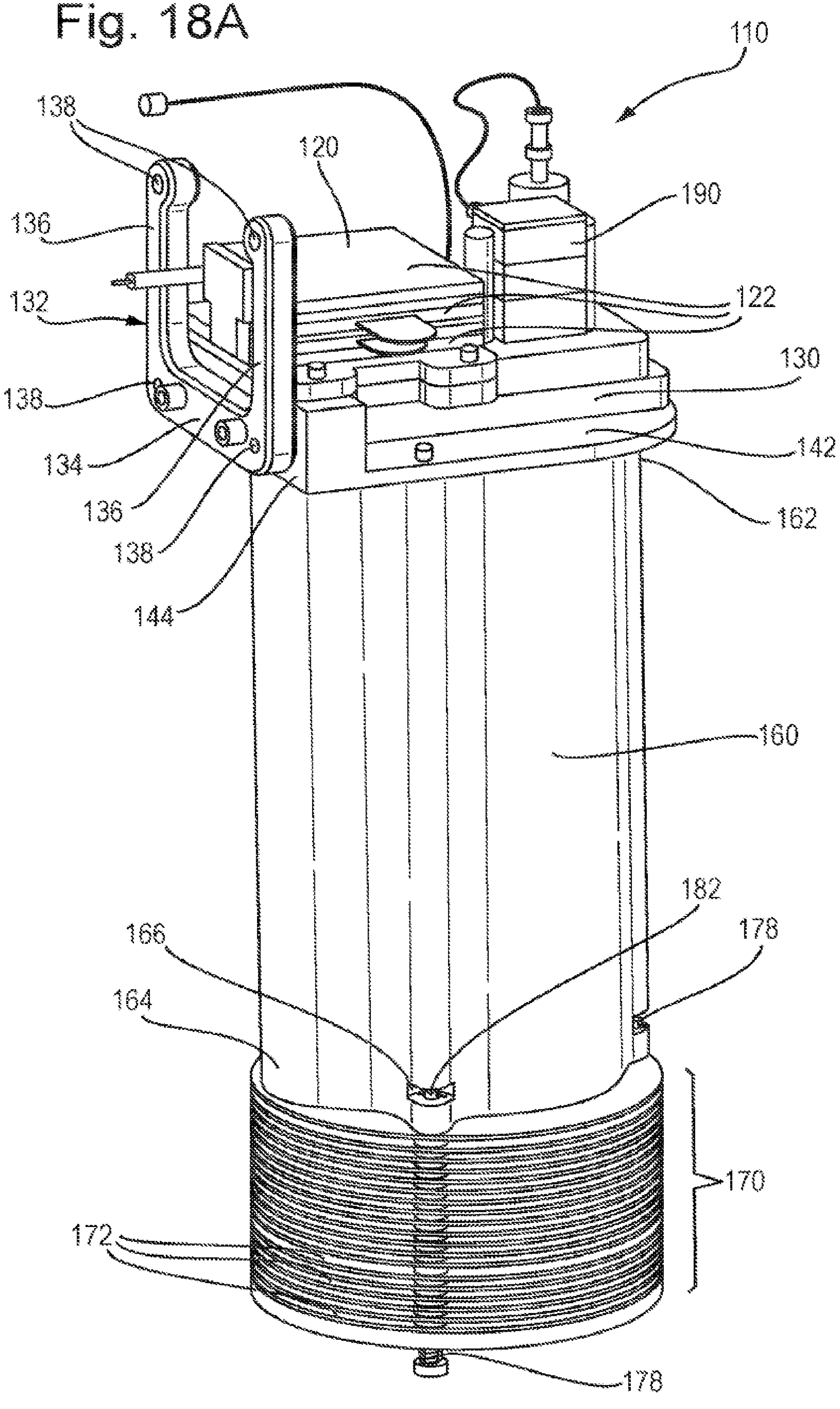
FIG. 18A shows the analyser of the mass spectrometer of FIG. 17 in isolation, with a pusher support assembly, flight tube and reflectron

The analyser 110 is shown in isolation in FIG. 18A, and comprises the pusher assembly 120, which may comprise a stack of electrodes 122 configured to accelerate ions received from the vacuum chamber 104 and accelerate the ions into the flight tube 160. The operation of the pusher assembly 120 for the analysis of ions using a Time of Flight mass analyser is known in the art, and will not be described in detail herein.

The pusher assembly 120 may be supported on and/or by the pusher support assembly 130. The pusher support assembly 130 may be located at a first end 162 of the flight tube 160 and may comprise a horseshoe, or U-shaped connecting member 132 (see also FIG. 17) configured to connect the analyser 110, and components thereof to the housing 106 of the mass spectrometer 100. The connecting member 132 is not limited to a horseshoe or U-shape, and may be any suitable shape whilst providing the functionality described herein.

The connecting member 132 may comprise a base portion 134 and two arms 136 that extend from the base portion 134. At the end of the arms 136 opposite the base portion 134 the connecting member 132 may comprise one or more apertures 138, each of which may be configured to receive a respective fastener 140 (see FIG. 17).

The base portion 134 may also comprise one or more apertures 138, for example located adjacent to its connection to each arm 136. The apertures 138 in the base portion may also be configured to receive a respective fastener 140. The fasteners 140 may be configured to fasten the connecting member 132, and analyser 110 to the housing 106 of the mass spectrometer 100.

In various embodiments, the fasteners 140 may comprise a screw and a nut, wherein the screw may be configured to extend through an aperture in the housing 106, and a respective one of the apertures 138 of the connecting member 132, wherein the nut may be rotated onto the fastener 140 to fasten the connecting member 132 to the housing 106 as aforesaid.

The fasteners 140 may be the only components that secure the analyser 110 to the housing 106 of the mass spectrometer 100. The analyser 110 may be connected and/or attached to the housing only at the locations corresponding to the fasteners 140. Although the illustrated embodiment shows four fasteners 140, more or fewer than four may be provided, with a suitable reduction or increase in the number of apertures 138.

The pusher support assembly 130 may comprise a main body 142 that may connect to the connecting member 132 at a first end 144 thereof. The main body 142 may be configured to support and/or receive the pusher assembly 120 and the detector assembly 190. The pusher support assembly 130 and its connections to the pusher assembly 120 and detector assembly 190 are described in more detail below with reference to FIG. 21.

As shown in FIGS. 18A, and in various embodiments the main body 142 may be cantilevered out from the connecting member 132. In other words, the main body 142 may be attached only via the connecting member 132 (at the first end 144 thereof) to the housing 106 of the mass spectrometer 100.

Figure 18B:
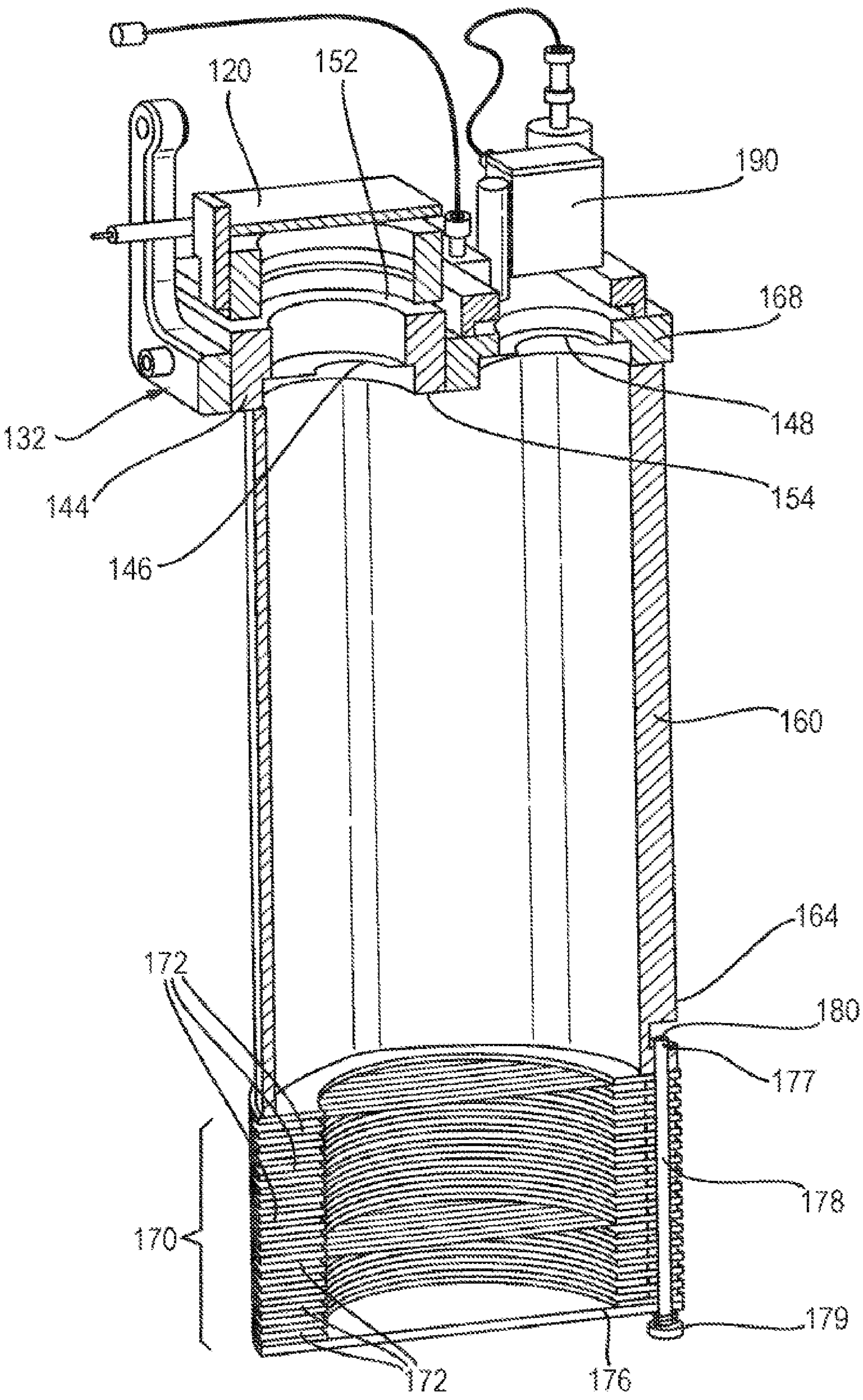
FIG. 18B shows a cross-sectional view of the analyser shown in FIG. 18A.

Referring now to FIG. 18B the main body 142 may comprise a first aperture 146 that may extend from an upper surface 152 of the pusher support assembly 130 to a lower surface 154 of the pusher support assembly 130. The first aperture 146 may be configured to receive ions accelerated by the pusher assembly 120, wherein ions may then be guided and/or output from the pusher assembly 120 into the flight tube 160 via the first aperture 146.

The main body 142 may further comprise a second aperture 148 configured to receive ions from the flight tube 160, wherein ions may be guided and/or received into the detector assembly 190. The second aperture 148 may extend from the lower surface 154 of the pusher support assembly 130 to the upper surface 152 of the pusher support assembly 130.

The flight tube 160 may be a substantially cylindrical member that extends from the first end 162 thereof to a second opposite end 164, where the flight tube 160 connects to the reflectron 170.

The flight tube 160 may be connected and/or attached to the lower surface 154 of the pusher support assembly 130 via one or more fasteners 168. The fasteners 168 may be inserted through the pusher support assembly 130 and into respective portions of the flight tube 160 to secure the flight tube 160 to the pusher support assembly 130. The flight tube 160 may hang from the cantilevered main body 142 of the pusher support assembly 130. For example, the flight tube 160 may be supported and/or held in place only through its connection to the pusher support assembly 130.

Reflectron

The reflectron 170 may comprise a stack of electrodes 172, and may be configured to reverse the direction of travel of ions that are received from the flight tube 160 such that they travel back into the flight tube 160 and towards the second aperture 148 and detector assembly 190. The broad operation of the reflectron 170 is well known in the art, and will not be described in great detail herein. Various embodiments of the present disclosure are directed to the structure of the reflectron 172, and how it attaches to the flight tube 160 to provide technical effects as set out below.

The reflectron 170 may be held (e.g. compressed) against the second end 164 of the flight tube 160. In order to achieve this, one or more (in this case three) rods 178 may extend through apertures in each of the electrodes 172 and through an aperture located at the second end 164 of the flight tube 160.

A second, opposite end of each rod 178 may extend into a recessed portion 166 formed in the outer surface of the flight tube 160. The rod 178 may comprise an aperture 180 located at or adjacent to the second end, wherein the aperture 180 may be configured to extend into the recessed portion 166 to permit access to the aperture 180, once the rod 178 is inserted through the stack of electrodes 172 as aforesaid. A small pin 182 (e.g. a cotter pin) may be inserted through the aperture 180 of each rod 178, which prevent the rod 178 from moving in a direction away from the flight tube 160. That is, each pin 182 may hold a respective one of the rods 178 in place and/or prevent the rod 178 from being removed.

In various embodiments, one or more resilient members 184 (e.g. a spring) may bias the stack of electrodes towards the flight tube 160. For example, a resilient member 184 may be biased between a foot 179 of each rod 178 and a lower plate 176 (and/or a bottom surface) of the reflectron. The lower plate 176 of the reflectron may be or comprise an electrode, as discussed in more detail below.

The one or more resilient members 184 may be configured to urge the rod 178 in a direction away from the flight tube 160, but since the pin 182 prevents movement of the rod 178 in this direction, the resilient member(s) 184 exert a force on the stack of electrodes 172 in the direction of the flight tube 160, which compresses the electrodes 172 together and compresses the stack of electrodes 172 (and the reflectron 170) against the flight tube 160.

Figure 19:
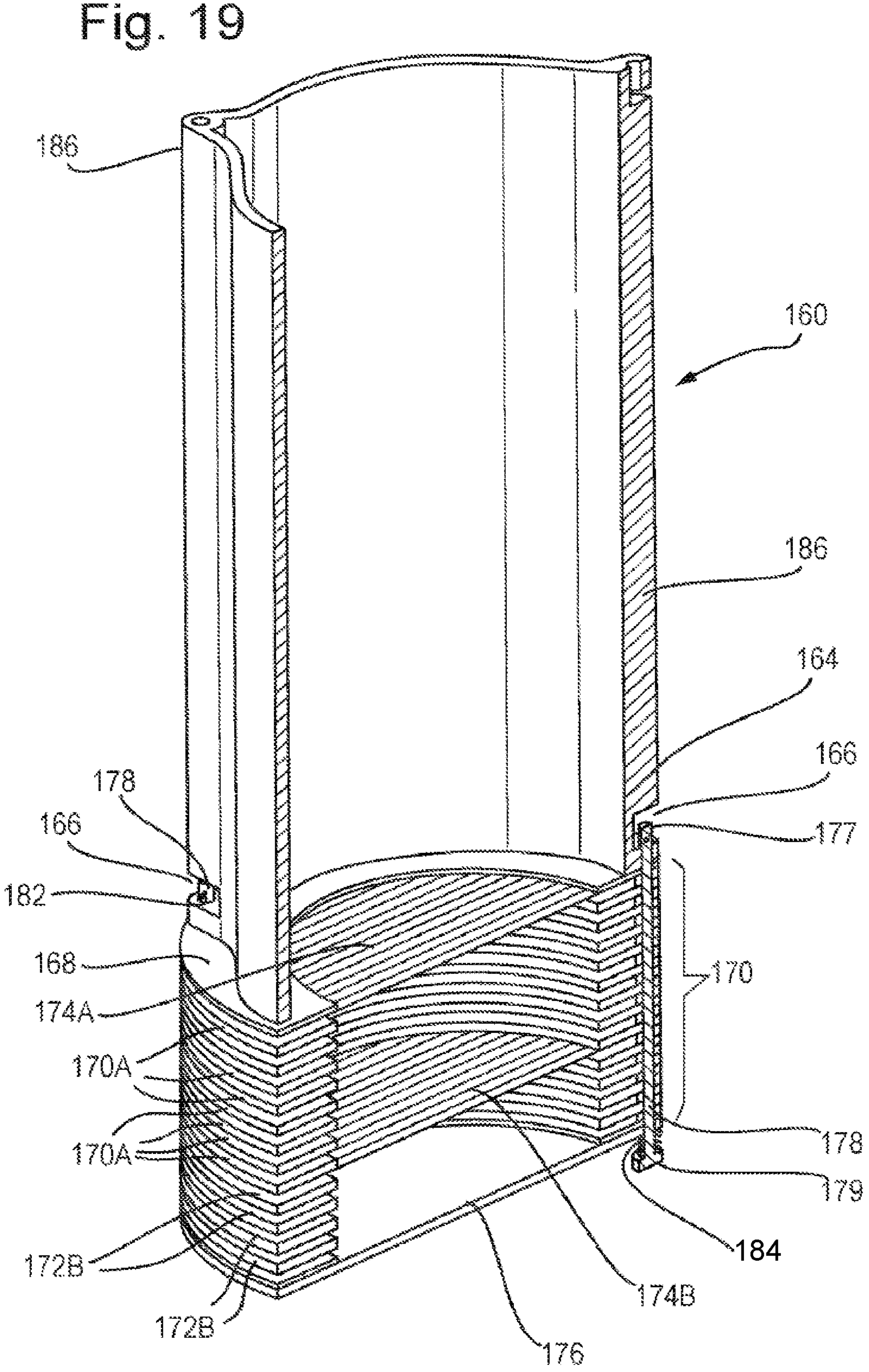
FIG. 19 shows a perspective cross-sectional view of the analyser shown in FIG. 18A, from which various features associated with the stack of electrodes that make up the reflectron can be seen.

FIG. 19 shows a perspective view of the flight tube 160 and reflectron 170 to illustrate some more detail of these components.

The flight tube 160 may contact, e.g. at the second end 164 an annular member 168 of the reflectron. A first grid electrode 174A may be supported by the first annular member 168 of the reflectron. The reflectron 170 may comprise a first set of ring electrodes 170A as well as a second set of ring electrodes 172B. A second grid electrode 174B may be located between the first set of ring electrodes 170A and the second set of ring electrodes 170B and may be supported by a suitable annular member.

Figure 20:
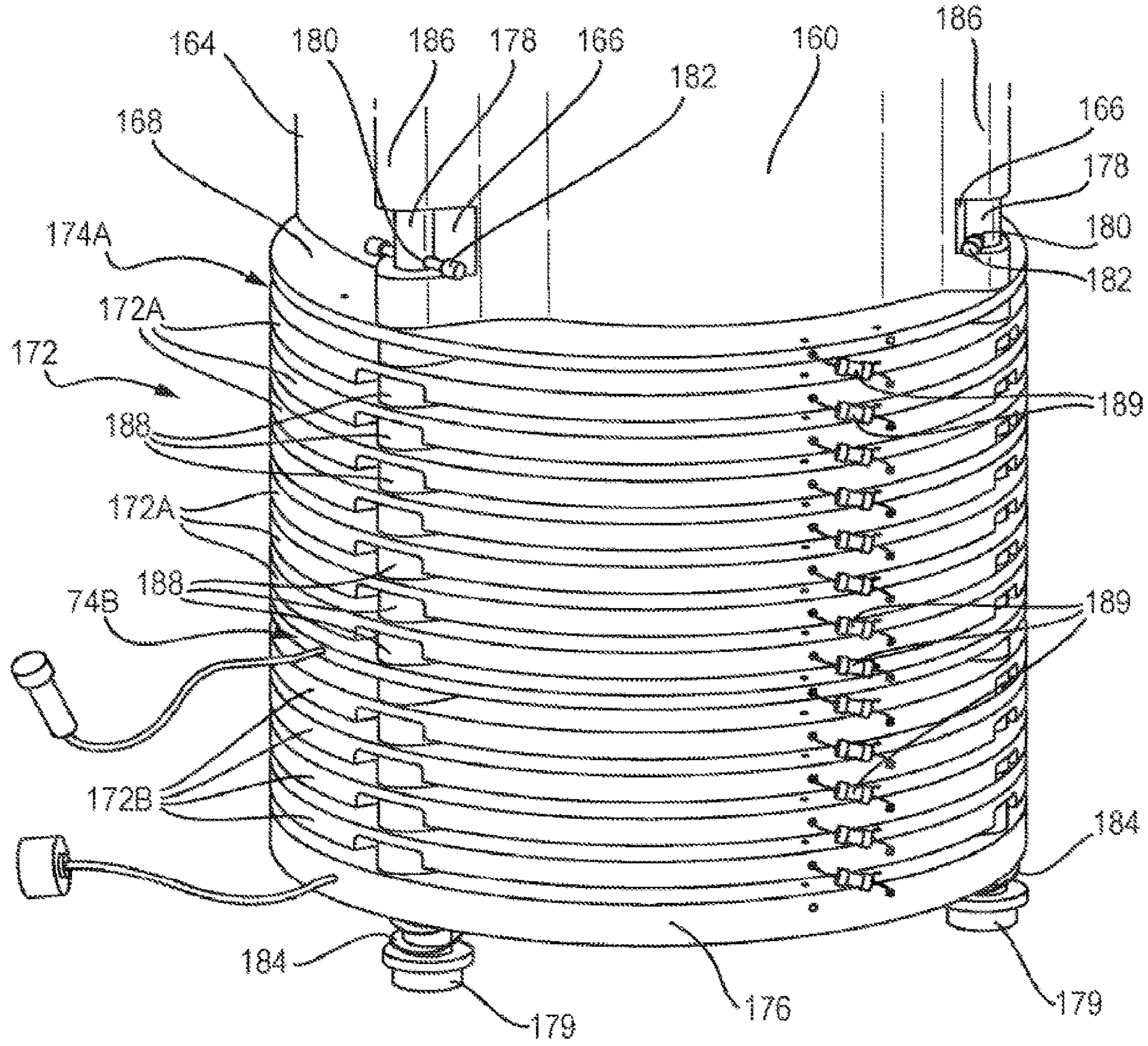
FIG. 20 shows a magnified view of the lower portion of the flight tube and reflectron assembly, which illustrates an embodiment of how the reflectron is supported on the flight tube.

FIG. 20 shows in more detail how the reflectron 170 may be mounted to the flight tube 160 in such a manner that the stack of electrodes 172 thereof are compressed and held together in a clamping arrangement that can also maintain parallelism of the electrodes whilst being electrically and/or thermally isolated from the other components of the mass spectrometer.

As is evident from FIG. 20, the rods 178 may extend through each of the electrodes 172 and into radially extending protrusions 186 that are formed around the circumference of the flight tube 160. In the illustrated embodiment there are three protrusions 186, each configured to receive a respective one of the rods 178, although more or fewer could be provided, wherein the number of radially extending protrusions may correspond to the number of rods 178 that are used in a particular application.

The recessed portions 166 discussed above may be formed in each of the radially extending protrusions 186, and may permit access to the apertures 180 formed in each of the rods 178 as discussed above. The rods 178 may be inserted into and may extend through the radially extending protrusions 186, wherein the apertures 180 may be exposed at the recessed portion 166, such that the pins 182 may be inserted through the apertures 180 as aforesaid.

The resilient members 184 may urge the rods 178 in a direction away from the flight tube 160. Inserting the pins 182 into the rods 178 at the recessed portions 166 limits the extent to which the rods 178 can move in this direction. As such, once the rods 178 can no longer move, the resilient members 184 may then urge the lower plate 176 of the reflectron 170 and, in turn, the stack of electrodes 172 towards the flight tube 160. In this manner, the reflectron 170 may be compressed against the flight tube 160, and the stack of electrodes 172 can remain under compression throughout use of the analyser 110.

This may be seen as an improvement over conventional arrangements that mount the reflectron to portions of the housing, for example, or require screw threads and bolts in order to secure the stack of electrodes together.

These embodiments also mean that any thermal and electrical isolation of the flight tube 160 remains intact, since no further support structure is required to mount or support the reflectron 170 to the flight tube 160 or within the analyser 110. As such, these embodiments (i.e., those that hold the reflectron together in a compressive arrangement) are seen as especially advantageous in arrangements involving a cantilevered flight tube 160.

In order to provide electrical isolation of the various electrodes 172 of the reflectron 170, one or more electrically insulating spacers 188 may be positioned around the rods 178 and between each of the electrodes 172, and between the topmost ring electrode 172 and the annular member 168 of the reflectron 170, as well as between the bottommost ring electrode 172 and the lower plate 176 of the reflectron 170. The spacers 188 may be constructed of any suitable electrically insulating material, for example a ceramic or plastic such as polyether ether ketone ("PEEK").

To provide a suitable electrical connection between the various electrodes 172, a resistor 189 may be placed between each of the electrodes 172, and between the topmost electrode 172 and the annular member 168 of the reflectron 170, as well as between the bottommost electrode 172 and the lower plate 176 of the reflectron 170. In accordance with various embodiments, each resistor 189 may be identical, which can advantageously provide a uniform DC gradient along one or more lengths of the reflectron 170.

The rods 178 may be constructed from ceramic or plastic, for example polyether ether ketone ("PEEK"), to provide thermal and electrical isolation, and/or the pins 182 may be constructed from stainless steel, for example to provide sufficient strength. In an exemplary embodiment, the rods 178 are constructed of polyether ether ketone ("PEEK"), the spacers 188 are constructed of a ceramic, and the pins 182 are constructed from stainless steel.

In various embodiments, the construction of the reflectron 170 and flight tube 160 is such that the reflectron hangs from the bottom of the flight tube 160 as discussed above. Although compressive arrangements are preferred in this situation, other less preferred embodiments are envisaged in which the reflectron 170 may be secured together using a non-compressive arrangement.

For example, the various components of the reflectron 170, including the electrodes 172, spacers 188 and lower plate 176 may be loaded into a jig, the jig being configured to hold and/or fix the components of the reflectron 170 in position and in their 'in use' configuration. These components may then be bonded together, for example using a suitable bonding agent (e.g. an adhesive) or by using a welding or brazing process (e.g. laser welding). Once the components are bonded together, the completed reflectron 170 may be removed from the jig and attached to the flight tube 160 in any suitable manner, for example using one or more nut and bolt arrangements or a suitable bonding agent, welding or brazing process.

The components of the reflectron 170 may be bonded together (whether they are held in a jig as discussed above or simply bonded one by one, for example) using an adhesive comprising a primary, non-conductive bonding layer, with a secondary conductive layer thereon.

It will be appreciated that in these embodiments, once removed from the jig the components are not compressed together (there may not be a resilient member 184 used to provide a compression of the various electrodes). As such, such embodiments are seen as less preferred to the arrangement shown in FIG. 20.

A further alternative to the above approaches might involve the use of a single bulk piece of an insulating material, such as a ceramic, which could then be provided with conductive regions on its surface, for example with electrical connections to these regions so as to define desired electric fields.

For example, a cylindrical, annular piece of non-conductive material (e.g. ceramic) could be provided with multiple, parallel conductive ring portions on an inner, axially extending surface thereof. These could be formed by depositing a metal material on the inner surface that mimics the ring electrodes used in typical reflectron arrangements. Different potentials could be applied to the different conductive ring portions, wherein the single-piece material may provide insulating portions between the conductive ring portions. One or more grid electrodes could be suitably positioned on the inner surface as well.

The advantage of this approach may be a reduced number of components potentially improving tolerance build up and cost.

Pusher Support Assembly

Figure 21:
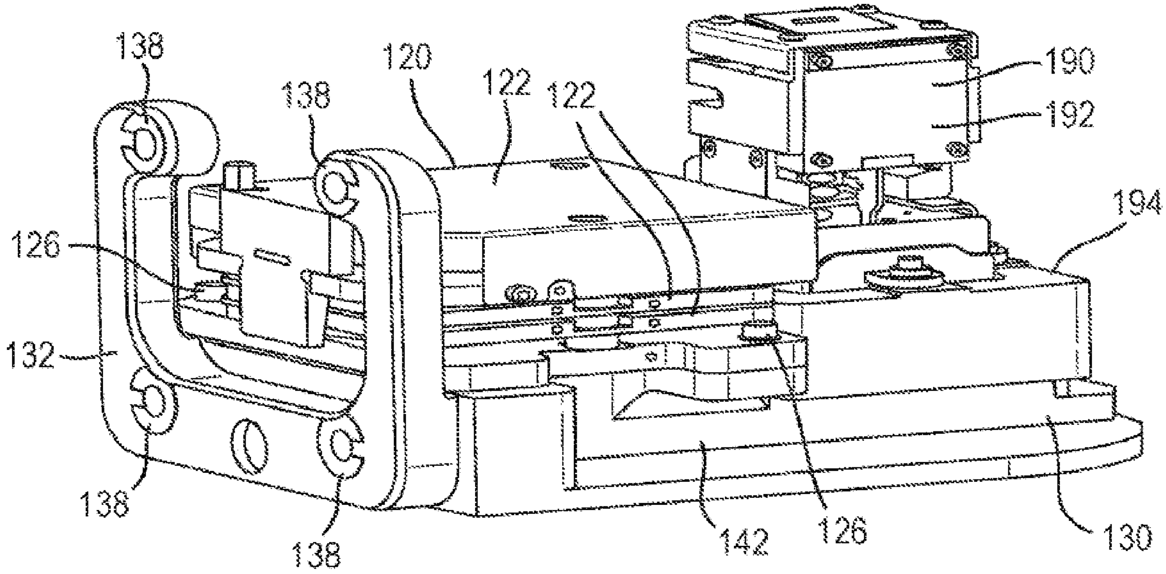
FIG. 21 shows a perspective view of a pusher support assembly of the mass spectrometer of FIG. 17 with the pusher assembly and detector assembly mounted thereto.

FIG. 21 shows a perspective view of the pusher support assembly 130, pusher assembly 120 and detector assembly 190 in isolation.

As discussed above, the connecting member 132 of the pusher support assembly 130 may comprise four apertures 138 that may each be configured to receive a fastener 140 for securing the analyser 110 to the housing 106 of the mass spectrometer 100. The apertures 138 may be spaced apart from each other such that they correspond to four corners of a square. This may provide an optimum connection between the analyser 110 and the housing 106 whilst providing the cantilevered arrangement of the analyser 110. As such, use of a horseshoe or U-shaped connecting member 132 provides a further advantageous refinement of this arrangement.

The pusher assembly 120 may comprise various electrodes 122 which are arranged in a stack, and mounted to a boss 124, which may itself be mounted to the pusher support assembly 130, e.g. the main body 142 thereof. One or more fasteners 126 may be used to fasten the pusher assembly 120 (including the electrodes 122 and boss 124) to the main body 142 of the pusher support assembly 130.

The detector assembly 190 may comprise a detector 192 configured to receive and detect ions. The detector 192 may be any suitable detector known in the art, and will not be described in detail herein. The detector 192 may be inserted into and/or mounted to a support structure 194 that may be configured to hold and support the various components of the detector assembly 190. The support structure 194 for the detector assembly 190 may then be fastened to the main body 142 of the pusher support assembly 130. Alternatively, in various embodiments discussed in more detail below, the support structure 194 for the detector assembly 190 may be integrally formed with the pusher support assembly 130.

Figure 22:
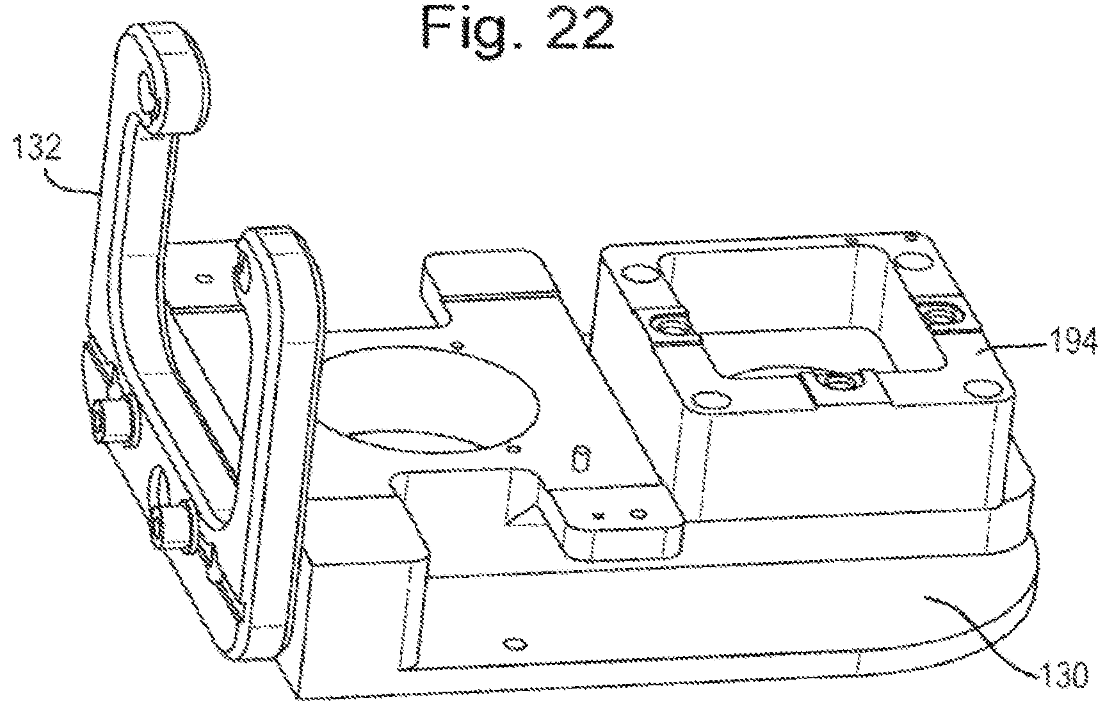
FIG. 22 shows an embodiment of a pusher support assembly for use with the mass spectrometer of FIG. 17 in isolation.

FIG. 22 shows one embodiment of a combination of the pusher support assembly 130, in which the connecting member 132 and support structure 194 for the detector assembly 190 are configured as separate pieces to the main body 142, and then fastened together for subsequent mounting within the mass spectrometer 100 with the pusher assembly 120 and detector assembly 190.

Figure 23:
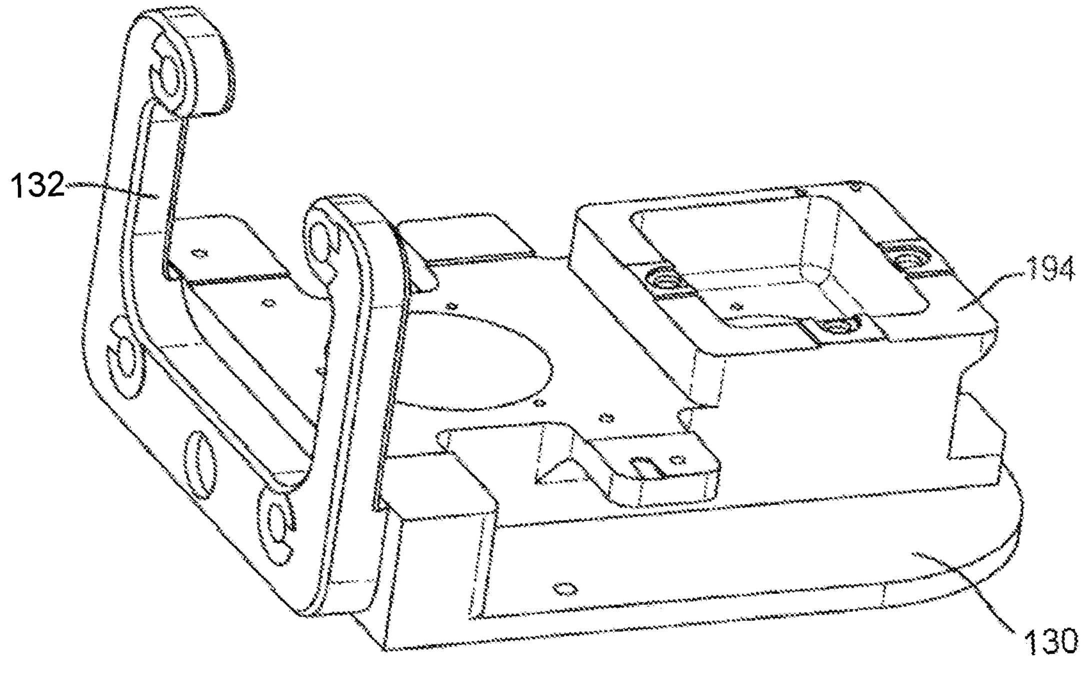
FIG. 23 shows a pusher support assembly for use with the mass spectrometer of FIG. 17 in accordance with an embodiment that includes a monolithic or single-piece structure.

FIG. 23 shows an alternative embodiment in which the pusher support assembly 130, including the connecting member 132 and support structure 194 of the detector assembly 190 are formed from a single piece of material. For example, the pusher support assembly 130 in this embodiment may be formed using an extrusion process, or an additive manufacturing process.

This embodiment is considered advantageous in its own right, and as such aspects of the present disclosure extend to an assembly for attaching a Time of Flight analyser to a housing of a mass spectrometer, wherein the assembly includes a first portion configured to receive a pusher assembly and a detector assembly, and a second portion configured to mount the analyser to a housing of a mass spectrometer, wherein the first portion and the second portion are of a single piece construction.

More generally, various embodiments of the present disclosure may be aimed at providing thermal and electrical isolation of the analyser 110. This may be achieved using, for example, a cantilevered flight tube 160 as described above. That is, the analyser 110 may be connected to the housing 106 of the mass spectrometer 100 via only the connecting member 132 and/or the analyser 110 may be supported by only the connecting member 132 and pusher support assembly 130. The reflectron 170 and flight tube 160 may be spaced apart from the housing 106 and/or lower surface 107, such they are not, e.g. fastened to a portion of the housing 106, or resting on the lower surface 107 of the mass spectrometer 100.

The pusher support assembly 130, e.g. the main body 142 thereof may then be cantilevered out from the connecting member 132 and/or the housing 106 of the mass spectrometer 100, such that the flight tube 160 hangs from the cantilevered main body 142 of the pusher support assembly 130.

The various fasteners used to mount the analyser 110 within the mass spectrometer 100, for example the fasteners 140 configured to secure the connecting member 132 to the housing 106 of the mass spectrometer 100, and/or the fasteners 178 configured to mount the reflectron 170 to the flight tube 160 may be made of a substantially thermally and electrically insulating material, such as a ceramic or plastic, e.g. polyether ether ketone ("PEEK"). This provides thermal and electrical isolation of the analyser 110 from the remaining components of the mass spectrometer. This can be particularly useful during modes of operation in which the temperature of the mass spectrometer 100 fluctuates, such as during introduction of a lock mass component or calibration.

Conventional designs of a Time of Flight mass analyser have comprised a flight tube and pusher support assembly that are mounted and secured at both ends thereof to the housing of the mass spectrometer. Various embodiments described herein are distinct from such arrangements, in that both the flight tube 160 and pusher support assembly 130 are cantilevered from the housing using, e.g. the connecting member 132.

In addition, the reflectron 170 may not be secured or fastened to the housing 106 of the mass spectrometer 100. As discussed above the fasteners 178 configured to mount the reflectron 170 to the flight tube 160 may be made of a substantially thermally and electrically insulating material. In various embodiments, at least the feet 179 of the fasteners 178 may be made of a substantially thermally and electrically insulating material, such as a ceramic or plastic, e.g. polyether ether ketone ("PEEK"), for example even if the remaining portion of each fastener 178 is not.

Pusher Assembly

Figure 24:
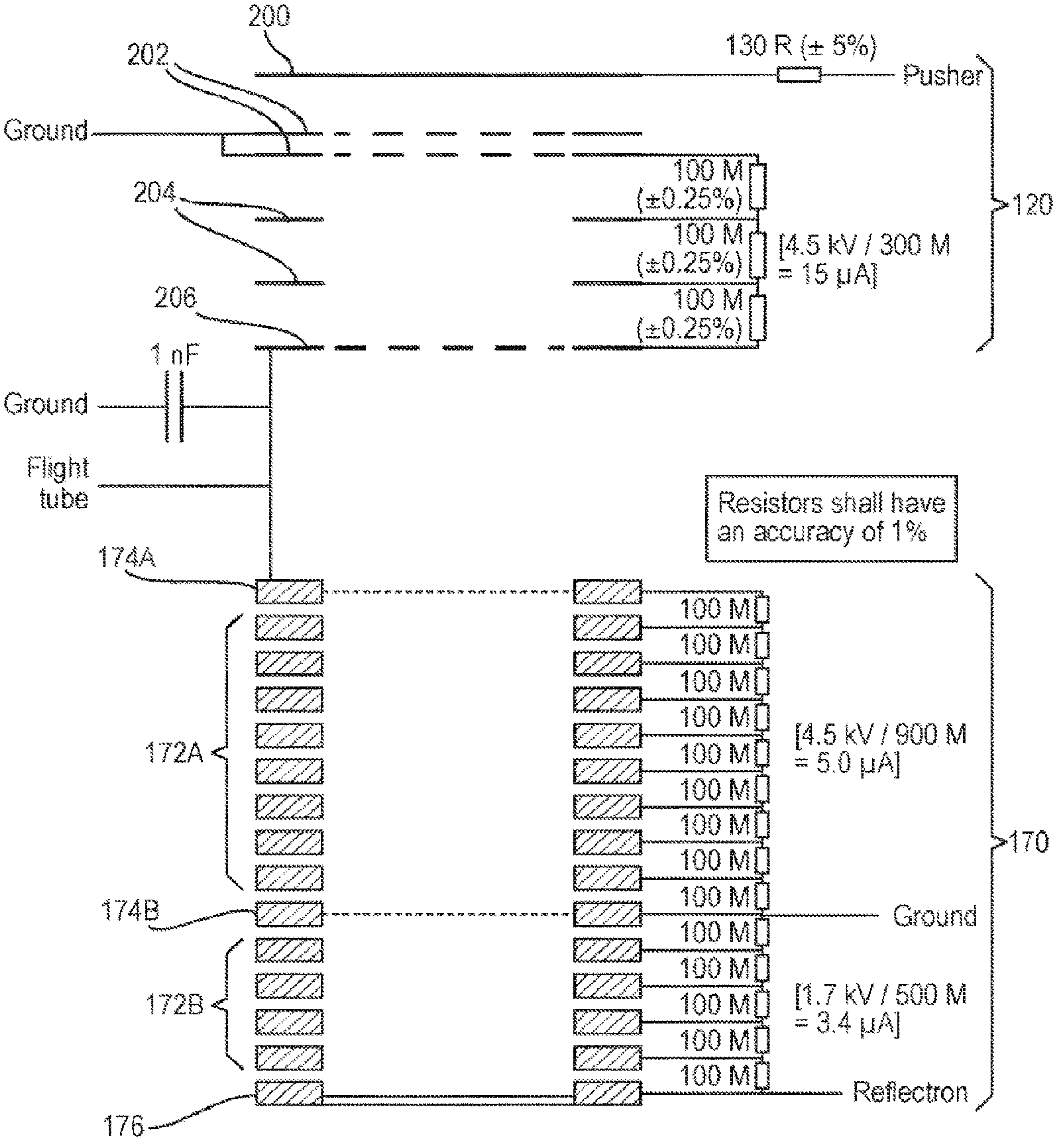
FIG. 24 shows a schematic of an electrode arrangement of the analyser of the mass spectrometer of FIG. 17.

FIG. 24 shows schematically the arrangement of electrodes within the time of flight analyser 110, in particular the electrodes of the pusher assembly 120 and those of the reflectron 170.

The pusher assembly 120 may comprise a pusher electrode 200, which may be arranged at a first end of the pusher assembly 120 (see also FIG. 17). Ions may be received in an ion beam from the first portion 104 of the mass spectrometer 100. The pusher electrode 200 may then be configured to accelerate ions from the ion beam into the flight tube 160 of the time of flight analyser 110. As is known in the art, the pusher electrode is configured to cause a short section of the ion beam to be detached and accelerated into the time of flight analyser, wherein a positive potential may be applied to the pusher electrode 200 to accelerate positively charged ions and vice versa.

The pusher electrode 200 may be placed at a right angle, e.g. orthogonally to the direction of travel of ions in the ion beam, such that the pusher electrode 200 may be configured to accelerate ions in the ion beam orthogonally to their direction of travel. The ions accelerated by the pusher electrode 200 will move through the remainder of the pusher assembly 120 and into the flight tube 160.

After a period of time the ions accelerated by the pusher electrode 200 will arrive at the reflectron 170, which may be a device that uses an opposing electric field gradient to reverse the direction of travel of ions and is located at the end of the flight tube 160 opposite to the pusher assembly 120. The opposing electric field gradient may be created using one or more electrodes, for example a set of electrodes including the stack of electrodes 172 described herein. Within the reflectron 170, ions may be stopped and then accelerated back out, returning through the flight tube 160 to the detector assembly 190, where they can then be detected.

The pusher assembly 120 may further comprise a double grid electrode 202, which may comprise two grid electrodes arranged adjacent to one another. The double grid electrode 202 may be configured to focus the ions accelerated by the pusher electrode 200. Further lens electrodes 204 may be provided to further assist in focusing the ions accelerated by the pusher electrode 200 and travelling through the double grid electrode 202. The pusher assembly 120 may further comprise an exit grid electrode 206.

Notably, the pusher assembly 120 may only comprise a pusher electrode 200 (which may be termed a repulsive electrode), and in contrast to conventional arrangements may not comprise a pulling or attractive electrode. This has been found to improve the energy (e.g. power) requirements of the mass spectrometer 100, since the pulling or attractive electrode normally requires a dedicated power supply. The use of a double grid electrode 202 as described herein, and in particular the use of a field free region between the electrodes thereof may assist in spatial focusing in situations involving only a pusher or repulsive electrode.

The reflectron 170 may comprise a stack of electrodes as shown in FIG. 24, which corresponds to the stack of electrodes 172 described above (and shown in, e.g. FIG. 20. That is, the reflectron 170 may comprise a first grid electrode 174A located at the top of the electrode stack, a first set of ring electrodes 172A located adjacent to the first grid electrode 174A, then a second grid electrode 174B may be located adjacent to the first set of ring electrodes 172A, and on the opposite side of the first set of ring electrodes 172A to the first grid electrode 174A. A second set of ring electrodes 172B may then be located adjacent to the second grid electrode 174B. A plate electrode 176 may be located at the bottom of the electrode stack.

Figure 25:
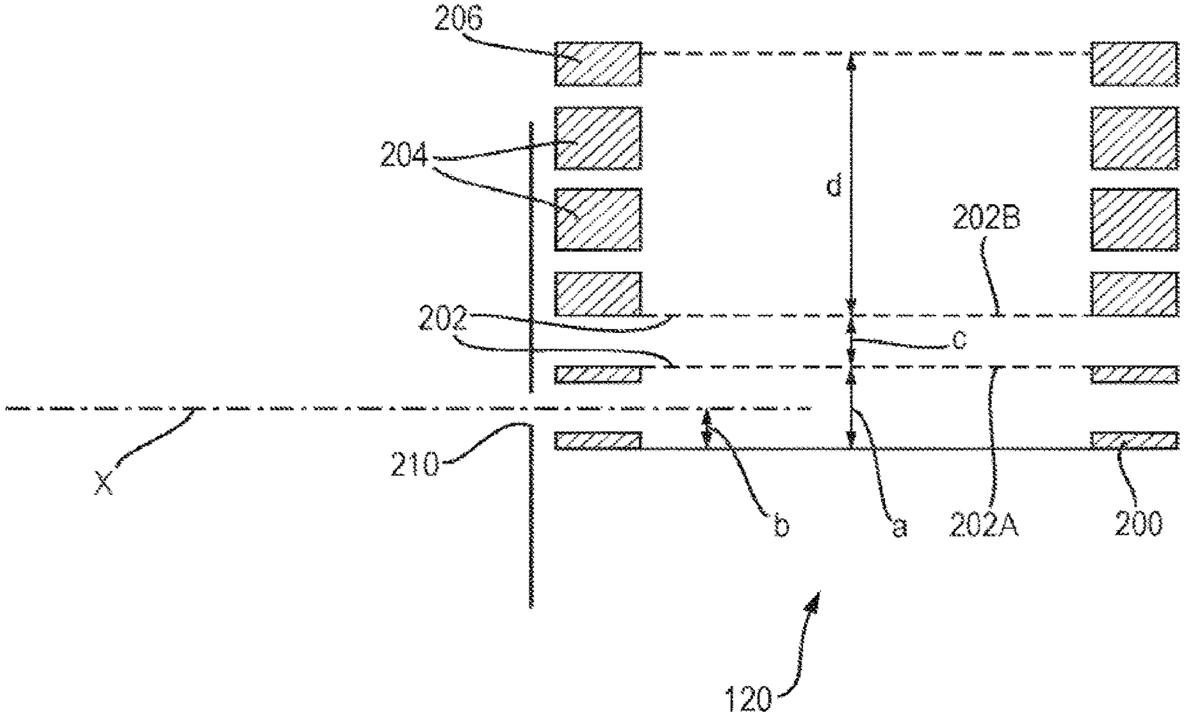
FIG. 25 shows example dimensions of the electrode arrangement of the pusher assembly shown in FIGS. 17 and 24, in which the orientation of the electrodes is reversed.

FIG. 25 shows schematically various example dimensions of the electrodes of the pusher assembly 120. It will be noted that the orientation of the electrodes is reversed with respect to their orientation in FIG. 24, with the pusher electrode 200 shown at the bottom of the figure.

Ions may be introduced into the pusher assembly 120 (e.g. in an ion beam) through an opening 210 and along an axis X, which may correspond to the axis of one or more of the components within the first portion 104 of the mass spectrometer 100, for example one or more ion optic components (e.g. the transfer optics 804 discussed above).

The double grid electrode 202 may comprise a first grid electrode 202A that is located a distance a from the pusher electrode 200. The distance a may be between approximately 5 to 6 mm, and optionally about 5.4 mm.

The axis X along which ions are introduced may be located roughly halfway between the pusher electrode 200 and the first grid electrode 202A. For example, the axis X may be parallel to the pusher electrode 200 and may be located a distance b from the pusher electrode 200. The distance b may be between approximately 2.5 to 3 mm, and optionally about 2.7 mm.

The double grid electrode 202 may comprise a second grid electrode 202B located adjacent to the first grid electrode 202A and held at the same voltage. The first grid electrode 202A may be separated from the second grid electrode 202B by a distance c, wherein the distance c may be between approximately 2 to 4 mm, for example between 2 to 3 mm, and optionally about 2 mm or 2.9 mm.

As discussed above the first grid electrode 202A may be held at the same voltage as the second grid electrode 202B, which creates a field free region therebetween. Use of a field free region having the distances set out above (e.g. the distance c) has been found to improve the spatial focusing of ions that are accelerated by the pusher (or repulsive) electrode 200, especially in cases where a puller (or attractive) electrode is not used (i.e., with the present disclosure). In various embodiments, the first grid electrode 202A may be parallel to the second grid electrode 202B.

The ring electrodes 204 may be located between the double grid electrode 202 and the exit grid electrode 206. In various embodiments, the double grid electrode 202 (e.g. the second grid electrode 202B thereof) may be located a distance d from the exit grid electrode 206, wherein the distance d may be between approximately 16 to 20 mm, and optionally about 18 mm.

Figure 26:
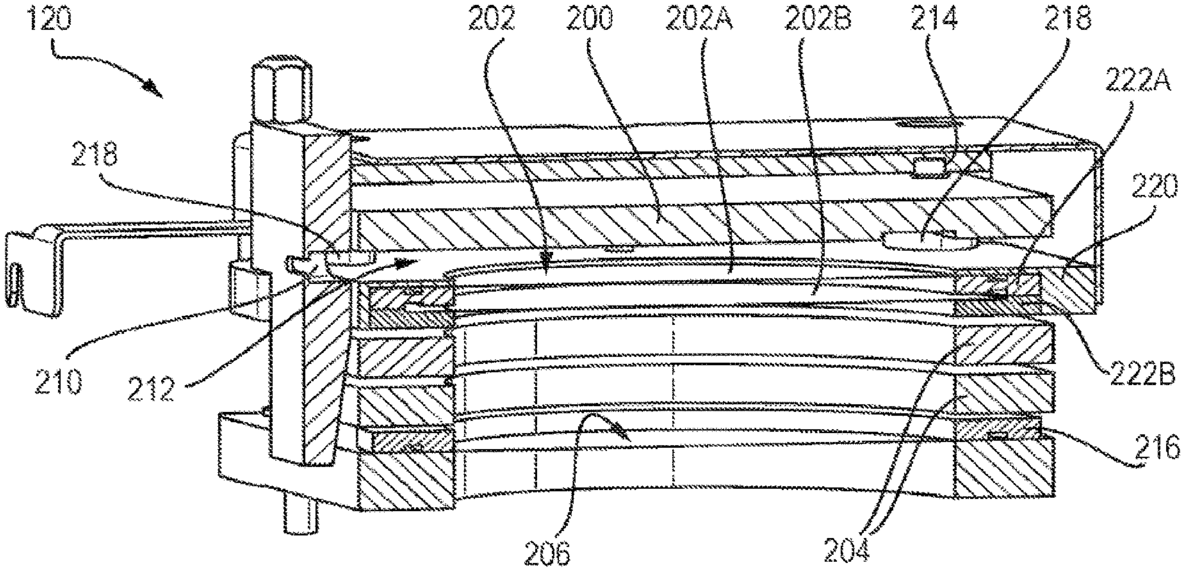
FIG. 26 shows an example of a pusher assembly in cross-section according to an embodiment in which double grid electrodes are supported by separate support rings.

FIG. 26 shows an embodiment of a pusher assembly 120 in cross-section, and in reverse orientation to the depiction of the pusher assembly 120 in FIG. 25.

The previously described opening 210 can be seen on the left-hand side, through which ions are introduced into a pusher cavity 212. As described above, ions are then accelerated by the pusher electrode 200 through the double grid electrode 202 incorporating the first and second grid electrodes 202A, 202B, as well as through the ring electrodes 204 and exit grid electrode 206.

In this embodiment, the double grid electrode 202 is supported using a number of components. These include an outer ring 220, mounted to which are first and second inner support rings 222A,222B, wherein the first inner support ring 222A is configured to support the first grid electrode 202A, and the second inner support ring 222B is configured to support the second grid electrode 202B.

The outer ring 220, and the first and second inner support rings 222A,222B may be fastened together using any suitable means, for example one or more fasteners 214 may extend through the outer ring 220, and the first and second inner support rings 222A,222B, and a suitable nut (not shown) may be used to fasten the various components together. The fasteners 214 may additionally extend through the pusher electrode 200, ring electrodes 204 and a support ring 216 configured to support the exit grid electrode 206. A number of electrically intuitive spacers 218 may be located between the various components in order to separate them electrically.

The fasteners 214 and/or spacers 218 may be made of a thermally and/or electrically insulating material, for example a ceramic or plastic such as polyether ether ketone ("PEEK").

Figure 27:
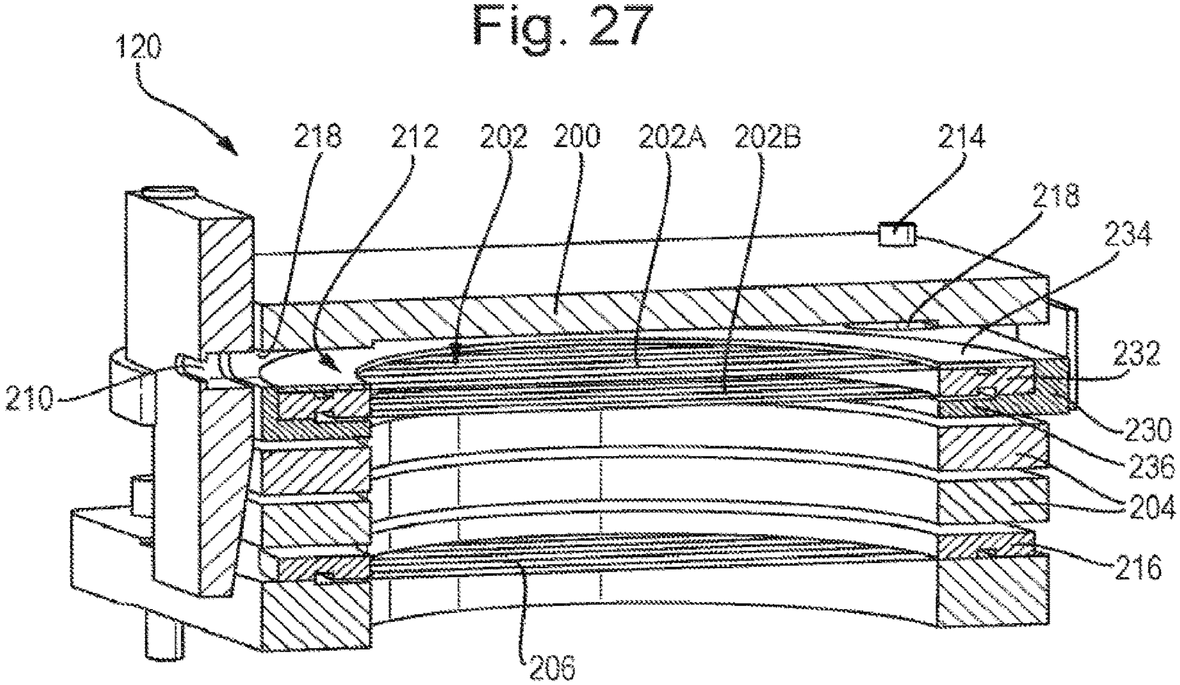
FIG. 27 shows an example of a pusher assembly in cross-section according to an embodiment in which double grid electrodes are supported by a single support ring.

FIG. 27 shows a slightly modified version of the pusher assembly 120 according to an embodiment, in which like elements in FIG. 27 are given like reference numerals to the same elements shown and described in respect of FIG. 26.

In this embodiment, the support structure for the double grid electrode 202 is modified with the aim of reducing weight and increasing ease of manufacture. In particular, instead of providing first and second inner support rings 222A,222B, a single support ring 232 is provided, and the first and second grid electrodes 202A,202B are fastened (e.g. adhered) to the single support ring 232.

An outer ring 230 is also provided and is configured to support the single support ring 232 within the pusher assembly 120. An annular ring member 234 may be placed on top of the single support ring 232 to enclose the single support ring 232 between the annular ring member 234 and a flange 236 of the outer ring 230.

Figure 28:
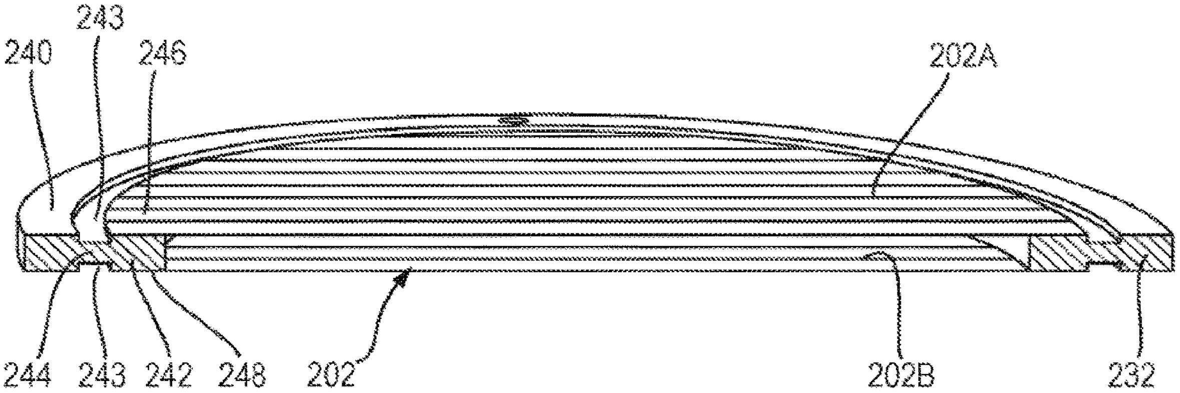
FIG. 28 shows the single support ring and double grid electrodes of FIG. 27 in isolation, and in cross-section.

FIG. 28 shows the support structure for the double grid electrode 202 in isolation, and is provided to illustrate in part how the support structure and double grid electrode 202 may be manufactured.

In various embodiments the grid electrodes may be formed by strands of a metallic element or wire, for example tungsten, wherein the strands may extend parallel to one another (e.g. in a single direction as shown in the figures). The strands may be oriented parallel to the direction of travel of ions as they are introduced into the pusher assembly 120, e.g. parallel to the ion beam and/or the axis X shown in FIG. 25.

In other embodiments the grid electrodes may comprise strands of a metallic element or wire (e.g. tungsten) in a grid, e.g. extending in various directions. For example a first set of strands could extend in a first direction, wherein the first set of strands may be parallel to each other. A second set of strands may then be arranged perpendicular to the first set of strands, wherein the second set of strands may also be parallel to each other.

In various embodiments the double grid electrode 202 may be formed by providing an annular ring member corresponding to the single support ring 232. The annular ring member 232 may comprise a dog bone shape in cross-section, wherein an outer annular portion 240 that is relatively thick may extend to an inner annular portion 242 that is also relatively thick, and via a connecting portion 244 that is relatively thin. This structure defines annular grooves 243 in the spaces between the outer annular portion 240 and the inner annular portion 242.

In various embodiments the first and second grid electrodes 202A,202B may be attached to the annular ring member 232 using adhesive.

In one particular example of a method of forming the double grid electrode, adhesive may be applied to an upper surface 246 and a lower surface 248 of the inner annular portion 242 of the annular ring member 232. The adhesive may be conductive. The strands intended to form the grid electrodes may then be wound across and/or around the annular ring member 232 so as to form the grid electrodes 202A,202B. The strands may contact the upper surface 246 and lower surface 248 of the inner annular portion 242 of the annular ring member 232, and any adhesive that may be applied thereto.

Adhesive, for example conductive adhesive may then be applied to the upper surface 246 and lower surface 248 of the annular ring member 232. This adhesive may be in addition to or in place of the adhesive applied before the strands are wound across and/or around the annular ring member 232. At this point the strands may be substantially adhered to the upper surface 246 and the lower surface 248 of the inner annular portion 242 of the annular ring member 232.

In order to complete the construction of the single support ring 232 and double grid electrodes 202 a cutting tool may be run around the peripheral grooves 243 in order to cut off the portion of the strands that are not in contact with the upper surface 246 and lower surface 248 of the inner annular portion 242 of the annular ring member 232.

Lock Mass Introduction

Time of Flight measurements allow for accurate mass measurements to be made based on the arrival time of ions that have been accelerated by the pusher electrode (see, e.g. pusher electrode 200 in FIG. 17) of a Time of Flight analyser. As is known in the art, arrival times are converted to mass to charge ratio values using the known distance travelled and the known acceleration of the ions, in order to give an accurate value for mass. This provides data corresponding to the constituents of an analytic sample.

It is also known that small changes in temperature can shift the mass of the ions that have been determined by parts per million, and so a correction may be required in order to ensure accurate mass values are obtained. In order to achieve the correction, in various embodiments a compound of known mass may be introduced to the instrument at specific intervals during an analysis. This may be referred to as a "lock mass" compound.

The lock mass compound may be analysed and the mass of the compounds may be recorded. A correction factor may be created which corresponds to the difference between the recorded mass of the lock mass compound and the actual mass of the compound. This correction factor may then be applied to the data corresponding to the analytic sample, ensuring that any temperature changes are corrected for.

In various embodiments a "two-point" lock mass correction may be used, in which two different compounds of known mass may be introduced as lock mass compounds, and a correction factor may be created based on the difference between the recorded masses of the lock mass compounds and the actual mass of the compounds. This can be used for samples including very large mass ranges, since a correction factor based on a compound at a lower end of the mass range may not be applicable for compounds at the higher end of the mass range.

Conventional instruments have used a lock spray source having, for example, two different sprayers and a baffle. The standard sprayer may be used to introduce the analytical mixture via, for example, a liquid chromatography machine. An additional sprayer, which may be referred to as the reference sprayer, may be used to introduce a compound of known mass (i.e., the lock mass compound). The baffle may be configured to switch between the two sprayers so that only one may be used to introduce a substance into the mass spectrometer at a particular point in time.

The baffle may be switched at specific intervals throughout an analytical run and data may be collected in two channels, a first of the channels being for lock mass data and a second of the channels being for analytical data. After the analytical run the lock mass data may be utilised to produce a correction factor, in the same manner as described above, which may be applied to the analytical data.

Collecting lock mass data in this manner at set intervals throughout the analytical run can further ensure that temperature fluctuations have a reduced effect on the analytical data. However, use of a baffle as well as two different sprayers may be relatively expensive, and can further complicate the manufacture of the instrument.

Therefore, in various embodiments of the present disclosure the ion inlet assembly or ion source 102 (see FIG. 17) may comprise a device configured to introduce one or more analyte compounds as well as a lock mass compound using a single sprayer.

In various embodiments the lock mass compound may be introduced immediately before and immediately after an analytical run (e.g. between analytical runs) during which the analyte compound(s) are introduced. Each analytical run may be restricted to a maximum time of about 20 minutes, which may refer to a total, continuous time. As such, lock mass compounds may be introduced roughly every 20-22 minutes.

Upon introduction of a lock mass compound as discussed above, a or the control system may be configured to analyse the lock mass compound using the mass spectrometer 100 and determine the mass(es) of the lock mass compound(s). The control system may then be configured to determine a correction factor, which may correspond to the difference(s) between the recorded mass(es) of the lock mass compound(s) and the actual mass(es) of the compound(s). The control system may then be configured to apply this correction factor to the data obtained during the analytical run.

In various embodiments a "two-point" lock mass correction may be applied, in which the control system is configured to obtain lock mass data immediately before and immediately after the analytical run. The control system may then be configured to determine a correction factor based on the differences between the recorded masses of the lock mass compounds and the actual masses of the compounds, in the separate lock mass corrections. The control system may then be configured to apply the correction factor to the data obtained during the analytical run, which is carried out in between the two lock mass corrections.

In various embodiments the lock mass data may be collected at between about 0.45 to 0.55 ions per push, for example about 0.5 ions per push ("IPP"), which has been found to provide optimum conditions for lock mass data collection. This may be achieved by suitable adjustment of ion optics, for example adjustment of a voltage applied to a cone electrode. The cone electrode may be positioned at any suitable location, for example within the ion inlet device or ion source 102, or at the entrance to the time of flight analyser 110.

Although the present disclosure has been described with reference to preferred embodiments, it will be understood by those skilled in the art that various changes in form and detail may be made without departing from the scope of the disclosure as set forth in the accompanying claims.

The invention claimed is:

1. A Time of Flight analyser comprising:

a flight tube having:

a plurality of radially extending protrusions formed around a circumference of the flight tube, wherein each of the plurality of radially extending protrusions has a respective recess formed therein;

a reflectron mounted to an end of the flight tube such that it receives ions passing through the end of the flight tube, wherein the reflectron comprises a stack of electrodes that are compressed against the end of the flight tube and each of the electrodes includes apertures;

a plurality of rods, wherein each of the rods extends through selected ones of the apertures in the electrodes and into a respective one of the recesses formed in a respective one of the plurality of radially extending protrusions, wherein each of plurality of rods includes an aperture that is exposed at the respective one of the recesses in the respective one of the plurality of radially extending protrusions and, a plurality of pins, wherein, for each rod of the plurality of rods, a pin is inserted through the aperture of the rod that is exposed at the respective one of the recesses in the respective one of the plurality of radially extending protrusions for preventing the rod from moving in a direction away from the flight tube; and wherein the Time of Flight analyser comprises one or more resilient members configured to bias the stack of electrodes towards the flight tube, so as to compress the stack of electrodes against the flight tube.

2. A Time of Flight analyser as claimed in claim 1, wherein the stack of electrodes comprises a plurality of ring electrodes.

3. A Time of Flight analyser as claimed in claim 1, wherein the stack of electrodes are compressed such that they remain parallel to each other under compression.

4. A Time of Flight analyser as claimed in claim 1, wherein each of the one or more resilient members are biased between a respective one of the rods and the stack of electrodes to compress the stack of electrodes against the flight tube.

5. A Time of Flight analyser as claimed in claim 4, wherein each of the one or more resilient members urges against a foot of a respective one of the rods and a portion of the reflectron.

6. A Time of Flight analyser as claimed in claim 5, wherein the portion of the reflectron is a bottom surface or plate thereof.

7. A Time of Flight analyser as claimed in claim 4, further comprising a plurality of electrically insulating spacers in between each of the electrodes in the stack of electrodes, wherein each spacer extends around a respective one of the one or more rods and is compressed between the electrodes by the biasing force exerted by the resilient member.

8. A Time of Flight analyser as claimed in claim 7, wherein the spacers define the separation distance of the electrodes in the stack of electrodes.

9. A Time of Flight analyser as claimed in claim 8, wherein the separation distance corresponds to the spacing between the electrodes in a direction parallel to a central, longitudinal axis of the reflection.

10. A Time of Flight analyser as claimed in claim 7, wherein the spacers are all of the same size.

11. A Time of Flight analyser as claimed in claim 1, wherein each rod is straight and the selected apertures in the electrodes are aligned so as to receive the straight rod and insertion of the straight rod through the selected apertures in the electrodes aligns the electrodes in an in use orientation.

12. A method of constructing a Time of Flight analyser as claimed in claim 1, the method comprising the steps of:

(i) assembling a stack of electrodes to form a reflectron; and (ii) compressing the stack of electrodes against a flight tube.

13. A Time of Flight analyser as claimed in claim 1, wherein the one or more resilient members are one or more springs configured to urge the stack of electrodes towards the flight tube.

14. A Time of Flight analyser as claimed in claim 1, wherein the flight tube and reflectron have a central axis that is substantially vertical.

* * * * *